US008005158B2

(12) United States Patent
Leonidov et al.

(10) Patent No.: US 8,005,158 B2
(45) Date of Patent: Aug. 23, 2011

(54) OVERHEAD SIGNALING IN A WIRELESS COMMUNICATION SYSTEM

(75) Inventors: Alexander Leonidov, Somerset, NJ (US); Hui Jin, Clinton, NJ (US); Rajiv Laroia, Far Hills, NJ (US); Junyi Li, Bedminster, NJ (US); Murari Srinivasan, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1095 days.

(21) Appl. No.: 11/487,260

(22) Filed: Jul. 14, 2006

(65) Prior Publication Data

US 2007/0242639 A1    Oct. 18, 2007

Related U.S. Application Data

(60) Provisional application No. 60/792,182, filed on Apr. 14, 2006.

(51) Int. Cl.
*H04L 5/12* (2006.01)
*H04L 23/02* (2006.01)

(52) U.S. Cl. ......................................... 375/261; 375/134
(58) Field of Classification Search .................. 375/130, 375/132–137, 259–261
See application file for complete search history.

(56) References Cited

U.S. PATENT DOCUMENTS

| 5,852,630 | A  | * | 12/1998 | Langberg et al. | 375/219 |
| 2005/0157803 | A1 | * | 7/2005 | Kim et al. | 375/260 |
| 2007/0064771 | A1 | * | 3/2007 | Schilling | 375/133 |
| 2007/0159969 | A1 | * | 7/2007 | Das et al. | 370/229 |
| 2007/0242765 | A1 |   | 10/2007 | Parizhisky et al. | |
| 2007/0245007 | A1 |   | 10/2007 | Tsirtsis et al. | |
| 2007/0249288 | A1 |   | 10/2007 | Moallemi et al. | |

FOREIGN PATENT DOCUMENTS

| EP | 1065818 | 1/2001 |
| EP | 1569403 | 8/2005 |

OTHER PUBLICATIONS

Tsumura S et al: "Performance Comparison of OFDM-FH and MC-CDM in Single- and Multi-Cell Environments" May 30, 2005, 2005 IEEE 61st Vehicular Technology Conference, 2005. VTC 2005 Spring. Stockholm, Sweden Apr. 30-May 1, 2005, Piscataway, NJ, USA, IEEE, pp. 1730-1734, XP010855720 ISBN: 0-7803-8887-9.
International Search Report—PCT/US07/066583, International Search Authority—European Patent Office—Jan. 2, 2008.
Written Opinion—PCT/US07/066583, International Search Authority—European Patent Office—Jan. 2, 2008.

* cited by examiner

*Primary Examiner* — David C. Payne
*Assistant Examiner* — James M Perez
(74) *Attorney, Agent, or Firm* — Semion Talpalatsky

(57) ABSTRACT

Improved ways of communicating assignment signals using flash signaling are described, e.g., for wireless terminals with low SNR, that are more robust against large variation of channel gains due to e.g., frequency selective fading and fast fading in time. Coding and modulation methods and apparatus that have excellent properties against symbol erasures are described. The use of flash signaling provides an improved assignment channel having strong performance on the fading channel without compromising the performance on the AWGN channel. In one exemplary embodiment, the coding and modulation method can tolerate up to 5 erased symbols out of 8 transmitted symbols. One embodiment reduces or minimizes the sector interference on the flash assignment by improving or maximizing orthogonality between different sectors. In addition, one embodiment describes improved ways of swapping flash assignment tone-symbols in the presence other high priority signals, like sector pilots and sector null pilots.

58 Claims, 9 Drawing Sheets $$G = \begin{matrix} 0\,1\,2\,3\,4\,5\,6\,7\,8\,9\,a\,b\,c\,d\,e\,f \\ \begin{bmatrix} 1\,0\,0\,0\,0\,0\,0\,0\,0\,1\,1\,1\,1\,1\,1\,1 \\ 0\,1\,0\,0\,0\,1\,1\,1\,0\,0\,0\,0\,1\,1\,1\,1 \\ 0\,0\,1\,0\,0\,0\,1\,1\,1\,0\,1\,1\,0\,0\,1\,1 \\ 0\,0\,0\,1\,0\,1\,0\,1\,1\,1\,0\,1\,0\,1\,0\,1 \\ 0\,0\,0\,0\,1\,1\,1\,0\,1\,1\,1\,0\,1\,0\,0\,1 \end{bmatrix} \end{matrix}$$ 601

$$G' = \begin{matrix} 0\,1\,2\,3\,4\,5\,6\,b\,7\,c\,8\,9\,a\,e\,d\,f \\ \begin{bmatrix} 1\,0\,0\,0\,0\,0\,0\,1\,0\,1\,0\,1\,1\,1\,1\,1 \\ 0\,1\,0\,0\,0\,1\,1\,0\,1\,1\,0\,0\,0\,1\,1\,1 \\ 0\,0\,1\,0\,0\,0\,1\,1\,1\,0\,1\,0\,1\,1\,0\,1 \\ 0\,0\,0\,1\,0\,1\,0\,1\,1\,0\,1\,1\,0\,0\,1\,1 \\ 0\,0\,0\,0\,1\,1\,1\,0\,0\,1\,1\,1\,1\,0\,0\,1 \end{bmatrix} \end{matrix}$$ 602

Figure 6

Figure 7
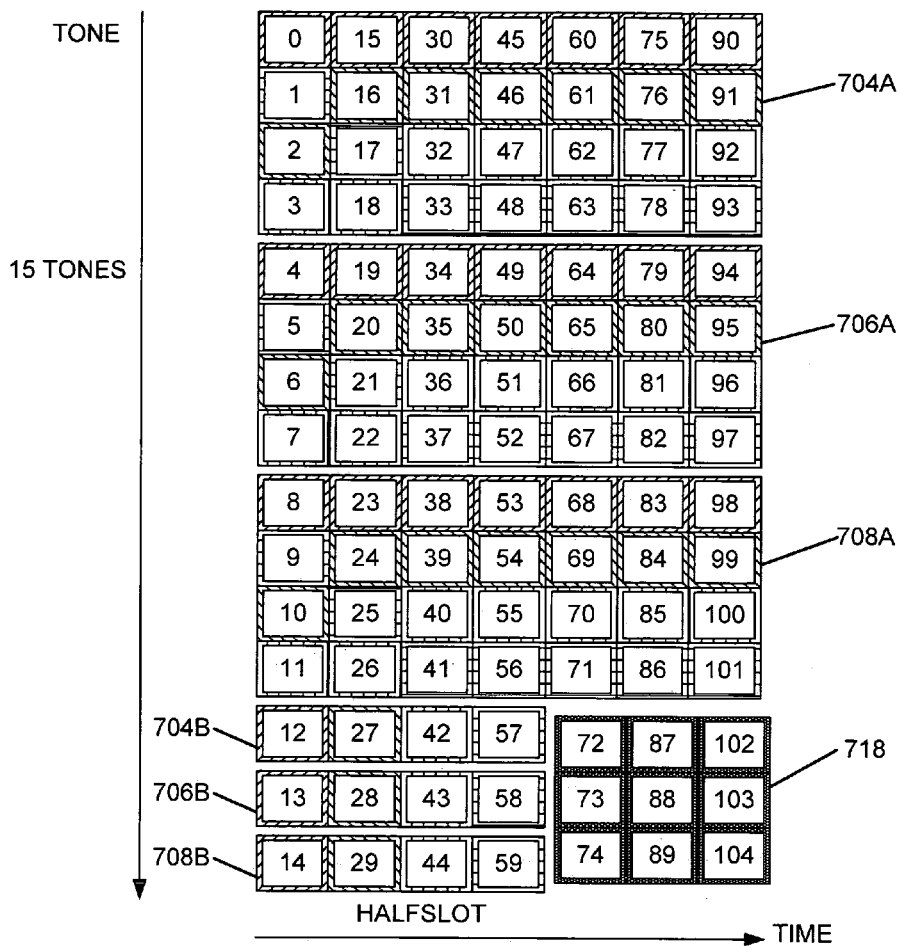
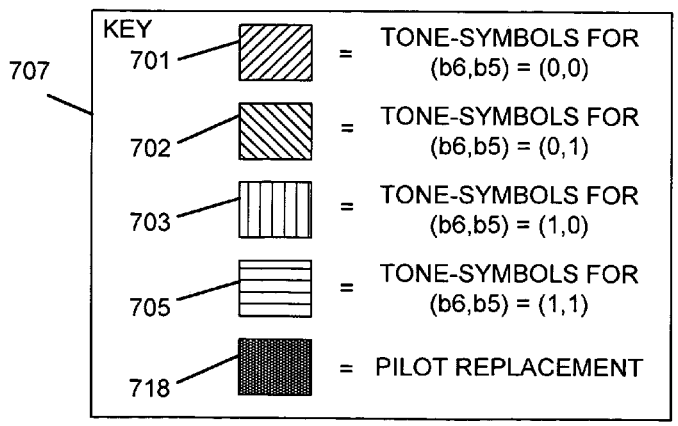

OVERHEAD SIGNALING IN A WIRELESS COMMUNICATION SYSTEM

The present application claims priority to provisional U.S. Application Ser. No. 60/792,182, entitled "IMPROVED METHODS OF FLASH ASSIGNMENT IN A WIRELESS COMMUNICATION SYSTEM," filed Apr. 14, 2006, assigned to the assignee hereof and incorporated herein by reference.

FIELD

The invention relates to a wireless communications system. More particularly, the invention relates to methods and apparatus for communicating overhead signals.

BACKGROUND

Communications system frequently include a plurality of network nodes which are coupled to access nodes, e.g., base stations, through which end nodes, e.g., wireless terminals, are coupled to the network.

In a wireless communication system, effective utilization of the network resources, such as spectrum, requires a base station to efficiently assign wireless terminals for reception and transmission in available traffic channels. Often, to enhance the resource utilization, a dedicated traffic assignment channel, or channel of that nature, is implemented in a wireless communication system. Frequently, the problem in designing traffic assignment channel arises from the fact that assignment channel has to reach every wireless terminal for the assignment to be effective. This universal accessibility, even for wireless terminals residing at low signal-to-noise ratios, requires that the assignment channel to be sent at relatively high power. Sometimes this requirement incurs unnecessary high power to be transmitted at the access nodes, e.g base stations, especially when there are only a few low SNR wireless terminals, and degrades the overall efficiency of the wireless communication system.

To make assignment more power efficient, some wireless communication systems, e.g. Flash-OFDM system, further introduce a special dedicated assignment channel for wireless terminals at low SNRs. Because the bad SNR mobiles are relatively few, the number of bits need to be transmitted for assignment is small and therefore optimal coding only requires a few symbols, in which case sufficiently high power can be assigned to guarantee the reach of the few wireless terminals at low SNRs. Now, since the few number of modulated symbols spread sparsely in time and frequency, the dedicated assignment channel for low SNR wireless terminals can be now more susceptible to impairment prevalent in wireless communication, e.g., frequency selective fading due to multi-path reception and/or fast fading due to mobility of the wireless terminal. Channel fading causes large variations of the channel gain experienced on the few modulated symbols of the dedicated assignment channel for low SNR wireless terminals. While some of the modulated symbols experience much stronger path gain than the mean, other modulated symbols can be deeply faded. Therefore, to make the dedicated assignment channel for low SNR wireless terminal effective and efficient, it is important for the communication method to be robust against fading. In particular, the communication method needs to be robust against the erasure of some portion of the symbols. Often, communication methods designed for Additive White Gaussian Noise (AWGN) channels do not suffice.

In view of the above discussion, it should be appreciated that there is a need for new and improved ways of communicating dedicated assignment signals for low SNRs wireless terminals which are more robust against large variation of channel gains due to e.g., frequency selective fading and fast fading in time.

SUMMARY

Flash signaling is used to modulate dedicated assignment channel for low SNR wireless terminals. Flash signaling, as used herein, allocates high power on selected transmission units, e.g. a tone symbol in an OFDM system, and uses the phase and location of the high power transmission units to communicate information. Henceforth, a dedicated assignment channel for low SNR will be called flash assignment channel. Flash assignment channel resides on a dedicated set of transmission units. Often the dedicated set of transmission units are generally used for other channels, e.g. the regular traffic assignment channel. The signals of flash assignment channel overlay on the signals of the other channel. In general, flash signaling punches the existing signal and replaces it with a flash signal. If the existing signal is a higher priority signal than the flash signal, however, then the overlay has to be carried out differently.

Improved ways of communicating assignment signals using flash signaling are described, e.g., for wireless terminals with low SNR, that are more robust against large variation of channel gains due to e.g., frequency selective fading and fast fading in time. Coding and modulation methods and apparatus that have excellent properties against symbol erasures are described. The use of flash signaling provides an improved assignment channel having strong performance on the fading channel without compromising the performance on the AWGN channel. In one exemplary embodiment, the coding and modulation method can tolerate up to 5 erased symbols out of 8 transmitted symbols. By comparison, an optimal coding and modulation method designed for the AWGN channel can only tolerate up to 4 erased symbols. Given the statistical nature of channel fading, the reduction of the minimal required received symbols dramatically increases the probability of successful communication and thus improves the effectiveness and efficiency of the flash assignment.

Improved ways of organizing flash assignment signals in a sectorized deployment of wireless systems are also described in the present application. Some embodiments reduce or minimize the sector interference on the flash assignment by improving or maximizing orthogonality between different sectors. In addition, some embodiments provide improved ways of swapping flash assignment tone-symbols in the presence other high priority signals, like sector pilots and sector null pilots.

Additional features and benefits are discussed in the detailed description that follows.

BRIEF DESCRIPTION OF THE DRAWINGS

FIG. 6 illustrates two exemplary encoding generator matrices, can be used in the encoding and mapping module in accordance with an aspect.

FIG. 7 illustrates an allocation of tone-symbols for three sectors in a sectorized deployment in accordance with an aspect.

DETAILED DESCRIPTION

Figure 1:
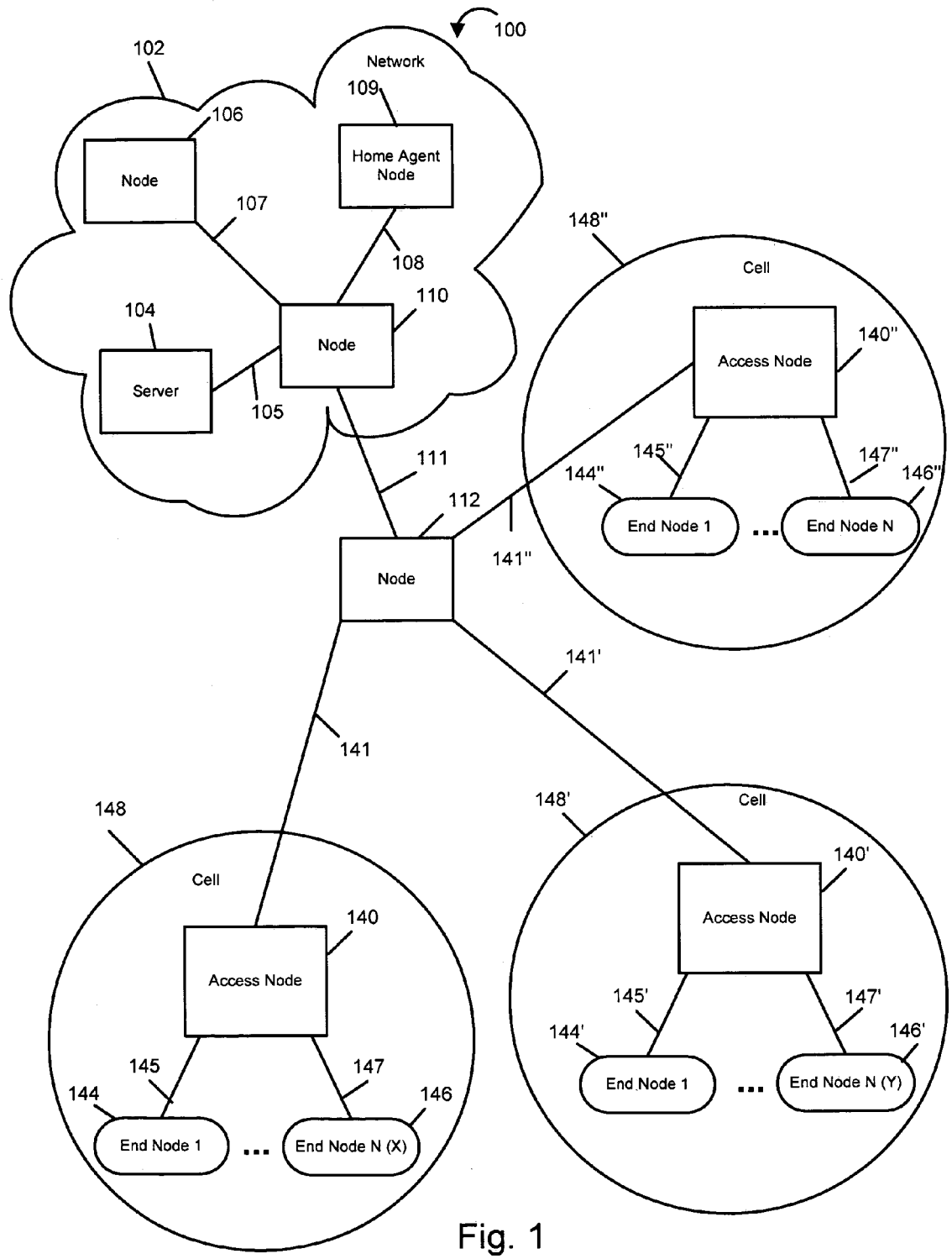
FIG. 1 illustrates a network diagram of an exemplary communications system implemented in accordance with an aspect.

FIG. 1 illustrates an exemplary communication system 100, e.g., a cellular communication network, which comprises a plurality of nodes interconnected by communications links. The network may use OFDM signals to communicate information over wireless links. However, other types of signals, e.g., CDMA signals, might be used instead. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 144, 146, 144', 146', 144", 146", which access the communication system via a plurality of access nodes 140, 140', 140". The end nodes 144, 146, 144', 146', 144", 146" may be, e.g., wireless communication devices or terminals, and the access nodes 140, 140', 140" may be, e.g., wireless access routers or base stations. The exemplary communication system 100 also includes a number of other nodes 104, 106, 109, 110, and 112, used to provide interconnectivity or to provide specific services or functions. Specifically, the exemplary communication system 100 includes a Server 104, used to support transfer and storage of state pertaining to end nodes. The Server node 104 may be an AAA server, or it may be a Context Transfer Server, or it may be a server including both AAA server functionality and Context Transfer server functionality.

The FIG. 1 exemplary system 100 depicts a network 102 that includes the Server 104, the Home Agent node 109 and the node 106, all of which are connected to an intermediate network node 110 by a corresponding network link 105, 108 and 107, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 140, 140', 140" via network links 141, 141', 141", respectively.

Each access node 140, 140', 140" is depicted as providing connectivity to a plurality of N end nodes (144, 146), (144', 146'), (144", 146"), respectively, via corresponding access links (145, 147), (145', 147'), (145", 147"), respectively. In the exemplary communication system 100, each access node 140, 140', 140" is depicted as using wireless technology, e.g., wireless access links, to provide access. A radio coverage area, e.g., communications cell, 148, 148', 148" of each access node 140, 140', 140", respectively, is illustrated as a circle surrounding the corresponding access node.

Alternative embodiments include various network topologies, where the number and type of network nodes, the number and type of access nodes, the number and type of end nodes, the number and type of Servers and Home or other Agents, the number and type of links, and the interconnectivity between nodes may differ from that of the exemplary communication system 100 depicted in FIG. 1.

In various embodiments some of the functional entities depicted in FIG. 1 may be omitted or combined. The location or placement of these functional entities in the network may also be varied.

Figure 2:
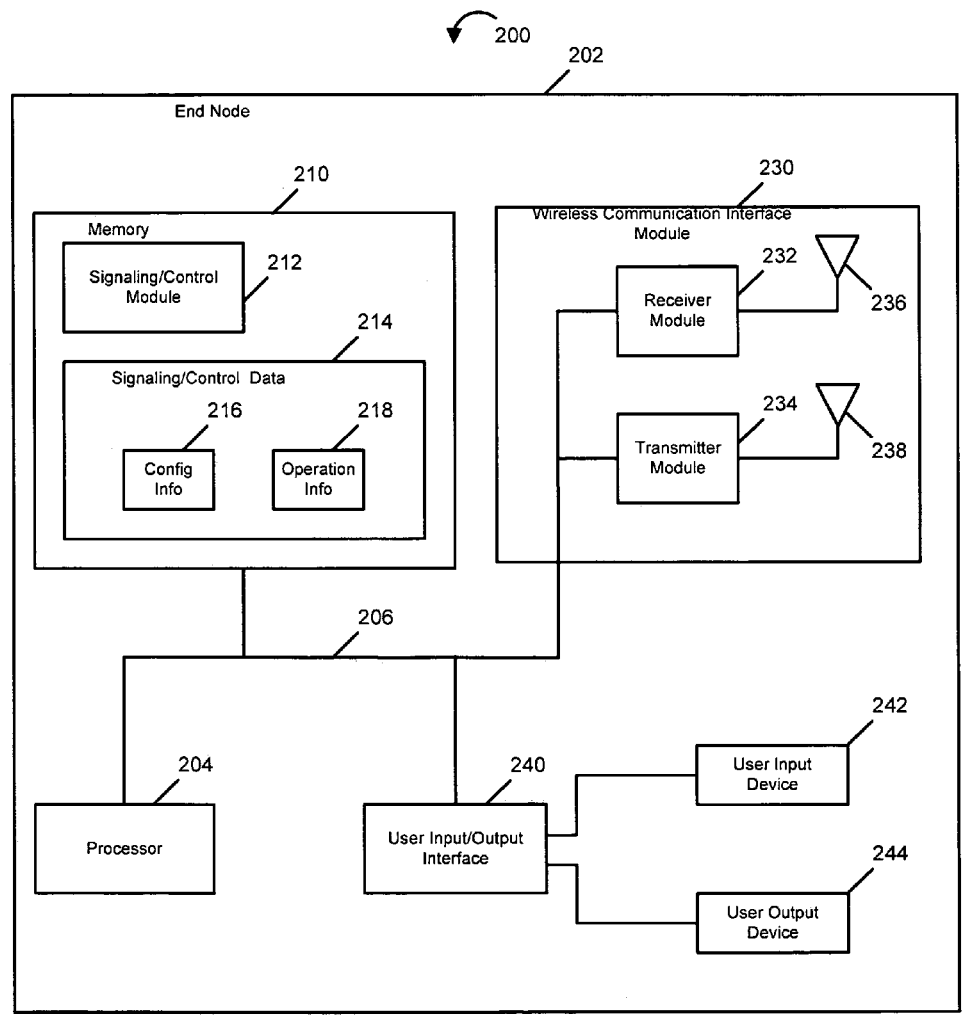
FIG. 2 illustrates an exemplary end node implemented in accordance with an aspect.

FIG. 2 provides a detailed illustration of an exemplary end node 200, e.g., a mobile node. The exemplary end node 200, depicted in FIG. 2, is a detailed representation of an apparatus that may be used as any one of the end nodes 144, 146, 144', 146', 144", 146", depicted in FIG. 1. In the FIG. 2 embodiment, the end node 200 includes a processor 204, a wireless communication interface 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface 230 provides a mechanism by which the internal components of the end node 200 can send and receive signals to/from external devices and network nodes, e.g., access nodes. The wireless communication interface 230 includes, e.g., a receiver module 232 with a corresponding receiving antenna 236 and a transmitter circuit 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish various tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing as discussed below. The modules included in memory 210 are executed on startup or as called by other modules. Modules may exchange data, information, and signals when executed. Modules may also share data and information when executed. In the FIG. 2 embodiment, the memory 210 of end node 200 includes a signaling/control module 212 and signaling/control data 214.

The signaling/control module 212 controls processing relating to receiving and sending signals, e.g., messages, for management of state information storage, retrieval, and processing. Signaling/control data 214 includes state information, e.g., parameters, status and/or other information relating to operation of the end node. In particular, the signaling/control data 214 may include configuration information 216, e.g., end node identification information, and operational information 218, e.g., information about current processing state, status of pending responses, etc. The module 212 may access and/or modify the data 214, e.g., update the configuration information 216 and/or the operational information 218.

Figure 3:
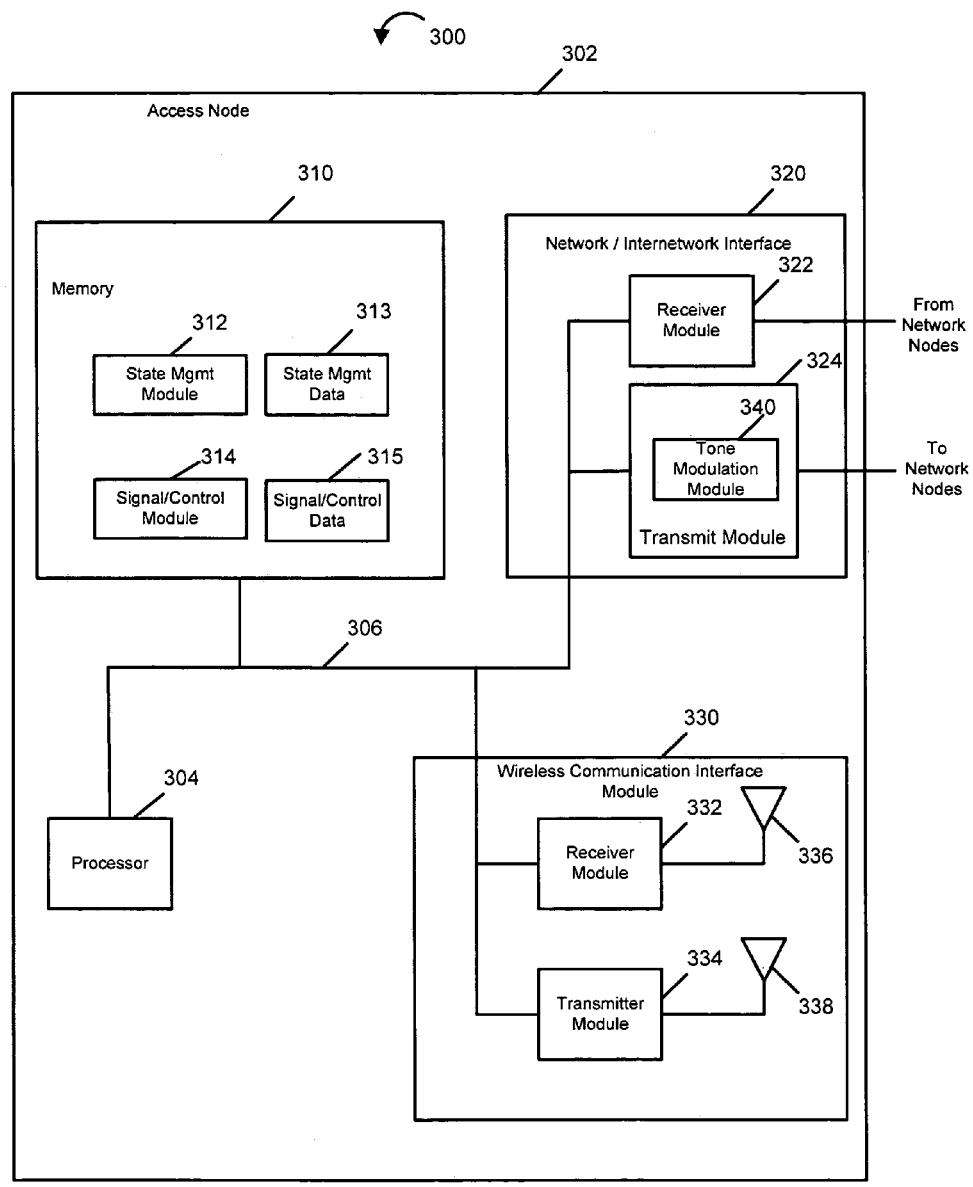
FIG. 3 illustrates an exemplary access node implemented in accordance with an aspect.

FIG. 3 provides a detailed illustration of an exemplary access node 300. The exemplary access node 300, depicted in FIG. 3, is a detailed representation of an apparatus that may be used as any one of the access nodes 140, 140', 140" depicted in FIG. 1. In the FIG. 3 embodiment, the access node 300 includes a processor 304, memory 310, a network/internetwork interface 320 and a wireless communication interface 330, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver module 322 and a transmitter module 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g. end nodes. The wireless communication interface 330 includes, e.g., a receiver module 332 with a corresponding receiving antenna 336 and a transmitter module 334 with a corresponding transmitting antenna 338. The interface 330 is used for coupling the access node 300 to other network nodes, e.g., via wireless communication channels.

The processor 304 under control of various modules, e.g., routines, included in memory 310 controls operation of the access node 300 to perform various signaling and processing. The modules included in memory 310 are executed on startup or as called by other modules that may be present in memory 310. Modules may exchange data, information, and signals when executed. Modules may also share data and information when executed. In the FIG. 3 embodiment, the memory 310 of the access node 300 includes a State Management module 312 and a Signaling/Control module 314. Corresponding to each of these modules, memory 310 also includes State Management data 313 and the Signaling/Control data 315.

The State Management Module 312 controls the processing of received signals from end nodes or other network nodes regarding state storage and retrieval. The State Management Data 313 includes, e.g., end-node related information such as the state or part of the state, or the location of the current end node state if stored in some other network node. The State Management module 312 may access and/or modify the State Management data 313.

The Signaling/Control module 314 controls the processing of signals to/from end nodes over the wireless communication interface 330, and to/from other network nodes over the network/internetwork interface 320, as necessary for other operations such as basic wireless function, network management, etc. The Signaling/Control data 315 includes, e.g., end-node related data regarding wireless channel assignment for basic operation, and other network-related data such as the address of support/management servers, configuration information for basic network communications. The Signaling/Control module 314 may access and/or modify the Signaling/Control data 315.

The Transmit module 324 comprises a Tone modulation module 340. Tone modulation module 340 controls the modulation of tone symbols that are transmitted from access node to end nodes. Tone modulation module encodes user data bits, e.g. information bits, and modulates coded bits to modulation symbols, e.g. QPSK, QAM16, QAM64, QAM256, etc. Tone modulation module further multiplexes modulation symbols from all logical channels together into a whole transmission unit, e.g. an OFDM symbol. The multiplex sometimes involves tone puncture and tone replacement. For example, in the Flash-OFDM system, pilot tone-symbols and sector null tone-symbols have highest priority and punch other symbols.

Figure 4:
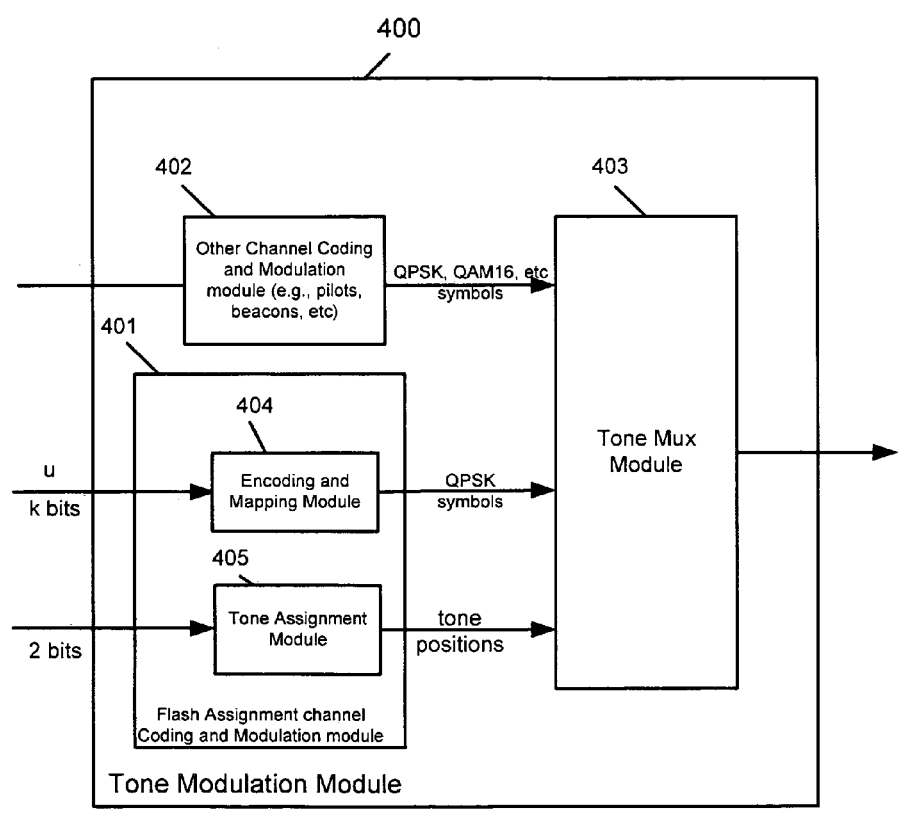
FIG. 4 illustrates the tone modulation operation carried out in the transmitter of an access node in accordance with an aspect.

FIG. 4 illustrates the structure of tone modulation module 340. In focusing on flash assignment channel, the tone modulation module comprises Flash assignment channel coding/modulation module 401 and other channels coding/modulation module 402. The other channel coding/modulation module 402 controls the coding and modulation of channel others than flash assignment. That includes traffic channel, pilot channel, sector null channel, etc. The flash assignment channel 401 controls the coding and modulation of flash assignment channel. In a nutshell, the flash assignment channel takes k+2 information bits, e.g. 7 bits, and generates m QPSK symbols, e.g. 8 QPSK symbols. In particular, the flash assignment channel coding and modulation module does the coding and modulation in two parallel steps, carried out by encoding and mapping module 404 and tone assignment module 405 respectively. Encoding and mapping module 404 uses k of total k+2 information bits to generate m QPSK symbols; and tone assignment module 405 uses 2 of the total k+2 information bits to generate the positions of the m QPSK symbols. The tone modulation module further comprises Tone multiplex module 403. Tone multiplex module 403 comprises modulation symbols from all logical channels with their specified position into a whole transmission unit, e.g. an OFDM symbol. In an exemplary Flash-OFDM system, the OFDM symbol is sampled and modulated to carrier frequency for transmission to the end node.

Figure 5:
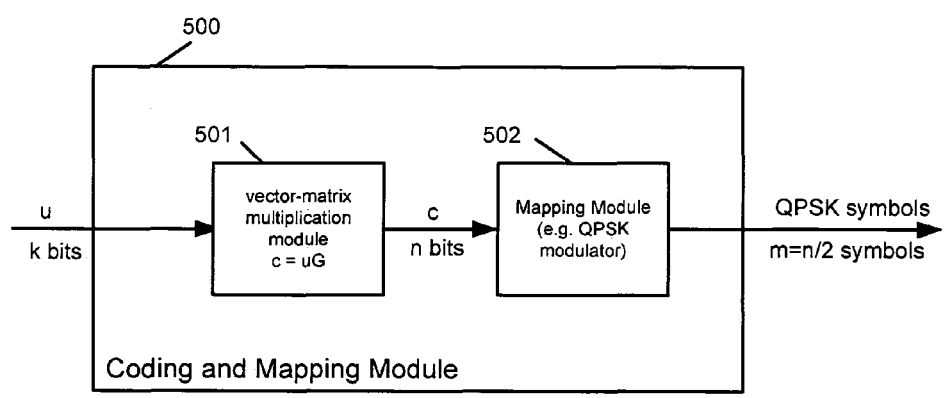
FIG. 5 illustrates the encoding and mapping module that translate information bits to QPSK symbols in accordance with an aspect.

FIG. 5 illustrates the coding and mapping module 404 included in flash assignment channel coding and modulation module 401. The coding and mapping module 500 comprises vector-matrix multiplication module 501 and mapping module 502. The coding and mapping module 500 takes a vector u of k information bits and encodes and maps the coded bit vector c to m QPSK symbols. The vector-matrix multiplication module 501 performs a vector-matrix multiplication operation $c=uG$ that encodes information bit vector u into coded bits vector c of length n. In one embodiment, k is an odd number and n is an even number. In another embodiment, k is 5 and n is 16. The n coded bits, e.g. 16 coded bits, are then grouped adjacently into m=n/2 pairs $(c15, c14)$, $(c13, c12)$, ..., $(c1, c0)$. Each pair $(c(2i+1), c(2i))$ produces one QPSK symbol $s(i)$, for $i=7, \ldots, 0$, as illustrated in mapping module 501.

FIG. 6 illustrates two exemplary generator matrix used in vector-matrix multiplication module 501. In one embodiment, generator matrix G is a 5 by 16 binary matrix. A codeword c is a vector generated by multiplying the input row vector u by G, i.e. $c=uG$. Here u is the information bits vector of length 5.

In communication, properties of the codes generated by generator matrix G is of major importance. Conventionally, the metric for good codes is minimum distance. The higher the minimum distance is, the better performance the code has in the presence of Gaussian noise. At the specified code rate, e.g. 5/16, and block length, e.g. 16, one of the optimal codes is a Hamming code, as given by the generator matrix G 601. However for the code used on the flash assignment in a wireless communication, properties against fading is another important metric. For example, the code generated by matrix 601 only can tolerate 3 symbols erasures. However, since the permutation of the columns of the generator matrix does not change the distance properties of the resulting code, it is reasonable to expect a better property against fading by permuting the columns. In the following, we develop the methods to choose the right set of permutations, for the embodiment of 5 information bits and 16 coded bits. The principles described below can be applied to other numbers of information bits and coded bits.

We start with the standard (5, 16) Hamming code illustrated in matrix G 601. The matrix G 601 presents the standard (5, 16) Hamming code in its systematic form, where columns are indexed as 0, 1, 2, ..., f in hex format, from the leftmost to the rightmost column. We consider generator matrices generated by permuting the columns of matrix G 601. Given a permutation p, we denote p(G) as the matrix permuting the columns of G by p. Since adjacent bits are paired together, each pair generating one of the 8 modulation symbols, different permutation of the columns has different code performance against fading. Consider the extreme case of frequency selective fading that symbols are essentially erased when faded. For any permutation, there is a fixed maximum number v that if some v+1 symbols are erased, then the set of 5 information bits cannot be uniquely determined, but if any v symbols are erased, the set of 5 information bits can be uniquely determined. For example, such a maximum number k for the matrix G 801 is 4. Let us define the maximum number k for a matrix G as v(G). Consider then the matrix G' 602, which is given by a column permutation [0 1 2 3 4 5 6 b 7 c 8 9 a e d f] on matrix G 601. The number v(G')=5.

In the following, we search all the permutations p of columns, such that the permutated matrix p(G) by the permutation p has the property v(p(G))=5. For convenience in this description, we introduce some equivalence relation on the permutation. This allows us to refer to a smaller set of permutations (having only 5760 permutations). We will list all 5760 permutations of the smaller set below. The discussion is applicable to all permutations of the 5760 permutations that follow any combination of the following two rules. First, two permutations p1 and p2 are equivalent if we can obtain p1 via p2 by permuting the numbers in adjacent pairs. So, for example, a first permutation [0 1 2 3 4 5 6 7 8 9 a b c d e f] is equivalent to a second permutation [2 3 0 1 4 5 8 9 a b e f 6 7 c d]. The pair "0 1" has been interchanged (permuted) with the pair "2 3". Also, the pair "c d" has been moved (permuted) to the right, so that the pair "c d" is the last pair in the second permutation. Also, the pair "6 7" has been moved (permuted) three pairs to the right so that the pair "6 7" is to the right of the pair "e f". The first and second permutations are equivalent.

Second, two permutations p1 and p3 are equivalent if we can obtain p1 via p3 by swapping the numbers in any subset of the 8 pairs. So, for example, first permutation [0 1 2 3 4 5 6 7 8 9 a b c d e f] is equivalent to third permutation [1 0 2 3 5 4 6 7 8 9 a b d c e f]. The "–0" and "1" of the "0 1" pair of the first permutation have been reversed to "1 0" in the third permutation. The first and third permutations are equivalent. The transitive property applies to the equivalence of permutations. Thus, for example, in the above two examples, the second permutation is equivalent to the third permutation, because they are both equivalent to the first permutation. Alternatively state, the second and third permutations are equivalent because one can be obtained from the other by a combination of the first and second rules above.

We now define the following equivalence relationship for two generator matrices. Definition: two matrices p1(G) and p2(G) are equivalent if and only if p1 and p2 are equivalent. Using the equivalent relationship, we can describe the generator matrices, by specifying the permutations, in a canonical form. In particular, we specify the permutation by the form [(a1 b1) (a2 b2) (a3 b3) . . . (a8 b8)], where a1<a2< . . . <a8, and a1<b1, a2<b2, . . . , a8<b8. In each equivalent class, such a permutation is unique and thus is chosen as the representative to be specified here. By going through all the possible combinations of representative of equivalent classes, we obtain the following 5760 generator (representative) matrices that have the property v(G')=5. In the description, we list the permutations instead of matrices, with the understanding there is a one-to-one correspondence between permutation p and generator matrix G'=v(G). In each row, we list four permutations.

For example, the permutation [0123456b7c89aedf] generates the matrix G' 602 in FIG. 6.

List: 5760 Generator Matrices with the Desired Property

| | | | |
|---|---|---|---|
| 0123456b7c89aedf | 0123456c798badef | 0123456c7f8d9eab | 0123456d7a89bfce |
| 0123465b7c8a9def | 0123465c7a8b9edf | 0123465c7f8e9bad | 0123465e798abfcd |
| 0123475b6e89afcd | 0123475d6b8a9fce | 0123475d6f8e9bac | 0123475f6e8d9cab |
| 012349586b7fadce | 012349586e7abcdf | 0123495b6d78acef | 0123495e678dacbf |
| 01234a576d8e9cbf | 01234a5b687f9ecd | 01234a5d6879bcef | 01234a5e6b789cdf |
| 01234b576c8e9daf | 01234b586f79aecd | 01234b5c678d9fae | 01234b5f687a9dce |
| 01234d576e8a9fbc | 01234d576f8b9eac | 01234d5e6c789baf | 01234d5f687c9bae |
| 01234e586f7c9dab | 01234e5c6d789fab | 01234e5d6789afbc | 01234e5f678b9cad |
| 012435697d8abcef | 0124356b7c89afde | 0124356d7a89becf | 0124356f7d8c9eab |
| 0124365a7e89bfcd | 0124365c7a8b9fde | 0124365c7f8e9abd | 0124365f7e8c9dab |
| 0124375a6d8b9cef | 0124375d6b8a9ecf | 0124375d6f8e9abc | 0124375e698bafcd |
| 012439586b7eadcf | 012439586f7abcde | 0124395a687cbdef | 0124395e678cafbd |
| 01243a567d8e9cbf | 01243a58697fbecd | 01243a5d678c9fbe | 01243a5f6b789cde |
| 01243b567c8e9daf | 01243b5a6f789ecd | 01243b5c6978adef | 01243b5e687a9dcf |
| 01243c567e8b9fad | 01243c567f8a9ebd | 01243c5e687d9abf | 01243c5f6d789abe |
| 01243e586d7f9cab | 01243e5c6789adbf | 01243e5d687c9fab | 01243e5f678a9dbc |
| 012534697d8abfce | 0125346c798bafde | 0125346c7f8d9abe | 0125346f7d8c9bae |
| 0125374d6e8a9bcf | 0125374d6f8b9ace | 0125374e6b8c9daf | 0125374f6b8d9cae |
| 012538496b7facde | 012538496e7abdcf | 0125384a697ebfcd | 0125384f6c7e9dab |
| 012539486b7eacdf | 012539486f7abdce | 0125394a678dbecf | 0125394e687dabcf |
| 01253b486e79afcd | 01253b49678caedf | 01253b4e687f9acd | 01253b4f678a9dce |
| 01253c467e8b9adf | 01253c467f8a9bde | 01253c4e6978afbd | 01253c4f6879aebd |
| 01253e467a8d9cbf | 01253e496c78abdf | 01253e4a6f789bcd | 01253e4d6879acbf |
| 01253f467a8c9dbe | 01253f486e7d9cab | 01253f4a678b9cde | 01253f4d6978acbe |

-continued

| | | | |
|---|---|---|---|
| 0126345a7e89bcdf | 0126345b7c8a9fde | 0126345e798abdcf | 0126345f7e8c9bad |
| 012637495e8dabcf | 0126374b5c8d9aef | 0126374d5b8c9eaf | 0126374f5b8e9cad |
| 012638495a7dbcef | 0126384b5f7a9cde | 0126384d5f7c9abe | 0126384f5c7d9eab |
| 01263a457d8e9bcf | 01263a485b7e9fcd | 01263a485c79bdef | 01263a4d5789becf |
| 01263b457c8e9adf | 01263b485e7a9cdf | 01263b49578cadef | 01263b4f578a9ecd |
| 01263c475a8d9fbe | 01263c485e7d9baf | 01263c4b5789afde | 01263c4f5879adbe |
| 01263e457a8d9fbc | 01263e475c89abdf | 01263e475f8a9bcd | 01263e4d5879afbc |
| 01263f457a8c9ebd | 01263f475a8e9cbd | 01263f49587cabde | 01263f4b587e9acd |
| 0127345a6d8b9fce | 0127345b6e89adcf | 0127345e698bacdf | 0127345f6e8d9abc |
| 0127354a6d8e9bcf | 0127354b6c8e9adf | 0127354e6b8c9fad | 0127354f6b8d9eac |
| 0127364d5b8c9fae | 0127364e5d89abcf | 0127364e5f8b9acd | 0127364f5b8e9dac |
| 0127384a5e6b9dcf | 0127384b5a6e9fcd | 0127384b5d69acef | 0127384d5e6c9abf |
| 012739465e8cabdf | 012739485b6cadef | 012739485f6dabce | 0127394f586dabce |
| 01273a465d8c9bef | 01273a485f6b9dce | 01273a4d5689bfce | 01273a4f586e9bcd |
| 01273c465a8d9ebf | 01273c485f6d9bae | 01273c4b5689aedf | 01273c4e5869adbf |
| 01273f465a8e9dbc | 01273f485d6c9eab | 01273f4a568b9ecd | 01273f4d5869aebc |
| 0128354a697ebcdf | 0128354b6f79acde | 0128354e6f7c9abd | 0128354f6c7e9bad |
| 012836495a7dbfce | 0128364a5b7f9cde | 0128364a5d79becf | 0128364f5c7d9bae |
| 012837495b6daecf | 0128374b5a6e9cdf | 0128374b5d69afce | 0128374e5c6d9abf |
| 012839465a7cbedf | 012839475b6cafde | 0128394e567dafbc | 0128394f576dacbe |
| 01283a45697fbdce | 01283a465b7e9dcf | 01283a465c79bfde | 01283a4f576e9cbd |
| 01283b456e79adcf | 01283b475a6f9dce | 01283b475c69aedf | 01283b4e567f9cad |
| 01283e456d7f9bac | 01283e465d7c9baf | 01283e49576cadbf | 01283e4a576f9dbc |
| 01283f456e7d9abc | 01283f475d6c9abe | 01283f49567caebd | 01283f4b567e9dac |
| 012934567e8dacbf | 012934576e8cafbd | 0129345a4687fbdce | 0129345b6f78acde |
| 012935467e8dabcf | 012935486b7dafce | 012935486c7abedf | 0129354e678abdcf |
| 012937456e8cabdf | 012937485b6faecd | 0129374e568abfcd | 0129374f5d68abce |
| 012938456b7daecf | 012938456c7abfde | 012938465a7fbecd | 0129384f5d67acbe |
| 01293b4d5678afce | 01293b4d5768aecf | 01293b4e5d6f7a8c | 01293b4f5c6e7a8d |
| 01293c4a5768bedf | 01293c4a5768bfde | 01293c4e5a6f7d8b | 01293c4f5b6e7d8a |
| 01293e45678bacdf | 01293e46578bafcd | 01293e4a5c6b7f8d | 01293e4d5b6c7f8a |
| 01293f465c78abde | 01293f485c67aebd | 01293f4a5d6b7e8c | 01293f4d5a6c7e8b |
| 012a34576c8d9fbe | 012a3458697cbedf | 012a345b687d9ecf | 012a345f6879bcde |
| 012a36485b7d9cef | 012a36485f79becd | 012a3649578ebdcf | 012a364d587e9bcf |
| 012a37456d8c9bef | 012a37485c6b9edf | 012a3749568ebcdf | 012a374f5e689bcd |
| 012a38456978cbdef | 012a38475c6b9fde | 012a384d567e9fbc | 012a384f5e679cbd |
| 012a3b45678d9ecf | 012a3b47568d9cef | 012a3b4d5e6f798c | 012a3b4f5c6d798e |
| 012a3c47586f9bde | 012a3c48576f9ebd | 012a3c4b5f697e8d | 012a3c4f5b6d7e89 |
| 012a3e495f6b7c8d | 012a3e4b57689fcd | 012a3e4b58679cdf | 012a3e4d5b6f7c89 |
| 012a3f456789bcde | 012a3f475689becd | 012a3f495e6b7d8c | 012a3f4b5c697d8e |
| 012b34567c8d9fae | 012b34586d79aecf | 012b345a6c789edf | 012b345f6978adce |
| 012b35467c8d9aef | 012b35486d79acef | 012b354a678c9edf | 012b354f6789adce |
| 012b36485d7a9fce | 012b364a578c9def | 012b364d587f9ace | 012b364f5789aecd |
| 012b38465d7a9ecf | 012b38475a6c9def | 012b38475f69aecd | 012b384f567d9eac |
| 012b3946578eadcf | 012b3947568eacdf | 012b394e5f6d7a8c | 012b394f5e6c7a8d |
| 012b3a4d5f6e798c | 012b3a4e56789fcd | 012b3a4e58679dcf | 012b3a4f5d6c798e |
| 012b3c47586e9adf | 012b3c48576e9fad | 012b3c4a5e697f8d | 012b3c4e5a6d7f89 |
| 012b3f465e789acd | 012b3f485e679dac | 012b3f4a5d697c8e | 012b3f4d5a6e7c89 |
| 012c34567d8b9eaf | 012c34567f89adbe | 012c34586d7e9abf | 012c345e6f789abd |
| 012c3547698eafbd | 012c35486c7e9fab | 012c354b6789afde | 012c354f687a9ebd |
| 012c36457d8b9aef | 012c36457f89abde | 012c364d5a789fbe | 012c364f587a9dbe |
| 012c3745698eadbf | 012c37485e6f9dab | 012c374b568a9def | 012c374d5a689ebf |
| 012c39475f68abde | 012c39485f67adbe | 012c394b5a6f7d8e | 012c394f5e6b7d8a |
| 012c3a495678bdef | 012c3a495867bfde | 012c3a4d5f697e8b | 012c3a4f5d6b7e89 |
| 012c3b475d689aef | 012c3b485d679eaf | 012c3b495a6d7f8e | 012c3b4d5e697f8a |
| 012c3e456789fad | 012c3e47586b9daf | 012c3e495f6d7a8b | 012c3e4b5d6f7a89 |
| 012d34576c8a9ebf | 012d34576f89aebc | 012d34586e7c9baf | 012d345e687f9bac |
| 012d3546798eafbc | 012d35476c8a9bef | 012d35476f89abce | 012d354e687a9fbc |
| 012d3645798eacbf | 012d36495f78abce | 012d364a5c789bef | 012d364e587a9cbf |
| 012d38456e7c9fab | 012d38465e7f9cab | 012d38495f67aebc | 012d384a5c679ebf |
| 012d394a5b6f7c8e | 012d394b5768acef | 012d394b5867afce | 012d394e5f6b7c8a |
| 012d3a45678b9fce | 012d3a46578b9cef | 012d3a495b6c7f8e | 012d3a4e5c6b7f89 |
| 012d3c465b789eaf | 012d3c475b689fae | 012d3c4a5e6f798b | 012d3c4b5f6e798a |
| 012d3f456b789eac | 012d3f47586b9cae | 012d3f495e6c7a8b | 012d3f4b5c6e7a89 |
| 012f3546798cadbe | 012f3547698dacbe | 012f354a687c9bde | 012f354b687d9ace |
| 012f3645798caebd | 012f36485d7e9bac | 012f3649578bacde | 012f364e5a789cbd |
| 012f3745698daebc | 012f37485c6e9bad | 012f3749568badce | 012f374e5a689dbc |
| 012f38465d7e9abc | 012f38475c6e9abd | 012f384a567c9dbe | 012f384b567d9cae |
| 012f3946578abcde | 012f3947568abdce | 012f394a5b6d7e8c | 012f394b5a6c7e8d |
| 012f3a456c789bde | 012f3a48576c9dbe | 012f3a495b6e7d8c | 012f3a4e5c697d8b |
| 012f3b456d789ace | 012f3b48576d9cae | 012f3b495a6e7c8d | 012f3b4e5a6d7c89 |
| 012f3e465b789cad | 012f3e475b689dac | 012f3e4a5c6d798b | 012f3e4b5d6c798a |
| 0213465c798eabdf | 0213465c7a8d9bef | 0213465d7c8a9ebf | 0213465e7f8a9dbc |
| 021347596e8dabcf | 0213475b6e8f9acd | 0213475c6d8b9fae | 0213475e6f8b9dac |
| 02134859b67caedf | 021348596d7abfce | 021348596e7cadbf | 021348596e7cadbf |
| 021349576e8dacef | 021349586d7faebc | 021349586e7cadbf | 021349586b678eacdf |
| 02134b567a8f9dce | 02134b576a8e9dcf | 02134b5c6e789fad | 02134b5d6f789eac |
| 02134c56798badef | 02134c567f8d9eab | 02134c576d8e9abf | 02134c5e6b789adf |
| 02134d567c8f9bae | 02134d586f79abce | 02134d5b6789afce | 02134d5e6a789bcf |
| 02134e576b8a9fcd | 02134e586f7a9bcd | 02134e59678badcf | 02134e5d678f9abc |

-continued

| | | | |
|---|---|---|---|
| 021436597e8cabdf | 0214365a7e8f9bcd | 0214365d7c8a9fbe | 0214365e7f8a9cbd |
| 0214375c6d8b9eaf | 0214375d698eabcf | 0214375d6b8c9aef | 0214375e6f8b9cad |
| 0214385 96b7cafde | 0214385 96d7abecf | 0214385a6f7b9ecd | 0214385c697badef |
| 0214395 67a8cbdef | 0214395 86d7eafbc | 0214395 86f7cadbe | 0214395a678ebdcf |
| 02143a567b8e9cdf | 02143a576b8f9cde | 02143a5c687f9ebd | 02143a5d687e9fbc |
| 02143c576d8f9abe | 02143c58697fabde | 02143c5a678b9fde | 02143c5e687b9adf |
| 02143d567c8e9baf | 02143d57698abcef | 02143d576f8c9eab | 02143d5e687a9bcf |
| 02143e567a8b9fcd | 02143e586b7f9acd | 02143e59678abcdf | 02143e5c678f9bad |
| 021536497b8caedf | 0215364c798bafde | 0215364c7f8d9abe | 0215364f7b8a9dce |
| 021537496b8dafce | 0215374d698baecf | 0215374d6e8c9abf | 0215374e6b8a9cdf |
| 0215384c697eadbf | 0215384d6f79acbe | 0215384e6f7a9cbd | 0215384f6a7e9dbc |
| 021539467a8cbfde | 0215394 76a8dbecf | 0215394e687badcf | 0215394f6b78acde |
| 02153c46798abedf | 02153c467e8d9baf | 02153c48697faebd | 02153c4f6e789abd |
| 02153d47698abfce | 02153d476f8c9bae | 02153d486e79afbc | 02153d4e687f9abc |
| 02153e467a8b9dcf | 02153e486b7f9dac | 02153e496a78bcdf | 02153e4c6f789bad |
| 02153f476a8b9cde | 02153f486e7b9cad | 02153f49687abdce | 02153f4d687e9bac |
| 021634597e8cadbf | 0216345a7e8f9dbc | 0216345c798eafbd | 0216345c7a8d9fbe |
| 021635497b8cadef | 0216354b7a8f9cde | 0216354d7c8f9abe | 0216354f7b8a9ecd |
| 021637495b8eafcd | 0216374b5a8d9ecf | 0216374d5b8a9cef | 0216374f5e8d9abc |
| 02163a457b8e9dcf | 0216 3a475b8c9fde | 02163a4d5978becf | 02163a4f5879bcde |
| 02163c45798abdef | 02163c457e8d9fab | 02163c485e7b9daf | 02163c4b5978afde |
| 02163d457c8e9abf | 02163d485e7a9cbf | 02163d495a78bcef | 02163d4f5c789eab |
| 02163e47598abfcd | 02163e475c8f9dab | 02163e485b7c9fad | 02163e4b5879adcf |
| 02163f475e8c9abd | 02163f485a7c9ebd | 02163f49587abecd | 02163f4d587e9cab |
| 021734596e8dafbc | 0217345b6e8f9cad | 0217345d698eacbf | 0217345d6b8c9fae |
| 0217354b6a8e9cdf | 0217354c6d8e9baf | 0217354d698bacef | 0217354d6e8c9fab |
| 0217364b5a8d9fce | 0217364e598bafcd | 0217364e5d8f9cab | 0217364f5e8d9bac |
| 0217384c5e6b9daf | 0217384d5e6a9cbf | 0217384e5a6d9fbc | 0217384f5b6d9eac |
| 021739456a8dbcef | 0217394 65a8ebfcd | 02173 94c5b68adef | 02173 94f586baecd |
| 02173a456b8f9dce | 02173a465b8c9edf | 02173a4d5968bfce | 02173a4e5869bcdf |
| 02173c456d8f9bae | 02173c465a8b9def | 02173c4b5968aedf | 02173c4f586e9dab |
| 02173f456a8b9ecd | 02173f465e8c9bad | 02173f4b5869adce | 02173f4c5d689eab |
| 0218345a6f7b9dce | 0218345c6ba7f9cde | 0218345c697baedf | 0218345c6da79becf |
| 021835496d7facbe | 021835496e7cafbd | 0218354c697eabdf | 0218354f6a7e9bcd |
| 0218374b5c6e9daf | 0218374b5d6f9cae | 0218374e5a6d9bcf | 0218374f5b6d9ace |
| 021839456d7eacbf | 021839456f7caebd | 0218394c5b67afde | 0218394e567bafcd |
| 02183a465c7f9dbe | 02183a465d7e9cbf | 02183a4e5769bdcf | 02183a4f5679bdce |
| 02183d456e79abcf | 02183d495a67bfce | 02183d4e567f9cab | 02183d4f5c679bae |
| 02183e465b7c9adf | 02183e49576abfcd | 02183e4b5679acdf | 02183e4c576f9dab |
| 02183f456e7b9acd | 02183f465a7c9bde | 02183f4b5769acde | 02183f4c5d679abe |
| 021934567f8caebd | 021934576f8dacbe | 0219345a6e78bdcf | 0219345b687eacdf |
| 021935467f8cabde | 021935486a7cbedf | 021935486d7bafce | 0219354f678bacde |
| 021937456f8dabce | 0219374 85a6ebfcd | 0219374e5c68abdf | 0219374f568baecd |
| 021938456a7cbfde | 021938456d7baecf | 021938465b7eafcd | 0219384e5c67afbd |
| 02193a4c5678bedf | 02193a4c5768bfde | 02193a4e5d6f7b8c | 02193a4f5c6e7b8d |
| 02193d4b5678afce | 02193d4b5768aecf | 02193d4e5a6f7c8b | 02193d4f5b6e7c8a |
| 02193e465d78abcf | 02193e485d67acbf | 02193e4b5c6a7f8d | 02193e4c5b6d7f8a |
| 02193f45678abdce | 02193f46578abecd | 02193f4b5d6a7e8c | 02193f4c5a6d7e8b |
| 021a34576f8e9cbd | 021a34586b7e9cdf | 021a3459687fbcde | 021a345d687b9ecf |
| 021a3648597fbecd | 021a36485d7b9cef | 021a364b578c9fde | 021a364f587c9bde |
| 021a37456f8e9bcd | 021a37485e69bcdf | 021a374b568c9edf | 021a374d5c689bef |
| 021a38456b7e9fcd | 021a38475e69bdcf | 021a384d5c679bfe | 021a384f567c9ebd |
| 021a3945678fbcde | 021a3947568fbecd | 021a394d5e6f7b8c | 021a394f5c6d7b8e |
| 021a3c495768bdef | 021a3c495867bedf | 021a3c4b5d697e8f | 021a3c4f596d7e8b |
| 021a3d45678b9ecf | 021a3d47568b9cef | 021a3d495e6b7f8c | 021a3d4b5c697f8e |
| 021a3e47586d9bcf | 021a3e48576d9fbc | 021a3e495d6b7c8f | 021a3e4d596f7c8b |
| 021b34567f8e9dac | 021b34586e7a9dcf | 021b34596f78adce | 021b345c6a789edf |
| 021b35467f8e9acd | 021b35486e7a9fcd | 021b3549678fadce | 021b354c678a9edf |
| 021b36485e79acdf | 021b3649578faecd | 021b364c578a9def | 021b364e587c9adf |
| 021b38465e79adcf | 021b3847596faecd | 021b38475c6a9def | 021b384e567c9fad |
| 021b394c5e6f7a8d | 021b394d5678acef | 021b394d5867aecf | 021b394e5c6d7a8f |
| 021b3a46578d9ecf | 021b3a47568d9fce | 021b3a4c5d6f798e | 021b3a4d5c6e798f |
| 021b3c465d789aef | 021b3c485d679fae | 021b3c495e6a7f8d | 021b3c4e596d7f8a |
| 021b3f47586d9ace | 021b3f48576d9eac | 021b3f495d6a7c8e | 021b3f4d596e7c8a |
| 021c3456798fadbe | 021c34567b8d9eaf | 021c3458697abfde | 021c345a6b789fde |
| 021c35476d8a9fbe | 021c3548697abdef | 021c354b6687e9fad | 021c354f678e9abd |
| 021c3645798fabde | 021c36457b8d9aef | 021c36495e78afbd | 021c364b587e9daf |
| 021c37456d8a9ebf | 021c37485a6b9def | 021c37495e68abdf | 021c374f568e9dab |
| 021c3a456f789ebd | 021c3a47586f9dbe | 021c3a4d5697e8f | 021c3a4f596b7e8d |
| 021c3d475b689aef | 021c3d485b679eaf | 021c3d4b5a6f798e | 021c3d4f5e6b798a |
| 021c3e495b6d7a8f | 021c3e4b596f7a8d | 021c3e4d56789fab | 021c3e4d58679abf |
| 021c3f475968abde | 021c3f485967adbe | 021c3f495a6d7b8e | 021c3f4d5e697b8a |
| 021d3457698faebc | 021d34576a8c9ebf | 021d34586e79afce | 021d345d687a9fce |
| 021d35467c8b9eaf | 021d3547698fabce | 021d35476a8c9bef | 021d354b687f9eac |
| 021d36457c8b9fae | 021d364b587f9cae | 021d364c5a789bef | 021d364f5978abce |
| 021d38456b79acef | 021d38465b7a9cef | 021d384c5a679ebf | 021d384f5967aebc |
| 021d39465e78afbc | 021d39475e68acbf | 021d394e5a6b7c8f | 021d394f5b6a7c8e |
| 021d3a456e789fbc | 021d3a47586e9cbf | 021d3a4c5b697f8e | 021d3a4e596b7f8c |
| 021d3c4b5a6e798f | 021d3c4e57689fab | 021d3c4e58679baf | 021d3c4f5e6a798b |
| 021d3f45678e9bac | 021d3f46578e9cab | 021d3f4b596e7a8c | 021d3f4c5e697a8b |

| | | | |
|---|---|---|---|
| 021f35467e8b9cad | 021f35476e8a9cbd | 021f354c687a9bde | 021f354d687b9ace |
| 021f36457e8b9dac | 021f36485a79bdce | 021f36495d78acbe | 021f364e578c9abd |
| 021f37456e8a9dbc | 021f37485b69adce | 021f37495d68aebc | 021f374e568c9bad |
| 021f38465a79bcde | 021f38475b69acde | 021f384c567a9dbe | 021f384d567b9cae |
| 021f39465c78adbe | 021f39475c68aebd | 021f394c5a6b7e8d | 021f394d5b6a7e8c |
| 021f3c456a789bde | 021f3c48576a9dbe | 021f3c495a6e7b8d | 021f3c4e5d697b8a |
| 021f3d456b789ace | 021f3d48576b9cae | 021f3d495b6e7a8c | 021f3d4e5c697a8b |
| 021f3e46578d9abc | 021f3e47568d9bac | 021f3e4c5d6b798a | 021f3e4d5c6a798b |
| 0312456c798eabdf | 0312456c7a8d9bef | 0312456d7f89aebc | 0312456e7c89adbf |
| 0312475d6a8e9bcf | 0312475d6b8f9ace | 0312475e6c8b9daf | 0312475f6d8b9cae |
| 031248596b7fadce | 031248596e7abcdf | 0312485b6a7c9def | 0312485e6a79bfcd |
| 03124a576b8d9cef | 03124a5b678e9cdf | 03124a5d687c9ebf | 03124a5e687f9dbc |
| 03124b56798faecd | 03124b59678daecf | 03124b5d6c789eaf | 03124b5f6e789cad |
| 03124c567a8b9edf | 03124c567f8e9bad | 03124c5b6d789aef | 03124c5e678d9abf |
| 03124d576a8b9ecf | 03124d576e8f9abc | 03124d5b6789afce | 03124d5f6879abce |
| 03124e567c8f9dab | 03124e576b89afcd | 03124e596d78abcf | 03124e5f687a9bcd |
| 031425697d8fabce | 0314256a7d8c9bef | 0314256d7f89acbe | 0314256e7c89afbd |
| 0314275a6e8d9bcf | 0314275b6e8c9adf | 0314275e6c8b9fad | 0314275f6d8b9eac |
| 0314285a6c7b9edf | 0314285b6a7c9fde | 0314285e6a79bdcf | 0314285f697badce |
| 031429567b8dacef | 031429586c7fadbe | 031429586e7dafbc | 0314295b678facde |
| 03142a56798cbedf | 03142a57698dbecf | 03142a5e687d9fbc | 03142a5f687c9ebd |
| 03142c57698bafde | 03142c586d7b9aef | 03142c5a687f9bde | 03142c5e678f9abd |
| 03142d56798bafce | 03142d576a89bcef | 03142d576c8f9eab | 03142d5b687f9ace |
| 03142e567c8d9fab | 03142e586d79abcf | 03142e5a6789bcdf | 03142e5f678c9bad |
| 031524697d8faebc | 0315246a7d8c9ebf | 0315246c798eafbd | 0315246c7a8d9fbe |
| 0315264a7b8c9edf | 0315264b798facde | 0315264e7c8f9abd | 0315264f7b89adce |
| 0315274a6b8d9fce | 0315274b6987eadcf | 0315274e6b89acdf | 0315274f6d8e9abc |
| 031529467b8daecf | 031529476b8cafde | 0315294e6a78bdcf | 0315294f687abcde |
| 03152c467a89bedf | 03152c467d8e9baf | 03152c486d7b9fae | 03152c4b6a789fde |
| 03152d476a89bfce | 03152d476c8f9bae | 03152d486b7c9eaf | 03152d4b687a9ecf |
| 03152e467c8d9abf | 03152e486d79acbf | 03152e4a6978bcdf | 03152e4f6c789bad |
| 03152f476d8c9abe | 03152f48697cadbe | 03152f4a6879bdce | 03152f4e687d9bac |
| 0316254a7b8c9def | 0316254c7a8b9fde | 0316254c7f8e9abd | 0316254f7b89aecd |
| 0316274a5b8e9fcd | 0316274d5b89acef | 0316274e5a8b9dcf | 0316274e5d8c9abf |
| 0316284c5a7d9ebf | 0316284d5f79acbe | 0316284e5f7a9cbd | 0316284f597daebc |
| 03162a45798cbfde | 03162a47598ebdcf | 03162a4d587b9ecf | 03162a4f5b789cde |
| 03162c457a89bdef | 03162c457d8e9fab | 03162c485a7f9dbe | 03162c4d5a7b7f89 |
| 03162c45798baecf | 03162c4854857f9cae | 03162d4a5978bcef | 03162d4c5f789eab |
| 03162e475a89bfcd | 03162e475f8c9dab | 03162e485d7a9fbc | 03162e4d587f9abc |
| 03162f47598bacde | 03162f4854d7b9eac | 03162f4a5879becd | 03162f4e587d9cab |
| 0317245a6e8d9cbf | 0317245b6e8c9daf | 0317245d6a8e9fbc | 0317245d6b8f9eac |
| 0317254b698eafcd | 0317254d6a8b9fce | 0317254d6e8f9bac | 0317254f6d8e9cab |
| 0317264b598dacef | 0317264c5e8d9fab | 0317264e5a8b9cdf | 0317264e5d8c9baf |
| 0317284c5b6d9fae | 0317284d5e69afbc | 0317284e596dacbf | 0317284f5e6b9cad |
| 031729456b8cadef | 031729465b8faecd | 0317294d5a68bcef | 0317294e586abfcd |
| 03172a45698dbfce | 03172a46598ebcdf | 03172a4c586b9edf | 03172a4f5b689dce |
| 03172c45698baedf | 03172c465e8f9dab | 03172c4b586a9def | 03172c4f5d689bae |
| 03172f456d8c9eab | 03172f46598badce | 03172f4b5a689ecd | 03172f4c586e9bad |
| 031824596b7facde | 031824596e7abdcf | 0318245a6c7b9def | 0318245f697baecd |
| 0318264a5d7c9fbe | 0318264a5e7f9cbd | 0318264c5a7d9bef | 0318264f597dabce |
| 0318274b5d6c9fae | 0318274b5f6e9dac | 0318274d5e69abcf | 0318274f5e6b9acd |
| 031829456c7faebd | 031829456e7dacbf | 0318294d5a67becf | 0318294f567abecd |
| 03182a465e7d9cbf | 03182a465f7c9dbe | 03182a4c576b9fde | 03182a4d567b9fce |
| 03182d456b7c9aef | 03182d4a5967fce | 03182d4b567a9cef | 03182d4c5f679bae |
| 03182e465d7a9bcf | 03182e4a5769bfcd | 03182e4d567f9bac | 03182e4f576c9dab |
| 03182f45697cabde | 03182f465d7b9ace | 03182f4b5a679cde | 03182f4c576e9abd |
| 031924586a7fbcde | 031924586e7badcf | 0319245b687dacef | 0319245f678dacbe |
| 031925486a7fbdce | 031925486e7bacdf | 0319254b678cafde | 0319254f687cabde |
| 031927465f8dabce | 031927485a6dbcef | 0319274b568cadef | 0319274e586cabdf |
| 031928465b7dafce | 031928475a6dbecf | 0319284e576cafbd | 0319284f567cadbe |
| 03192a46578fbcde | 03192a47568fbdce | 03192a4e5f6d7b8c | 03192a4f5e6c7b8d |
| 03192c4a5768bdef | 03192c4a5867bedf | 03192c4b5a6e7d8f | 03192c4f5e6a7d8b |
| 03192d475e68abcf | 03192d485e67afbc | 03192d4a5b6e7c8f | 03192d4e5f6a7c8b |
| 03192e46578badcf | 03192e47568bacdf | 03192e4a5b6d7f8c | 03192e4b5a6c7f8d |
| 031a24567f8c9dbe | 031a24586b7d9cef | 031a245d6978becf | 031a245f678e9cbd |
| 031a26457f8c9bde | 031a2648597cbdef | 031a26485e7b9fcd | 031a264f578b9cde |
| 031a27465f8e9bcd | 031a27485d69bfce | 031a274d586c9bef | 031a274f568b9dce |
| 031a28456b7d9fce | 031a2846597cbfde | 031a28465e7b9dcf | 031a284d576c9fbe |
| 031a294c5678bdef | 031a294c5867bfde | 031a294d5f6e7b8c | 031a294f5d6c7b8e |
| 031a2d456e789bcf | 031a2d48576e9cbf | 031a2d4b596c7f8e | 031a2d4c5e6b7f89 |
| 031a2e4b56789fcd | 031a2e4b58679fcd | 031a2e4d5f697c8b | 031a2e4f5d6b7c89 |
| 031a2f456789bdce | 031a2f465789becd | 031a2f4b596e7d8c | 031a2f4c5e697d8b |
| 031b24567f8d9cae | 031b24596c78adef | 031b245d6879aecf | 031b245f6a789ecd |
| 031b25486d7a9cef | 031b254a678f9dce | 031b254c6789aedf | 031b254d687c9aef |
| 031b26457f8d9ace | 031b26485d79afce | 031b264a578f9ecd | 031b264c5789adef |
| 031b28456b7a9ecf | 031b2847596caedf | 031b28475f6a9dce | 031b284d567c9eaf |
| 031b2945678eadcf | 031b2947568eafcd | 031b294c5f6e7a8d | 031b294e5d6c7a8f |
| 031b2a4c5f6d798e | 031b2a4d5e6c798f | 031b2a4e56789cdf | 031b2a4e57689dcf |
| 031b2c456e789adf | 031b2c48576e9daf | 031b2c4a596d7f8e | 031b2c4d5e6a7f89 |
| 031b2f475e689acd | 031b2f485e679cad | 031b2f4a596e7c8d | 031b2f4e5d6a7c89 |

-continued

| | | | |
|---|---|---|---|
| 031c24567a8f9ebd | 031c24567b8e9fad | 031c245a6879bfde | 031c245b6978afde |
| 031c25467a8f9bde | 031c25467b8e9adf | 031c254a6d789fbe | 031c254b6687d9fae |
| 031c26475e89afbd | 031c26485a79bedf | 031c264b587d9eaf | 031c264f578d9abe |
| 031c27465e89adbf | 031c27485b69aedf | 031c274a586d9ebf | 031c274f568d9bae |
| 031c29465f78adbe | 031c29475f68aebd | 031c294e5a6b7d8f | 031c294f5b6a7d8e |
| 031c2d4a5e6b798f | 031c2d4b5f6a798e | 031c2d4e56789baf | 031c2d4e57689abf |
| 031c2e47586b9adf | 031c2e48576b9fad | 031c2e4b5f697a8d | 031c2e4f5b6d7a89 |
| 031c2f47586a9bde | 031c2f48576a9ebd | 031c2f4a5e697b8d | 031c2f4e5a6d7b89 |
| 031e24586b79afcd | 031e2459678cadbf | 031e245a678f9dbc | 031e245b687a9fcd |
| 031e25467c8b9daf | 031e254b687f9dac | 031e254c6978abdf | 031e254f6a789bcd |
| 031e26457c8b9fad | 031e2647598cabdf | 031e26475a8f9bcd | 031e264b587f9cad |
| 031e28456b79acdf | 031e28465b7a9cdf | 031e284c5769adbf | 031e284f576a9dbc |
| 031e29465d78afbc | 031e29475d68acbf | 031e294c5a6b7f8d | 031e294d5b6a7f8c |
| 031e2a456789fbc | 031e2a47586d9cbf | 031e2a4d5b697c8f | 031e2a4f596b7c8d |
| 031e2c4b5d697a8f | 031e2c4d57689fab | 031e2c4d58679baf | 031e2c4f596d7a8b |
| 031e2f45678d9bac | 031e2f46578d9cab | 031e2f4b5d6a798c | 031e2f4c5a6d798b |
| 031f25467d8b9cae | 031f2548697abecd | 031f254a6e789cbd | 031f254d678c9abe |
| 031f26457d8b9eac | 031f26475d89acbe | 031f264c5879abde | 031f264e587b9acd |
| 031f27465d89aebc | 031f27485a6b9ecd | 031f274a586e9dbc | 031f274d568c9eab |
| 031f2845697abcde | 031f28475a6b9cde | 031f284c56789aebd | 031f284e567b9dac |
| 031f2a456c789ebd | 031f2a47586c9dbe | 031f2a4c5b697d8e | 031f2a4e596b7d8c |
| 031f2c465978abde | 031f2c485967aebd | 031f2c4a5d697b8e | 031f2c4d5a6e7b89 |
| 031f2d45678e9abc | 031f2d47568e9cab | 031f2d4c5b6e7a89 | 031f2d4e596c7a8b |
| 031f2e465b789acd | 031f2e485b679dac | 031f2e4a5d6b798c | 031f2e4d5a6c798b |
| 041235697d8eabcf | 0412356b7d8c9aef | 0412356d7e89afbc | 0412356f7c89adbe |
| 0412365c7a8f9bde | 0412365c7b8e9adf | 0412365e7d8a9cbf | 0412365f7c8a9dbe |
| 041238596b7eadcf | 041238596f7abcde | 0412385a6d7b9cef | 0412385e697bafcd |
| 04123a57698fbecd | 04123a59678cbedf | 04123a5c687d9ebf | 04123a5f687e9dbc |
| 04123b567a8c9def | 04123b5a678e9dcf | 04123b5c6d789eaf | 04123b5e6f789cad |
| 04123c567b8a9edf | 04123c567e8f9bad | 04123c5a6789bfde | 04123c5f6978abde |
| 04123d576b8a9ecf | 04123d576f8e9abc | 04123d5a687c9bef | 04123d5e678c9baf |
| 04123e567a89bfcd | 04123e576d8f9cab | 04123e59687cabdf | 04123e5f6b789acd |
| 0413256c798fabde | 0413256c7b8d9aef | 0413256d7e89acbf | 0413256f7c89aebd |
| 0413265a7e8d9bcf | 0413265b7e8c9adf | 0413265e7d8a9fbc | 0413265f7c8a9ebd |
| 0413285a6d7b9fce | 0413285b6a7d9ecf | 0413285e697bacdf | 0413285f6a79bcde |
| 041329576a8cbdef | 041329586c7eadbf | 041329586f7daebc | 0413295a678fbdce |
| 04132b56798caedf | 04132b56798daecf | 04132b5e6c789fad | 04132b5f6d789eac |
| 04132c567b89adef | 04132c567d8f9eab | 04132c57698abfde | 04132c5a6f789bde |
| 04132d56798abfce | 04132d586a7c9bef | 04132d5b6f789ace | 04132d5e678f9bac |
| 04132e576d8c9fab | 04132e58697cabdf | 04132e5b6789adcf | 04132e5f678d9abc |
| 041523697d8eacbf | 0415236b7d8c9fae | 0415236c798fadbe | 0415236c7b8d9eaf |
| 0415263a798ebcdf | 0415263b7a8c9fde | 0415263e7a89bdcf | 0415263f7c8e9bad |
| 0415273a698fbdce | 0415273b6a8d9ecf | 0415273e6d8f9bac | 0415273f6a89bcde |
| 041529367a8dbfce | 041529376a8cbedf | 0415293e687bacdf | 0415293f6b78adce |
| 04152c367b89afde | 04152c367d8f9abe | 04152c386d7a9ebf | 04152c3a6b789edf |
| 04152d376b89aecf | 04152d376e8a9abf | 04152d386a7c9fbe | 04152d3a687b9fce |
| 04152e376d8c9baf | 04152e38697cafbd | 04152e3b6879adcf | 04152e3f687d9abc |
| 04152f367c8d9bae | 04152f386e79aebc | 04152f3b6978acde | 04152f3e6c789abd |
| 0416235a7e8d9cbf | 0416235b7e8c9daf | 0416235c7a8f9ebd | 0416235c7b8e9fad |
| 0416253a798ebfcd | 0416253c7b8a9fde | 0416253c7e8f9abd | 0416253f7c8e9dab |
| 0416273a598cbdef | 0416273d5e8c9fab | 0416273e5b8a9dcf | 0416273e5c8d9abf |
| 0416283c5e79adbf | 0416283d5a7c9fbe | 0416283e597cafbd | 0416283f5e7a9dbc |
| 041629357a8dbcef | 041629375a8fbecd | 0416293c5b78adef | 0416293e587bafcd |
| 04162b35798cafde | 04162b37598eadcf | 04162b3d587a9ecf | 04162b3f5a789cde |
| 04162d35798abecf | 04162d375e8f9cab | 04162d3a587b9cef | 04162d3f5c789abe |
| 04162f357c8d9eab | 04162f37598abcde | 04162f3a5b789ecd | 04162f3d587e9abc |
| 0417253b6a8d9cef | 0417253d6b8a9fce | 0417253d6f8e9bac | 0417253f6a89becd |
| 0417263b5a8e9fcd | 0417263c5a89bdef | 0417263e5b8a9cdf | 0417263e5c8d9baf |
| 0417283c5f69aebd | 0417283d5b6c9eaf | 0417283e5f6b9dac | 0417283f596cadbe |
| 04172b35698dafce | 04172b36598eacdf | 04172b3c586a9edf | 04172b3f5a689dce |
| 04172c35698abedf | 04172c385a6f9dbe | 04172c3b5968adef | 04172c3d5f689eab |
| 04172d356b89acef | 04172d356c8e9fab | 04172d385b6f9cae | 04172d3f5c689bae |
| 04172e365b89afcd | 04172e365f8d9cab | 04172e385c6b9fad | 04172e3c586f9bad |
| 04172f36598abdce | 04172f385c6a9ebd | 04172f3b5869aecd | 04172f3e586c9dab |
| 041823596b7eacdf | 041823596f7abdce | 0418235b6a7d9cef | 0418235f6a79becd |
| 0418263a5c7d9fbe | 0418263a5f7e9cbd | 0418263c5e79abdf | 0418263f5e7a9bcd |
| 04182f3b5c6d7fae | 04182f3b5e6f9dac | 04182f3d5b6c9aef | 04182f3d596cabde |
| 041829356c7eafbd | 041829356f7dacbe | 0418293c5b67aedf | 0418293f576baecd |
| 04182b375e6c9daf | 04182b375f6d9cae | 04182b3c576a9fde | 04182b3d567a9fce |
| 04182c356d7a9bef | 04182c3a576b9def | 04182c3b5967afde | 04182c3d5f679abe |
| 04182e375c6b9adf | 04182e3b5679afcd | 04182e3c576f9abd | 04182e3f567d9cab |
| 04182f356c79abce | 04182f375c6a9bde | 04182f3a5b679dce | 04182f3d567e9bac |
| 041923586a7ebcdf | 041923586f7badce | 0419235a6c78bdef | 0419235f678caebd |
| 041925386a7ebdcf | 041925386f7bacde | 0419253a678dbfce | 0419253f6d78abce |
| 041926375f8cabde | 041926385b7cadef | 0419263a578dbcef | 0419263e587dabcf |
| 041928365b7caedf | 041928375a6cbfde | 0419283e567dacbf | 0419283f576daebc |
| 04192b36578facde | 04192b37568fadce | 04192b3e5f6a7c8d | 04192b3f5e6a7d8c |
| 04192c365e78abdf | 04192c385e67adbf | 04192c3b5a6d7e8f | 04192c3e5f6d7b8a |
| 04192d3a5b6c7e8f | 04192d3b5678acef | 04192d3b5867aecf | 04192d3f5e6c7b8a |
| 04192e36578abdcf | 04192e37568abcdf | 04192e3a5b6f7d8c | 04192e3b5a6f7c8d |

-continued

| | | | |
|---|---|---|---|
| 041a23576f8c9dbe | 041a2359687dbcef | 041a235c6978bedf | 041a235f687b9ecd |
| 041a25386b7c9def | 041a253b678f9cde | 041a253c6d789bef | 041a253d6789becf |
| 041a27356f8c9bde | 041a27385c69bfde | 041a273b568f9ecd | 041a273d5689bcef |
| 041a28356b7c9edf | 041a2836597dbecf | 041a28365f7b9cde | 041a283c576d9ebf |
| 041a2935678ebcdf | 041a2936578ebfcd | 041a293d5f6b7e8c | 041a293e5c6b7d8f |
| 041a2b3c5e697d8f | 041a2b3d5f697c8e | 041a2b3e56789cdf | 041a2b3e57689dcf |
| 041a2d35687e9bcf | 041a2d38567e9cbf | 041a2d3b596f7c8e | 041a2d3c5e6f7b89 |
| 041a2f365e789bcd | 041a2f385e679dbc | 041a2f3b596d7e8c | 041a2f3e5c6d7b89 |
| 041b23576f8d9cae | 041b23586c7a9def | 041b235c6879aedf | 041b235f678e9dac |
| 041b26375f8e9acd | 041b26385c79afde | 041b263c587d9aef | 041b263f578a9cde |
| 041b27356f8d9ace | 041b2738596dacef | 041b27385e6a9fcd | 041b273f568a9dce |
| 041b28356c7a9fde | 041b2837596dafce | 041b28375c6a9cdf | 041b283c567d9fae |
| 041b293c5f6a7e8d | 041b293d5768acef | 041b293d5867afce | 041b293f5c6a7d8e |
| 041b2c35687e9adf | 041b2c38567e9daf | 041b2c3a596f7d8e | 041b2c3d5e6f7a89 |
| 041b2e3a57689fcd | 041b2e3a58679cdf | 041b2e3c5f6d798a | 041b2e3f5c6d7a89 |
| 041b2f356789acde | 041b2f375689aecd | 041b2f3a596c7e8d | 041b2f3d5e6c798a |
| 041d23576a8e9fbc | 041d23576b8f9eac | 041d235a6879bfce | 041d235b6978afce |
| 041d25376a8e9bcf | 041d25376b8f9ace | 041d253a6c789fbe | 041d253b687c9fae |
| 041d26375e89afbc | 041d26385a79becf | 041d263b587c9eaf | 041d263f578c9abe |
| 041d27365e89acbf | 041d27385b69aecf | 041d273a586c9ebf | 041d273f568c9bae |
| 041d29365f78acbe | 041d29375f68aebc | 041d293e5b6c7a8f | 041d293f5a6c7b8e |
| 041d2c3a5f697b8e | 041d2c3b5e697a8f | 041d2c3e56789baf | 041d2c3e57689abf |
| 041d2e36587a9bcf | 041d2e38567a9fbc | 041d2e3a5f6b798c | 041d2e3f5a6b7c89 |
| 041d2f36587b9ace | 041d2f38567b9eac | 041d2f3b5e6a798c | 041d2f3e5b6a7c89 |
| 041e2358697abfcd | 041e2359678dafbc | 041e235a6b789fcd | 041e235b678f9cad |
| 041e25376d8a9cbf | 041e253a6f789cbd | 041e253d6879abcf | 041e253f687b9acd |
| 041e27356d8a9fbc | 041e2736598dabcf | 041e27365b8f9acd | 041e273a586f9dbc |
| 041e2835697abdcf | 041e28375a6b9dcf | 041e283d5679afbc | 041e283f567b9cad |
| 041e29365c78afbd | 041e29375c68adbf | 041e293c5a6f7b8d | 041e293d5b6f7a8c |
| 041e2b35687c9fad | 041e2b36587c9daf | 041e2b3c5a6d798f | 041e2b3f596d7a8c |
| 041e2d3a5c6b798f | 041e2d3c56789fab | 041e2d3c58679abf | 041e2d3f596b7c8a |
| 041e2f35678c9abd | 041e2f37568c9dab | 041e2f3a5c697b8d | 041e2f3d5b697c8a |
| 041f25376c8a9dbe | 041f25386b79aecd | 041f253b687e9dac | 041f253c678d9bae |
| 041f26375c89adbe | 041f26385b7a9ecd | 041f263b587e9cad | 041f263c578d9eab |
| 041f27356c8a9ebd | 041f27365c89aebd | 041f273d5869abce | 041f273e586a9bcd |
| 041f28356b79adce | 041f28365b7a9dce | 041f283d5769acbe | 041f283e576a9cbd |
| 041f2b35687d9eac | 041f2b36587d9cae | 041f2b3d5a6c798e | 041f2b3e596c7a8d |
| 041f2c35678e9bad | 041f2c36578e9dab | 041f2c3d5a6b7e89 | 041f2c3e596b7d8a |
| 041f2d375968abce | 041f2d385967acbe | 041f2d3b5c6a798e | 041f2d3c5b6a7e89 |
| 041f2e375a689bcd | 041f2e385a679cbd | 041f2e3b5c697a8d | 041f2e3c5b697d8a |
| 051234697d8baecf | 0512346c798abedf | 0512346c7e8d9baf | 0512346e7d8c9abf |
| 0512364c7e8b9adf | 0512364c7f8a9bde | 0512364e7b8c9daf | 0512364f7b8d9cae |
| 051238496a7fbcde | 051238496e7badcf | 0512384a6f79becd | 0512384e6f7d9cab |
| 051239486a7ebcdf | 051239486f7badce | 0512394a678cbfde | 0512394f6c78abde |
| 05123b48697faecd | 05123b49678dafce | 05123b4e678a9cdf | 05123b4f6e789acd |
| 05123d476e8a9bcf | 05123d476f8b9ace | 05123d4e6978afbc | 05123d4f6879aebc |
| 05123e476a8d9cbf | 05123e486c7f9dab | 05123e4a678b9dcf | 05123e4c6879adbf |
| 05123f476a8c9dbe | 05123f49687dabce | 05123f4a687e9bcd | 05123f4c6978adbe |
| 0513246a7c89bfde | 0513246c798abdef | 0513246c7e8d9fab | 0513246d7b89aecf |
| 0513264a7c8f9bde | 0513264c7b78c9fad | 0513264e7b8c9fad | 0513264f7b8d9eac |
| 0513284a6f79bdce | 0513284b697eadcf | 0513284e6f7d9bac | 0513284f6d7e9abc |
| 051329476f8cabde | 051329486a7dbfce | 051329486c7baedf | 0513294f678abcde |
| 05132b476d8c9aef | 05132b48697cadef | 05132b4a678d9fce | 05132b4e6789acdf |
| 05132c467d8a9bef | 05132c467e89abdf | 05132c47698faebd | 05132c4f6a789ebd |
| 05132d46798faebc | 05132d486f7c9eab | 05132d4b678a9ecf | 05132d4e6a789fbc |
| 05132e46798cadbf | 05132e47698dacbf | 05132e4a6d789bcf | 05132e4b6c789adf |
| 051423697d8bacef | 0514236a7c89bedf | 0514236d7b89afce | 0514236e7d8c9fab |
| 0514273a6c8f9bde | 0514273b6d8f9ace | 0514273e6a8d9fbc | 0514273f6a8c9ebd |
| 0514283a6e79bcdf | 0514283b697facde | 0514283e6c7f9abd | 0514283f6e7c9bad |
| 051429367f8dabce | 051429386a7dbecf | 051429386c7bafde | 0514293f678badce |
| 05142a367c8d9bef | 05142a386d79bcef | 05142a3b678c9fde | 05142a3e6789bdcf |
| 05142c37698fadbe | 05142c386d7f9eab | 05142c3a678b9edf | 05142c3e6687b9fad |
| 05142d36798facbe | 05142d376b8b9aef | 05142d376e89abcf | 05142d3f687b9eac |
| 05142e36798cafbd | 05142e37698dafbc | 05142e3a687d9bcf | 05142e3b687c9adf |
| 0516234a7c8f9dbe | 0516234b7d8f9cae | 0516234c7e8b9fad | 0516234c7f7a9ebd |
| 0516273a4c89bfde | 0516273b498dacef | 0516273b4e8a9fcd | 0516273d4b89aecf |
| 0516283a4e7cadbf | 0516283a4e7f9dbc | 0516283f497dacbe | 0516283f4a7e9cbd |
| 051629347f8daebc | 0516293b4c78afde | 0516293d4a78becf | 0516293f478baecd |
| 05162a347c8d9ebf | 05162a37498fbcde | 05162a3d487e9fbc | 05162a3f4b789ecd |
| 05162b374a8d9cef | 05162b374e89afcd | 05162b39478facde | 05162b3d487f9eac |
| 05162c347d8a9fbe | 05162c347e89afbd | 05162c394b78adef | 05162c3a478b9def |
| 05162e37498badcf | 05162e39478abdcf | 05162e3a487d9cbf | 05162e3b487c9daf |
| 0517243a6c8f9dbe | 0517243b6d8f9cae | 0517243d6e8a9fbc | 0517243d6f8b9eac |
| 0517263b94a8cbdef | 0517263a4c89bedf | 0517263d4b89afce | 0517263e4a8b9fcd |
| 0517283b94f6caebd | 0517283b4f6e9dac | 0517283a4e96dafbc | 0517283e4b6f9cad |
| 0517293b46f8cadbe | 0517293b64f8abecd | 0517293b4c68aedf | 0517293d4a68bfce |
| 05172a36498fbdce | 05172a384c6f9ebd | 05172a3b468c9def | 05172a3e4689bfcd |
| 05172b346d8c9eaf | 05172b384c6e9fad | 05172b39468facde | 05172b3a4f689ecd |
| 05172d346c8b9fae | 05172d346e89acbf | 05172d364b8a9cef | 05172d3a4968bcef |
| 05172e36498bacdf | 05172e384a6d9cbf | 05172e384b6c9daf | 05172e39468abcdf |

-continued

| | | | |
|---|---|---|---|
| 051823496a7fbdce | 051823496e7bacdf | 0518234b697eafcd | 0518234f6d7e9cab |
| 051824396a7ebdcf | 051824396f7bacde | 0518243a6e79bfcd | 0518243f6e7c9dab |
| 051826394e7cabdf | 0518263a4e7f9bcd | 0518263d4f79acbe | 0518263e4c79afbd |
| 0518273d4e69acbf | 0518273e496dabcf | 0518273e4b6f9acd | 0518273f4c69aebd |
| 05182a346d79bfce | 05182a374c6f9bde | 05182a3d467e9bcf | 05182a3f4b679dce |
| 05182b34697cafde | 05182b374c6e9adf | 05182b3a4f679cde | 05182b3d467f9ace |
| 05182c346d7f9bae | 05182c374f6a9dbe | 05182c394b67aedf | 05182c3e467b9daf |
| 05182d346f7c9abe | 05182d374e6a9cbf | 05182d3a4967becf | 05182d3f467b9cae |
| 051a24367c8b9def | 051a24376f89becd | 051a24396d78bcef | 051a243b687e9fcd |
| 051a26347c8b9edf | 051a26384b7f9ecd | 051a263d478c9fbe | 051a263e478f9cbd |
| 051a27346f89bdce | 051a2738496cbdef | 051a273d468c9ebf | 051a273e468f9dbc |
| 051a28364b7f9dce | 051a2837496cbedf | 051a2839476dbfce | 051a283b467e9cdf |
| 051a29346e78bcdf | 051a2938476ebfcd | 051a293d4f6c7e8b | 051a293e4c6f7d8b |
| 051a2b34687d9fce | 051a2b38467d9cef | 051a2b3d4f6e7c89 | 051a2b3e4c6d7f89 |
| 051a2d364c789fbe | 051a2d374c689ebf | 051a2d394b6c7e8f | 051a2d3b496e7c8f |
| 051a2e364f789cbd | 051a2e374f689dbc | 051a2e394b6f7d8c | 051a2e3b496d7f8c |
| 051b23467f89aecd | 051b23476d8a9cef | 051b2349687cadef | 051b234a6e789fcd |
| 051b26347f89acde | 051b26374c8d9eaf | 051b26374e8f9cad | 051b2639487dacef |
| 051b27346d8a9ecf | 051b27364c8d9fae | 051b27364e8f9dac | 051b273a486f9ecd |
| 051b2836497cafde | 051b28374a6e9dcf | 051b2839467daecf | 051b283a476f9cde |
| 051b2934687eadcf | 051b2936487eafcd | 051b293d4e6c7f8a | 051b293f4c6e7d8a |
| 051b2a346c789fde | 051b2a37486c9def | 051b2a3d4e6f7c89 | 051b2a3f4c6d7e89 |
| 051b2c394a6d7e8f | 051b2c3a496e7d8f | 051b2c3d46789eaf | 051b2c3d47689fae |
| 051b2e394a6f7c8d | 051b2e3a496c7f8d | 051b2e3f46789cad | 051b2e3f47689dac |
| 051c23467b8a9edf | 051c23467e8f9bad | 051c234a6978bdef | 051c234f6789aebd |
| 051c24367b8a9fde | 051c24367e8f9abd | 051c243a678d9ebf | 051c243f6d789eab |
| 051c26374f89abde | 051c26384b79adef | 051c263a478d9bef | 051c263e487d9fab |
| 051c28364b79aedf | 051c28374a69bfde | 051c283e467d9abf | 051c283f476d9bae |
| 051c29364e78abdf | 051c29384e67adbf | 051c293d4f6a7e8d | 051c293e4a6f7b8d |
| 051c2b37486a9edf | 051c2b38476a9fde | 051c2b3a4e697d8f | 051c2b3e4a6d798f |
| 051c2d3a4e6f7b89 | 051c2d3b46789aef | 051c2d3b48679fae | 051c2d3f4b6a7e89 |
| 051c2e37486f9bad | 051c2e38476f9abd | 051c2e3b4f6d798a | 051c2e3f4b697d8a |
| 051d23476a8b9fce | 051d23476e8f9bac | 051d234b678c9eaf | 051d234f687c9eab |
| 051d24376a8b9ecf | 051d24376e8f9abc | 051d243b6879acef | 051d243f6789acbe |
| 051d27364b8c9aef | 051d27384e6c9fab | 051d273a4869bcef | 051d273f4689abce |
| 051d28364f7c9abe | 051d28374e6c9baf | 051d283a4769becf | 051d283b4679afce |
| 051d293b4e6a7f8c | 051d293e4768abcf | 051d293e4867afbc | 051d293f4a6e7b8c |
| 051d2a36487b9fce | 051d2a38467b9ecf | 051d2a3b4e697c8f | 051d2a3e4b6c798f |
| 051d2c374a689bef | 051d2c384a679fbe | 051d2c3a4f6e7b89 | 051d2c3e4b6a7f89 |
| 051d2e36487f9bac | 051d2e38467f9abc | 051d2e3a4f6c798b | 051d2e3f4a697c8b |
| 051e23467f8c9dab | 051e234b6a789cdf | 051e234c6d789baf | 051e234f678b9dac |
| 051e24376f8d9cab | 051e243a687b9dcf | 051e243d687c9abf | 051e243f678a9cbd |
| 051e26347f8c9abd | 051e26374f8b9acd | 051e263a487b9cdf | 051e263d487c9baf |
| 051e27346f8d9bac | 051e27384b6a9dcf | 051e27384c6d9abf | 051e273f468a9bcd |
| 051e2a346978bdcf | 051e2a374869bfcd | 051e2a3d4b6f798c | 051e2a3f496d7b8c |
| 051e2b346879acdf | 051e2b384679afcd | 051e2b394f6a7c8d | 051e2b3a4c697f8d |
| 051e2c374968abdf | 051e2c384967afbd | 051e2c394f6d7b8a | 051e2c3d4b697f8a |
| 051e2d394678abcf | 051e2d394867acbf | 051e2d3a4c6f798b | 051e2d3f496a7c8b |
| 051f2347698abecd | 051f2349678cadbe | 051f234a687b9dce | 051f234c687d9bae |
| 051f2436798baecd | 051f2439678daebc | 051f243b6a789cde | 051f243d6c789abe |
| 051f2634798badce | 051f26384a7b9cde | 051f26384c7d9abe | 051f2639478dabce |
| 051f2734698abcde | 051f2736498cabde | 051f273b486a9dce | 051f273d486c9bae |
| 051f2a364e789bcd | 051f2a384e679dbc | 051f2a3b4c697e8d | 051f2a3e496c7b8d |
| 051f2b394e6a7d8c | 051f2b3d4a6e798c | 051f2b3e47689acd | 051f2b3e48679cad |
| 051f2c346e789bad | 051f2c38476e9dab | 051f2c3d4a697e8b | 051f2c3e496a7d8b |
| 051f2d34687e9abc | 051f2d36487e9cab | 051f2d394e6c7b8a | 051f2d3b4c6e798a |
| 061234597c8abfde | 0612345c7a89bedf | 0612345c7d8e9baf | 0612345e7b8a9dcf |
| 06123254b97c8fabde | 0612354b7e8f9acd | 0612354d7b8c9eaf | 0612354f7b8e9cad |
| 061238495f7abecd | 0612384b5a7d9ecf | 0612384d5f7e9cab | 0612384f5e7d9abc |
| 06123a475f8c9bde | 06123a48597ebfcd | 06123a485c7b9def | 06123a4f5789bcde |
| 06123b475e8c9adf | 06123b485a7c9edf | 06123b49578eafcd | 06123b4d578a9cef |
| 06123c457d8a9bef | 06123c457e89abdf | 06123c475a8f9dbe | 06123c4f5978adbe |
| 06123d457a8c9ebf | 06123d475a8e9cbf | 06123d495e78abcf | 06123d4b5c789aef |
| 06123e457a8f9dbc | 06123e485f7c9bad | 06123e4b5789adcf | 06123e4d5978afbc |
| 0613245a7e8b9dcf | 0613245c7a89bdef | 0613245c7d8e9fab | 0613245d7e8c9abf |
| 0613254c7d8b9aef | 0613254c7f89abde | 0613254d7b8c9fae | 0613254f7b8e9dac |
| 0613284951f7abcde | 0613284a597fbcde | 0613284a5d7b9ecf | 0613284d5f7e9bac |
| 06132a48597dbcef | 06132a485f7b9ecd | 06132a49578cbfde | 06132a4f5c789bde |
| 06132b485a7f9dce | 06132b4a578e9fcd | 06132b4d5789acef | 06132b4f5d789ace |
| 06132d47598eacbf | 06132d485c7f9bae | 06132d49578baecf | 06132d4c587a9ebf |
| 06132e475f89abcf | 06132e475f8b9acd | 06132e4d5a789fbc | 06132e4f587a9dbc |
| 06132f47598caebd | 06132f49587dabce | 06132f4a587e9bcd | 06132f4c5a789ebd |
| 061423597c8abdef | 0614235a7e8b9cdf | 0614235d7e8c9baf | 0614235e7b8a9fcd |
| 061425397c8eabdf | 0614253a7f8e9bcd | 0614253d7a8c9fbe | 0614253e7a8f9cbd |
| 0614273c5a8f9ebd | 0614273d5a8e9fbc | 0614273e5c8b9adf | 0614273e5d8a9bcf |
| 061428395e7abcdf | 0614283a597ebdcf | 0614283a5c7b9fde | 0614283c5e7f9bad |
| 061429375c8fabde | 0614293a585d7abcef | 0614293c578badef | 0614293d587eabcf |
| 06142b375e8f9acd | 06142b385a7f9cde | 06142b39578cafde | 06142b3d587c9aef |
| 06142d37598eafbc | 06142d385c7f9abe | 06142d39578abecf | 06142d3c587b9eaf |
| 06142f37598cadbe | 06142f385d7c9eab | 06142f3a578b9ecd | 06142f3e587b9cad |

| | | | |
|---|---|---|---|
| 061523497c8faebd | 0615234b7e8f9dac | 0615234c7d8b9eaf | 0615234c7f89adbe |
| 061524397c8eadbf | 0615243a7f8e9dbc | 0615243c7d8a9fbe | 0615243c7e89afbd |
| 061527394a8fbcde | 0615273b498eacdf | 0615273b4d8a9fce | 0615273d4a8b9ecf |
| 061529374c8abfde | 0615293847faebc | 0615293c478baedf | 0615293d487eacbf |
| 06152a384d7c9ebf | 06152a3b478f9cde | 06152a3c4b789edf | 06152a3d4789becf |
| 06152b374a8e9cdf | 06152b374d89afce | 06152b3a4c789fde | 06152b3d487c9fae |
| 06152e374b8a9dcf | 06152e39487dafbc | 06152e3a4978bdcf | 06152e3b487f9cad |
| 06152f38497dacbe | 06152f384a7e9cbd | 06152f394b78adce | 06152f3a478b9dce |
| 0617243a5f8c9ebd | 0617243b5e8c9fad | 0617243e5c8b9daf | 0617243e5d8a9cbf |
| 061725394a8fbecd | 0617253a4f89bdce | 0617253d4a8b9cef | 0617253e4b89acdf |
| 061728394c5fadbe | 0617283b4c5d9eaf | 0617283d495eacbf | 0617283d4b5c9fae |
| 061729345c8faebd | 0617293548abdef | 0617293b4f58adce | 0617293e4a58bcdf |
| 06172a35498cbedf | 06172a384f5c9dbe | 06172a3b458f9ecd | 06172a3d4589bcef |
| 06172b345e8f9dac | 06172b384f5d9cae | 06172b39458caedf | 06172b3a4c589def |
| 06172d35498bafce | 06172d384a5e9fbc | 06172d384b5f9eac | 06172d39458abfce |
| 06172e345d89afbc | 06172e345f8b9cad | 06172e354b8a9fcd | 06172e3a4958bfcd |
| 061824a597fbecd | 06182345d7b9cef | 06182345a7d9fce | 061823457f5e7d9bac |
| 061824395e7abfcd | 06182435b5a7c9fde | 06182435c5e7f9dab | 06182435e5f7c9abd |
| 061827394c5fabde | 06182735b4c5d9aef | 06182735c4f59aebd | 06182735d4d59acbf |
| 061829345d7abfce | 06182935a4d7fabce | 06182935b4f57acde | 06182935e4a57bdcf |
| 06182a34597dbecf | 06182a345f7b9cde | 06182a354d7c9bef | 06182a3c4b579def |
| 06182d354c7a9fbe | 06182d374a5e9bcf | 06182d374b5f9ace | 06182d3c457b9fae |
| 06182e354f7a9cbd | 06182e374d5a9cbf | 06182e39457dabcf | 06182e3b457f9acd |
| 06182f345d7c9bae | 06182f374c5a9dbe | 06182f394b57aecd | 06182f3e457b9dac |
| 061924357c8badef | 061924375f8abecd | 0619243a5d78bcef | 0619243b587eafcd |
| 061925347c8baedf | 061925384f7faecd | 0619253d4f78acbe | 0619253e4c78afbd |
| 061927345f8abdce | 061927384a5cbdef | 0619273d4f58aebc | 0619273e4c58adbf |
| 061928354b7fadce | 061928374a5cbedf | 0619283a475dbfce | 0619283b457eacdf |
| 06192a345e78bcdf | 06192a38475ebfcd | 06192a3d4b5f7e8c | 06192a3e4b5c7d8f |
| 06192b34587dafce | 06192b38457dacef | 06192b3d4a5e7f8c | 06192b3e4a5d7c8f |
| 06192d35478facbe | 06192d37458faebc | 06192d3a4c5f7e8b | 06192d3b4c5e7f8a |
| 06192e35478cafbd | 06192e37458cadbf | 06192e3a4f5c7d8b | 06192e3b4f5d7c8a |
| 061b23457f8a9dce | 061b23475e89acdf | 061b23495d78afce | 061b234a587c9edf |
| 061b24357f8a9cde | 061b24375e89adcf | 061b24395c78afde | 061b243a587d9ecf |
| 061b25374c8e9daf | 061b25374d8f9cae | 061b25384a7c9fde | 061b253a487d9fce |
| 061b27354c8e9fad | 061b27354d8f9eac | 061b2738495daecf | 061b2739485caedf |
| 061b2937485fadce | 061b2938475facde | 061b293c4a5d7e8f | 061b293d4a5c7f8e |
| 061b2a35487e9cdf | 061b2a38457e9dcf | 061b2a3c495e7d8f | 061b2a3d495f7c8e |
| 061b2e394d5f7c8a | 061b2e3a4d5c7f89 | 061b2e3c45789fad | 061b2e3c47589daf |
| 061b2f394c5e7d8a | 061b2f3a4c5d7e89 | 061b2f3d45789eac | 061b2f3d47589cae |
| 061c23457b89adef | 061c23457d8f9eab | 061c23495a78bedf | 061c234f578a9dbe |
| 061c25347b89afde | 061c25347d8f9abe | 061c25384b7a9def | 061c253a4d789bef |
| 061c27354f8a9bde | 061c2738495abfde | 061c273b4859adef | 061c273d485f9eab |
| 061c28354b7a9edf | 061c283a4d579ebf | 061c283b4759afde | 061c283d475f9abe |
| 061c2934578eadbf | 061c2935478eabdf | 061c293b4d5a7e8f | 061c293e4d5f7b8a |
| 061c2b3a4f597d8e | 061c2b3d4f5e7a89 | 061c2b3e45789adf | 061c2b3e48579daf |
| 061c2d35487e9baf | 061c2d38457e9abf | 061c2d3a495f7b8e | 061c2d3b495e7a8f |
| 061c2f345e789bad | 061c2f38475e9dab | 061c2f3d4b5a7e89 | 061c2f3e4b597d8a |
| 061d23457f8c9bae | 061d234b5978acef | 061d234c5e789fab | 061d234f578b9cae |
| 061d24357f8c9abe | 061d24375f8e9cab | 061d24395a78becf | 061d243b587a9cef |
| 061d27345f8e9bac | 061d27354f8b9ace | 061d2739485abfce | 061d273c4a589bef |
| 061d28374a59aecf | 061d28374c5e9abf | 061d283b457a9fce | 061d283c4a579fbe |
| 061d2934587baecf | 061d2935487bacef | 061d293b4c5a7f8e | 061d293e4c5f7a8b |
| 061d2a3b4f597c8e | 061d2a3c4f5e7b89 | 061d2a3e45789bcf | 061d2a3e48579cbf |
| 061d2e34587c9abf | 061d2e35487c9fab | 061d2e394b5f7a8c | 061d2e3c4b5a7f89 |
| 061d2f345789acbe | 061d2f374589abce | 061d2f394a5e7b8c | 061d2f3e4a597c8b |
| 061e2347598bafcd | 061e23475d8f9cab | 061e234b578c9fad | 061e234f587c9bad |
| 061e25374b8c9adf | 061e25384f7c9abd | 061e2539487bafcd | 061e253d487f9cab |
| 061e2734598badcf | 061e27345d8f9abc | 061e27384c5c9fab | 061e273c4958abdf |
| 061e28374d5c9baf | 061e2839457badcf | 061e283c4957afbd | 061e283d457f9abc |
| 061e2937485abcdf | 061e2938475abdcf | 061e293c4f5d7b8a | 061e293d4f5c7a8b |
| 061e2b34587a9cdf | 061e2b38457a9fcd | 061e2b394c5a7c8f | 061e2b3a4d597f8c |
| 061e2d394b5c7a8f | 061e2d3a47589bcf | 061e2d3a48579fbc | 061e2d3c4b597f8a |
| 061e2f34578a9cbd | 061e2f37458a9bcd | 061e2f3a495d7b8c | 061e2f3d495a7c8b |
| 061f23475a89bdce | 061f2349587baecd | 061f234a578c9ebd | 061f234c587e9dab |
| 061f24357a8b9ecd | 061f24375a89bcde | 061f243c5d789eab | 061f243e587d9abc |
| 061f25347a8b9dce | 061f25374a8b9dce | 061f25394a78abcf | 061f253e487d9bac |
| 061f2835497bacde | 061f28354c7e9abd | 061f28394d57aebc | 061f283c475d9bae |
| 061f2a34578e9dbc | 061f2a35478e9bcd | 061f2a3b4d597e8c | 061f2a3e4d5c7b89 |
| 061f2b345978acde | 061f2b374859aecd | 061f2b394c5a7d8e | 061f2b3e4c5d7a89 |
| 061f2d394a5c7b8e | 061f2d3b47589ace | 061f2d3b48579eac | 061f2d3c4a597e8b |
| 061f2e345c789abd | 061f2e37485c9dab | 061f2e3b495d7a8c | 061f2e3c495a7d8b |
| 0712345968d8bafce | 0712345d6b89aecf | 0712345d6c8e9abf | 0712345e6a8b9cdf |
| 0712354c6b8d9eaf | 0712354d6c8b9aef | 0712354d6e89abcf | 0712354e6b8f9cad |
| 0712364a5e8d9bcf | 0712364b5f8d9ace | 0712364c5b8e9daf | 0712364d5b8f9cae |
| 0712384a5b6d9ecf | 0712384b596eafcd | 0712384b5d6a9cef | 0712384e5f6d9abc |
| 0712394568d8fabce | 0712394856faecd | 0712394a568ebfcd | 0712394c5e68abdf |
| 07123a456e8f9bcd | 07123a485b6c9edf | 07123a4c5d689bef | 07123a4e5689bcdf |
| 07123c456a8d9ebf | 07123c485f6e9dab | 07123c4a568b9def | 07123c4e5968adbf |
| 07123f456a8e9dbc | 07123f485e6c9bad | 07123f4b5689adce | 07123f4d5968aebc |

-continued

| | | | |
|---|---|---|---|
| 071324596d8bacef | 0713245b6e8a9dcf | 0713245c6e8d9abf | 0713245e6a8b9fcd |
| 071325496d8eabcf | 0713254b6f8e9acd | 0713254c6b8d9fae | 0713254e6b8f9dac |
| 071326c45b8e9fad | 0713264d5b8f9eac | 0713264e5c8b9adf | 0713264e5d8a9bcf |
| 071328495e6badcf | 0713284b596eacdf | 0713284b5d6a9fce | 0713284d5e6f9abc |
| 071329465d8fabce | 0713294856cbadef | 0713294c586eabdf | 0713294d568abcef |
| 07132a465e8f9bcd | 07132a485b6f9dce | 07132a49568dbfce | 07132a4c586d9bef |
| 07132c46598eadbf | 07132c485d6f9bae | 07132c49568baedf | 07132c4d586a9ebf |
| 07132f46598daebc | 07132f485c6d9eab | 07132f4b568a9ecd | 07132f4e586a9dbc |
| 0714235b6e8a9cdf | 0714235c6e8d9baf | 0714235d6b89acef | 0714235d6c8e9fab |
| 0714253c6a8d9fbe | 0714253d6c8a9bef | 0714253d6f89abce | 0714253f6a8e9cbd |
| 071428395f6bacde | 0714283b596fadce | 0714283b5c6a9edf | 0714283c5f6e9abd |
| 07142a385b6f9cde | 07142a3b568e9fcd | 07142a3c5689bdef | 07142a3f5c6689bde |
| 07142b38596cadef | 07142b385f6a9ecd | 07142b39568dafce | 07142b3f5d689ace |
| 07142c36598eafbd | 07142c385d6f9abe | 07142c39568abedf | 07142c3d586e9beaf |
| 07142e365c89abdf | 07142e365f8a9bcd | 07142e3c5b689fad | 07142e3f586b9cad |
| 07142f36598dacbe | 07142f39586cabde | 07142f3b586e9acd | 07142f3d5b689eac |
| 0715234b96d8eafbc | 0715234b6f8e9cad | 0715234d6c8b9fae | 0715234d6e89acbf |
| 0715243b96d8facbe | 0715243a6e8f9cbd | 0715243d6c8a9ebf | 0715243d6f89aebc |
| 0715263b94a8ebdcf | 0715263b498fadce | 0715263b4c8a9edf | 0715263c4a8b9fde |
| 0715293b64d8abecf | 0715293b84c6eafbd | 0715293c486fadbe | 0715293d468bafce |
| 07152a384c6d9fbe | 07152a3b468e9dcf | 07152a3c4689bfde | 07152a3d4b689fce |
| 07152b364a8f9dce | 07152b364c89aedf | 07152b3a4d689ecf | 07152b3c486d9eaf |
| 07152c38496cadbf | 07152c384a6f9dbc | 07152c394b68acdf | 07152c3a468b9cdf |
| 07152f364b8a9cde | 07152f39486caebd | 07152f3a4968bcde | 07152f3b486e9dac |
| 0716234a5e8d9fbc | 0716234b5f8d9eac | 0716234e5c8b9daf | 0716234e5d8a9cbf |
| 0716253a4e89bdcf | 0716253b498faecd | 0716253b4c8a9def | 0716253f4b89acde |
| 071628394c5eafbd | 0716283a4c5d9fbe | 0716283a495faebc | 0716283d4a5c9ebf |
| 071629345d8facbe | 0716293b4e58adcf | 0716293d458bacef | 0716293f4a58bcde |
| 07162a345e8f9bcd | 07162a35498dbecf | 07162a3d4b589cef | 07162a3f485c9dbe |
| 07162b354a8f9ecd | 07162b354c89adef | 07162b39458daecf | 07162b3f485d9cae |
| 07162c35498bafde | 07162c39458abfde | 07162c3a485f9ebd | 07162c3b485e9fad |
| 07162e345c89adbf | 07162e345f8a9dbc | 07162e394b58afcd | 07162e3a458b9fcd |
| 0718234956bafcd | 0718234a5b6d9fce | 0718234d5e6f9cab | 0718234e5f6d9bac |
| 0718243a5b6c9fde | 0718243b596faecd | 0718243b5c6a9def | 0718243f5e6c9abd |
| 0718263c4e59afbd | 0718263d495fabce | 0718263d4a5c9bef | 0718263f4d59acbe |
| 071829345c6bafde | 0718293b4e56acdf | 0718293c456fabde | 0718293f4a56bdce |
| 07182b34596caedf | 07182b345f6a9dce | 07182b3a4d569cef | 07182b3c456d9aef |
| 07182c354d6a9fbe | 07182c3a465f9bde | 07182c3b465e9adf | 07182c3d456b9fae |
| 07182e35496cabdf | 07182e354a6f9bcd | 07182e3c465b9daf | 07182e3f456b9dac |
| 07182f345c6d9abe | 07182f354e6a9cbd | 07182f3a4956becd | 07182f3d465b9cae |
| 071923456d8abcef | 071923465f8baecd | 0719234a586ebfcd | 0719234b5c68adef |
| 071925346d8abecf | 071925346b8ebecf | 0719253a486fbecd | 0719253d4e68acbf | 0719253f4c68aebd |
| 071926345f8bacde | 0719263b485dacef | 0719263d4e58afbc | 0719263f4c58adbe |
| 071928354a6ebdcf | 0719283d64b5cafde | 0719283a456fbcde | 0719283b465daecf |
| 07192a34586cbfde | 07192a35486cbdef | 07192a3b4c5e6f8d | 07192a3b4e5c6d8f |
| 07192b345e68adcf | 07192b36485eafcd | 07192b3a4c5f6e8d | 07192b3a4e5d6c8f |
| 07192c35468fadbe | 07192c36458faebd | 07192c3d4a5e6f8b | 07192c3d4b5f6e8a |
| 07192e35468dafbc | 07192e36458dacbf | 07192e3f4a5c6d8b | 07192e3f4b5d6c8a |
| 071a23456f8b9dce | 071a23465e89bcdf | 071a23495d68bfce | 071a234b586c9edf |
| 071a24356f8b9cde | 071a24365e89bcdf | 071a24395c68bfde | 071a243b586d9ecf |
| 071a25384b6c9fde | 071a253b486d9fce | 071a253c468f9dbe | 071a253d468e9cbf |
| 071a2638495dbecf | 071a2639485cbedf | 071a263c458f9ebd | 071a263d458e9fbc |
| 071a2936485fbdce | 071a2938465fbcde | 071a293b4c5d6f8e | 071a293b4d5c6e8f |
| 071a2b35486e9cdf | 071a2b38456e9dcf | 071a2b394c5f6d8e | 071a2b394d5e6c8f |
| 071a2e354d689fbc | 071a2e364d589cbf | 071a2e3c495f6d8b | 071a2e3c4b5d6f89 |
| 071a2f354c689ebd | 071a2f364c589dbe | 071a2f3d495e6c8b | 071a2f3d4b5c6e89 |
| 071c23456f8d9bae | 071c23465f8e9dab | 071c23495b68aedf | 071c234a586b9def |
| 071c24356f8d9abe | 071c243a5968bdef | 071c243d5e689fab | 071c243f568a9dbe |
| 071c26345f8e9abd | 071c2638495bafde | 071c263b4d589aef | 071c263f458a9bde |
| 071c28354a6b9fde | 071c283a4659bedf | 071c283b4d569fae | 071c283d465e9baf |
| 071c2934586abedf | 071c2938456abdef | 071c293d4a5b6f8e | 071c293d4e5f6b8a |
| 071c2b354e689adf | 071c2b384e569daf | 071c2b3f4a596d8e | 071c2b3f4d5e6a89 |
| 071c2e34586d9baf | 071c2e38456d9fab | 071c2e3a495f6b8d | 071c2e3a4d5b6f89 |
| 071c2f345689aebd | 071c2f354689abde | 071c2f3b495e6a8d | 071c2f3b4e596d8a |
| 071d24356a89bcef | 071d24356c8f9eab | 071d24395b68aecf | 071d243f568b9cae |
| 071d25346a89bfce | 071d25346c8f9bae | 071d253a486b9cef | 071d253a4b6689aef |
| 071d26384a59bcef | 071d26384c5f9eab | 071d2639485bafce | 071d263f458b9ace |
| 071d28364a59bfce | 071d28364c5f9bae | 071d283a456b9ecf | 071d283c4b569eaf |
| 071d2934568eafbc | 071d2936458eabcf | 071d293c4a5b6e8f | 071d293c4e5f6a8b |
| 071d2a354e689bcf | 071d2a384e569cbf | 071d2a3f4b596c8e | 071d2a3f4c5e6b89 |
| 071d2c35486e9baf | 071d2c38456e9abf | 071d2c394a5e6b8f | 071d2c394b5f6a8e |
| 071d2f345e689abc | 071d2f36485e9cab | 071d2f3a4c5b6e89 | 071d2f3a4e596c8b |
| 071e2436598abfcd | 071e24365c8f9dab | 071e243a568d9fbc | 071e243f586d9abc |
| 071e2538496abfcd | 071e25384c6f9dab | 071e253a468d9bcf | 071e253f486d9bac |
| 071e2634598abcdf | 071e26345c8f9bad | 071e26394d58abcf | 071e263c485d9fab |
| 071e2835496abcdf | 071e28354c6f9bad | 071e28394d56acbf | 071e283c465d9abf |
| 071e2936485bacdf | 071e2938465badcf | 071e293f4c5d6b8a | 071e293f4d5c6a8b |
| 071e2a34586b9dcf | 071e2a35486b9fcd | 071e2a3c495b6d8f | 071e2a3c4b596f8d |
| 071e2c364b589adf | 071e2c384b569fad | 071e2c3a495d6b8f | 071e2c3a4d596f8b |
| 071e2f34568b9dac | 071e2f35468b9acd | 071e2f394b5c6a8d | 071e2f394c5b6d8a |

-continued

| | | | |
|---|---|---|---|
| 071f23456b8a9ecd | 071f23465b89adce | 071f234d5c689eab | 071f234e586c9bad |
| 071f24365b89acde | 071f2439586abecd | 071f243b568d9eac | 071f243d586e9cab |
| 071f25346b8a9cde | 071f25384e6c9abd | 071f253b468d9ace | 071f253c4968abde |
| 071f28364d5c9abe | 071f2839456abcde | 071f283c4956adbe | 071f283d456e9bac |
| 071f2a345968bdce | 071f2a384659becd | 071f2a3d495b6c8e | 071f2a3d4e5c6b89 |
| 071f2b34568e9cad | 071f2b36458e9acd | 071f2b3c4a596e8d | 071f2b3c4e5d6a89 |
| 071f2c364a589bde | 071f2c384a569ebd | 071f2c3b495d6a8e | 071f2c3b4d596e8a |
| 071f2e345d689bac | 071f2e38465d9cab | 071f2e394a5c6b8d | 071f2e394d5b6c8a |
| 0812345a6e7b9cdf | 0812345b6a7e9dcf | 0812345c6a79bfde | 0812345d697bafce |
| 081235496c7fadbe | 081235496e7dafbc | 0812354c6f79abde | 0812354e6f7b9acd |
| 0812364a5c7f9dbe | 0812364a5d7e9cbf | 0812364e5a7d9bcf | 0812364f5b7d9ace |
| 081239456c7eadbf | 081239456f7daebc | 0812394c5a67bedf | 0812394f576abecd |
| 08123b475c6e9daf | 08123b475d6f9cae | 08123b4e5769adcf | 08123b4f5679adce |
| 08123d45697fabce | 08123d495b67aecf | 08123d4e5c679abf | 08123d4f576e9cab |
| 08123e456a7f9bcd | 08123e475b6c9adf | 08123e4a5679bcdf | 08123e4c5d679baf |
| 08123f475a6c9bde | 08123f49567baecd | 08123f4a5769bcde | 08123f4c567e9dab |
| 081324596b7daecf | 081324596c7abfde | 0813245a6e7b9fcd | 0813245d697bacef |
| 081325496c7faebd | 081325496e7dacbf | 0813254d697eabcf | 0813254f6b7e9acd |
| 0813264a5c7f9ebd | 0813264a5d7e9fbc | 0813264c5f7a9bde | 0813264d5f7b9ace |
| 08132a465c7d9ebf | 08132a465f7e9dbc | 08132a4c5769bdef | 08132a4f5967bdce |
| 08132b475d6c9fae | 08132b475f6e9dac | 08132b4d5a679ecf | 08132b4f567a9ecd |
| 08132d46597fabce | 08132d475c6b9aef | 08132d49567abcef | 08132d4c576e9fab |
| 08132e465a7f9bcd | 08132e4a576b9dcf | 08132e4d576c9abf | 08132e4f5d679bac |
| 08132f475c69abde | 08132f495a67bcde | 08132f4a567b9dce | 08132f4c567d9bae |
| 081423596b7dafce | 081423596c7abedf | 0814235b6a7e9fcd | 0814235c6a79bdef |
| 081425396c7eafbd | 081425396f7dacbe | 0814253c6e79abdf | 0814253f6e7a9bcd |
| 08142 73b5c6e9fad | 08142 73b5d6f9eac | 0814273c5f6a9bde | 0814273d5f6b9ace |
| 08142a365c7d9fbe | 08142a365f7e9cbd | 08142a3c5b679edf | 08142a3f576b9ecd |
| 08142b375d6c9eaf | 08142b375f6e9cad | 08142b3d5679acef | 08142b3f5967acde |
| 08142c365d7a9bef | 08142c37596fabde | 08142c39576badef | 08142c3d567e9fab |
| 08142e375b6f9acd | 08142e3b567a9cdf | 08142e3c567d9baf | 08142e3f5c679abd |
| 08142f365d79abce | 08142f395b67adce | 08142f3b576a9cde | 08142f3d576c9abe |
| 0815234c6f79aebd | 0815234d697eafbc | 0815234e6f7b9dac | 0815234f6b7e9cad |
| 0815243c6e79adbf | 0815243d697facbe | 0815243e6a7f9cbd | 0815243f6e7a9dbc |
| 081526394e7abcdf | 0815263c4e7f9bad | 0815263f497bacde | 0815263f4c7e9abd |
| 081527394f6abdce | 0815273d4f6e9bac | 0815273e496badcf | 0815273e4d6f9abc |
| 08152a364d79bfce | 08152a374c69bedf | 08152a3e467b9cdf | 08152a3f476b9dce |
| 08152b364f7a9cde | 08152b374e6a9dcf | 08152b3c4769afde | 08152b3d4679aecf |
| 08152c364d7f9bae | 08152c37496abfde | 08152c39476baedf | 08152c3d467e9abf |
| 08152d36497abecf | 08152d374c6e9baf | 08152d39467bafce | 08152d3c476f9abe |
| 0816234c5f7a9dbe | 0816234d5f7b9cae | 0816234e5a7d9fbc | 0816234f5b7d9eac |
| 0816253b4f79acde | 0816253c4e7f9dab | 0816253e4a79bdcf |
| 081627394c5abdef | 0816273b4d59aecf | 0816273c4a59bfde | 0816273e4c5d9fab |
| 08162a354c79bcef | 08162a374f59becd | 08162a3c475b9def | 08162a3e457b9fcd |
| 08162c345d7a9ebf | 08162c354d7f9eab | 08162c3b475a9fde | 08162c3e475f9abd |
| 08162d34597facbe | 08162d374a5b9ecf | 08162d374e5f9abc | 08162d39457bacef |
| 08162e345a7f9cbd | 08162e374f5d9cab | 08162e3b457a9dcf | 08162e3c457d9abf |
| 08162f345d79aebc | 08162f354a7b9cde | 08162f354c7d9abe | 08162f39475bacd |
| 0817243c5f6a9dbe | 0817243d5f6b9cae | 0817243e5b6c9fad | 0817243f5a6c9ebd |
| 08172 53b4e69acdf | 0817253e496bafcd | 0817253e4d6f9cab | 0817253f4a69bdce |
| 0817263b4d59afce | 0817263c4a59bedf | 0817263d495bacef | 0817263d4e5c9fab |
| 08172b354e6a9fcd | 08172b364d5a9cef | 08172b3c4569adef | 08172b3f4659aecd |
| 08172c34596faebd | 08172c35496abdef | 08172c3b465a9edf | 08172c3e465f9bad |
| 08172d345c6b9eaf | 08172d364a5b9fce | 08172d364e5f9bac | 08172d3c456f9eab |
| 08172e345b6f9dac | 08172e354a6b9cdf | 08172e354d6c9baf | 08172e3f465c9dab |
| 08172f345c69adbe | 08172f36495abecd | 08172f3b456a9dce | 08172f3d456c9bae |
| 081923456a7dbfce | 081923456c7baedf | 081923475a6fbecd | 081923 4f5c67adbe |
| 081924356a7dbecf | 081924356c7bafde | 081924365b7faecd | 0819243f5d67aebc |
| 081926345b7fadce | 081926 3b4c57afde | 081926 3d4a57becf | 081926 3f475dabce |
| 081927345a6fbcde | 081927364f5cabde | 081927 3b4c56aedf | 081927 3d4a56bfce |
| 08192a354e67bcdf | 08192a364e57bfcd | 08192a3d4f5b6c7e | 08192a3e4c5b6f7d |
| 08192b3d4e5a6c7f | 08192b3e4567adcf | 08192b3e4756afcd | 08192b3f4c5a6e7d |
| 08192c34576eadbf | 08192c35476eabdf | 08192c3b4f5d6a7e | 08192c3e4a5d6f7b |
| 08192d34567eafbc | 08192d36457eabcf | 08192d3b4e5c6a7f | 08192d3f4a5c6e7b |
| 081a2346597ebfcd | 081a23465c7b9def | 081a23475f69bdce | 081a234f576c9ebd |
| 081a24356b7f9ecd | 081a24375f69bcde | 081a243c5d679ebf | 081a243e567d9fbc |
| 081a25346b7f9dce | 081a25374f6c9bde | 081a253946d7bfce | 081a253e467d9bcf |
| 081a26345 97ebdcf | 081a26345c7b9fde | 081a26394d57bcef | 081a263c475d9bef |
| 081a2b354c679fde | 081a2b374c569def | 081a2b3c4f596e7d | 081a2b3e4d596c7f |
| 081a2d394c5f6b7e | 081a2d3b46579ecf | 081a2d3b47569fce | 081a2d3c495f6e7b |
| 081a2e354967bdcf | 081a2e374956bfcd | 081a2e394f5c6b7d | 081a2e3b4d5c6 97f |
| 081a2f34576e9dbc | 081a2f35476e9bcd | 081a2f3b4c5d697e | 081a2f3e495d6c7b |
| 081b23456f7a9ecd | 081b23465f79adce | 081b234d5c679eaf | 081b234e576c9fad |
| 081b24365f79acde | 081b2437596eafcd | 081b24375d6a9cef | 081b243f567d9eac |
| 081b25346f7a9cde | 081b25374e6c9adf | 081b253c4967afde | 081b253f467d9ace |
| 081b2734596eacdf | 081b27345d6a9fce | 081b27364d5c9aef | 081b273c4956adef |
| 081b2a3c4e596f7d | 081b2a3d45679fce | 081b2a3d46579cef | 081b2a3f4d596c7e |
| 081b2c364a579fde | 081b2c374a569edf | 081b2c394d5f6a7e | 081b2c3d495f6e7a |
| 081b2e394567acdf | 081b2e394657afcd | 081b2e3c4a5d6f79 | 081b2e3f495d6c7a |
| 081b2f34567e9cad | 081b2f36457e9acd | 081b2f394e5c6a7d | 081b2f3d4a5c6e79 |

-continued

| | | | |
|---|---|---|---|
| 081c24356b79adef | 081c24365b7a9def | 081c243d5a679fbe | 081c243e5967afbd |
| 081c25346b79aedf | 081c25374a6f9dbe | 081c253b467e9daf | 081c253f4d679bae |
| 081c26345b7a9edf | 081c2637495fadbe | 081c263b457e9fad | 081c263f4d579eab |
| 081c27354a6f9ebd | 081c2736495faebd | 081c273d465a9bef | 081c273e4659abdf |
| 081c2b35467d9eaf | 081c2b36457d9fae | 081c2b3d4e5f697a | 081c2b3e4d5f6a79 |
| 081c2d345769a9fbe | 081c2d37456a9bef | 081c2d3b4e596f7a | 081c2d3f4a596b7e |
| 081c2e345769afbd | 081c2e374569abdf | 081c2e3b4d5a6f79 | 081c2e3f495a6b7d |
| 081c2f354e679bad | 081c2f364e579dab | 081c2f3d4a5b697e | 081c2f3e495b6a7d |
| 081d2345697abcef | 081d23475a6b9cef | 081d234c5b679fae | 081d234e5967acbf |
| 081d2534697abecf | 081d25374a6e9cbf | 081d253b467f9cae | 081d253c4f679abe |
| 081d26374c5b9aef | 081d26374e59abcf | 081d2639475facbe | 081d263b457f9eac |
| 081d27345a6b9ecf | 081d2739465a6e9fbc | 081d2739465faebc | 081d273c4f569eab |
| 081d2a35476c9fbe | 081d2a37456c9ebf | 081d2a3c4e5f697b | 081d2a3e4c5f6b79 |
| 081d2c34567b9fae | 081d2c35467b9aef | 081d2c3b4f596e7a | 081d2c3e4a596b7f |
| 081d2e345679acbf | 081d2e354679abcf | 081d2e394f5b6c7a | 081d2e3c4a5b697f |
| 081d2f394e5a6c7b | 081d2f3b4c5a6e79 | 081d2f3e45679abc | 081d2f3e47569cab |
| 081e23465a79bcdf | 081e23475b69acdf | 081e234c5769b9daf | 081e234d5769a9cbf |
| 081e24365a79bdcf | 081e24375b69adcf | 081e243c567b9daf | 081e243d567a9cbf |
| 081e2637495dafbc | 081e2639475cafbd | 081e263c457b9adf | 081e263d457a9bcf |
| 081e27354c6b9adf | 081e27354d6a9bcf | 081e2736495dacbf | 081e2739465cadbf |
| 081e2a35476f9cbd | 081e2a37456f9dbc | 081e2a3d4f5c6b79 | 081e2a3f4d5c697b |
| 081e2b35467f9cad | 081e2b36457f9dac | 081e2b3c4f5d6a79 | 081e2b3f4c5d697a |
| 081e2c36f4f579abd | 081e2c374f569bad | 081e2c394d5a6f7b | 081e2c3d495a6b7f |
| 081e2d394c5b6f7a | 081e2d3c495b6a7f | 081e2d3f46579abc | 081e2d3f47569bac |
| 0912354a6b7f8cde | 0912354b6a7e8dcf | 0912354e6d7b8acf | 0912354f6c7a8bde |
| 0912384c5a6d7fbe | 0912384d5b6c7eaf | 0912384e5c6b7daf | 0912384f5d6a7cbe |
| 09123a456e7b8cdf | 09123a4c567e8dbf | 09123a4c5b6f78de | 09123a4f5d687bce |
| 09123b456f7a8dce | 09123b4d567f8cae | 09123b4d5a6e78cf | 09123b4e5c687adf |
| 09123c485a6e7dbf | 09123c4a576f8dbe | 09123c4a5b687edf | 09123c4f567d8bae |
| 09123d485b6f7cae | 09123d4b576e8caf | 09123d4b5a687fce | 09123d4e567c8abf |
| 09123e456a7c8bdf | 09123e485d6c7abf | 09123e4a5d6b78cf | 09123e4c576d8baf |
| 09123f456b7d8ace | 09123f485c6d7bae | 09123f4b5c6a78de | 09123f4d576c8abe |
| 0913245a6e7c8fbd | 0913245b6f7d8eac | 0913245e6a7f8cbd | 0913245f6b7e8dac |
| 0913254a6e7b8dcf | 0913254b6f7a8cde | 0913254e6a7d8bcf | 0913254f6b7c8ade |
| 09132a465e7b8cdf | 09132a475b6c8fde | 09132a4e567d8fbc | 09132a4f586d7bce |
| 09132b465f7a8dce | 09132b475a6d8ecf | 09132b4e586c7adf | 09132b4f567c8ead |
| 09132c475f6a8bde | 09132c485f6e7bad | 09132c4a576f8ebd | 09132c4a586b7edf |
| 09132d475e6b8acf | 09132d485e6f7abc | 09132d4b576e8fac | 09132d4b586a7fce |
| 09132e465a7c8bdf | 09132e485b6c7fad | 09132e4a567f8dbc | 09132e4f576d8bac |
| 09132f465b7d8ace | 09132f485a6d7ebc | 09132f4b567e8cad | 09132f4e576c8abd |
| 0914235a6c7f8ebd | 0914235b6d7e8fac | 0914235e6f7b8dac | 0914235f6e7a8cbd |
| 0914253a6b7f8dce | 0914253b6a7e8cdf | 0914253e6c7b8adf | 0914253f6d7a8bce |
| 09142a365b7c8edf | 09142a375b6c8cde | 09142a3e586b7dcf | 09142a3f576d8ebc |
| 09142b365a7d8fce | 09142b375e6a8dcf | 09142b3e576c8fad | 09142b3f586a7cde |
| 09142c365e7a8bdf | 09142c385e6b7fad | 09142c3a567e8fbd | 09142c3a586f7bde |
| 09142d365f7b8ace | 09142d385f6a7ebc | 09142d3b567f8eac | 09142d3b586e7acf |
| 09142e375b6d8acf | 09142e385a6f7dbc | 09142e3b576f8cad | 09142e3f567c8abd |
| 09142f375a6c8bde | 09142f385b6e7cad | 09142f3a576e8dbc | 09142f3e567d8bac |
| 0916253c4b7f8dae | 0916253d4a7e8cbf | 0916253e4c7d8abf | 0916253f4d7c8bae |
| 0916273c4e5f8abd | 0916273d4b5e8bac | 0916273f4a5c8ebd | 0916273f4a5c8ebd |
| 09162a3c475e8dbf | 09162a3d4f587cbe | 09162a3e457c8fbd | 09162a3f4d5e78bc |
| 09162b3c4e587daf | 09162b3d475f8cae | 09162b3e4c5f78ad | 09162b3f457d8eac |
| 09162c354b7f8ead | 09162c374d5f8abe | 09162c3a475d8ebf | 09162c3b4d587eaf |
| 09162d354a7e8fbc | 09162d374c5e8baf | 09162d3a4c587fbe | 09162d3b475c8fae |
| 09162e354f7d8abc | 09162e374b5d8caf | 09162e3a457f8cbd | 09162e3b4f5c78ad |
| 09162f354e7c8bad | 09162f374a5c8dbe | 09162f3a4e5d78bc | 09162f3b457e8dac |
| 0917253a4d6f8cbe | 0917253b4c6e8daf | 0917253c4f6d8abe | 0917253d4e6c8baf |
| 0917263a4e5c8fbd | 0917263b4f5d8eac | 0917263c4e5d5f8bac | 0917263f4c5e8abd |
| 09172a354f6c8ebd | 09172a364c5f8dbe | 09172a3d4e5f68bc | 09172a3e4d586cbf |
| 09172b354e6d8fac | 09172b364d5e8caf | 09172b3c4f5e68ad | 09172b3f4c586dae |
| 09172c364a5d8fbe | 09172c3b456e8fad | 09172c3d465e8abf | 09172c3d4b586fae |
| 09172d364b5c8eaf | 09172d3a456f8ebc | 09172d3c465f8bae | 09172d3c4a586ebf |
| 09172e354b6f8dac | 09172e3a465c8dbf | 09172e3f456c8bad | 09172e3f4a5d68bc |
| 09172f354a6e8cbd | 09172f3b465d8cae | 09172f3e456d8abc | 09172f3e4b5c68ad |
| 0918234c5b6e7daf | 0918234d5a6f7cbe | 0918234e5d6c7baf | 0918234f5c6d7abe |
| 0918243c5b6d7fae | 0918243d5a6c7ebf | 0918243e5c6a7dbf | 0918243f5d6b7cae |
| 0918263a4d5b7fce | 0918263b4c5a7edf | 0918263e4a5c7bdf | 0918263f4b5d7ace |
| 0918273a4f5c6bde | 0918273b4e5d6acf | 0918273c4b5a6fde | 0918273d4a5b6ecf |
| 09182a354e6b7cdf | 09182a3c4e576dbf | 09182a3f456c7bde | 09182a3f4c567dbe |
| 09182b354f6a7dce | 09182b3d4f576cae | 09182b3e456d7acf | 09182b3e4d567caf |
| 09182c354b6e7adf | 09182c3a4d576ebf | 09182c3b456a7fde | 09182c3d4a567fbe |
| 09182d354a6f7bce | 09182d3a456b7ecf | 09182d3b4c576fae | 09182d3c4b567eaf |
| 091a23456e7d8fbc | 091a23475d6c8fbe | 091a234c586d7ebf | 091a234c5e6f78bd |
| 091a24356d7f8ebc | 091a24365d7c8ebf | 091a243c586f7dbe | 091a243c5f687ebd |
| 091a25384d6e7cbf | 091a253c4b6e7fde | 091a253c4b6e78df | 091a253d486c7fbe |
| 091a26374b5c8fde | 091a26384d5e7fbc | 091a263c475e8bdf | 091a263d4b587ecf |
| 091a27364c5f8bde | 091a273d465c8edf | 091a273b4d586fce | 091a273d485f6ebc |
| 091a2b35467c8fde | 091a2b37456c8edf | 091a2b374d5f68ce | 091a2b3d465e78cf |
| 091a2e35486f7cbd | 091a2e36457d8bcf | 091a2e37485c6dbf | 091a2e3b475d68cf |
| 091a2f35476d8bce | 091a2f364b5d78ce | 091a2f38456c7ebd | 091a2f38465c7dbe |

-continued

| | | | |
|---|---|---|---|
| 091b23456f7c8ead | 091b23475c6d8eaf | 091b234d586c7fae | 091b234d5f6e78ac |
| 091b24356c7e8fad | 091b24365c7d8fae | 091b243d586e7caf | 091b243d5e687fac |
| 091b25384c6f7dae | 091b253a4d687ecf | 091b253c486d7eaf | 091b253d4a6f78ce |
| 091b26374a5d8ecf | 091b26384c5f7ead | 091b263c4a587fde | 091b263d475f8ace |
| 091b27364d5e8acf | 091b273d465d8fce | 091b273a4c586edf | 091b273c485e6fad |
| 091b2a35467d8ecf | 091b2a37456d8fce | 091b2a374c5e68df | 091b2a3c465f78de |
| 091b2e35476c8adf | 091b2e364a5c78df | 091b2e38456d7fac | 091b2e38465d7caf |
| 091b2f35486e7dac | 091b2f36457c8ade | 091b2f37485d6cae | 091b2f3a475c68de |
| 091c23465a7d8ebf | 091c23475f6a8dbe | 091c234e5f687bad | 091c234f586b7dae |
| 091c24365e7a8dbf | 091c24375a6d8fbe | 091c243e586d7baf | 091c243f5e6b78ad |
| 091c25384e6d7abf | 091c253a4e6b78df | 091c253f486a7dbe | 091c253f4a687bde |
| 091c263a475b8edf | 091c263b4f587ade | 091c263e485f7abd | 091c263f4b578ead |
| 091c27364a5b8fde | 091c27384f5e6abd | 091c273b4e568fad | 091c273e4b586adf |
| 091c2d37485f6bae | 091c2d374a568ebf | 091c2d38465e7baf | 091c2d3a46578fbe |
| 091c2e36485b7daf | 091c2e374b5a68df | 091c2e3a4f5768bd | 091c2e3b47568daf |
| 091c2f364b578dae | 091c2f38475b6dae | 091c2f3b465a78de | 091c2f3e4a5678bd |
| 091d23465b7c8fae | 091d23475e6b8caf | 091d234e586a7cbf | 091d234f5e687abc |
| 091d24365f7b8cae | 091d24375b6c8eaf | 091d243e5f6a78bc | 091d243f586c7abe |
| 091d25384f6c7bae | 091d253b4f6a78ce | 091d253e486b7caf | 091d253e4b687acf |
| 091d263a4e587bcf | 091d263b475a8fce | 091d263e4a578fbc | 091d263f485e7bac |
| 091d27364b5a8ecf | 091d27384e5f6bac | 091d273a4f568ebc | 091d273f4a586bce |
| 091d2c37485e6abf | 091d2c374b568fae | 091d2c38465f7abe | 091d2c3b46578eaf |
| 091d2e364a578cbf | 091d2e38475a6cbf | 091d2e3a465b78cf | 091d2e3f4b5678ac |
| 091d2f36485a7cbe | 091d2f374a5b68ce | 091d2f3a47568cbe | 091d2f3b4e5768ac |
| 091e23456a7f8dbc | 091e23465d7a8cbf | 091e234c5b687fad | 091e234f5d6b78ac |
| 091e24356f7b8cad | 091e24375c6b8daf | 091e243d5a6f78bc | 091e243f5c687abd |
| 091e26374d5a8bcf | 091e26384f5c7bad | 091e263c485a7fbd | 091e263d4f578abc |
| 091e27384d5b6fac | 091e273c465b8adf | 091e273f485d6abc | 091e273f4c568bad |
| 091e2a36457b8dcf | 091e2a374d568cbf | 091e2a3c4f5678bd | 091e2a3d475b68cf |
| 091e2b35476a8cdf | 091e2b364c5a78df | 091e2b3c46578daf | 091e2b3f4d5768ac |
| 091e2c36485d7baf | 091e2c37456b8adf | 091e2c38456f7abd | 091e2c3d47568baf |
| 091e2d35467a8bcf | 091e2d35486b7fac | 091e2d364c578abf | 091e2d38475c6abf |
| 091f23456b7e8cad | 091f23465c7b8dae | 091f234d5a687ebc | 091f234e5c6a78bd |
| 091f24356e7a8dbc | 091f24375d6a8cbe | 091f243c5b6e78ad | 091f243e5d687bac |
| 091f26374c5b8ade | 091f26384e5d7abc | 091f263c4e578bad | 091f263d485b7eac |
| 091f27384c5a6ebd | 091f273d465a8bce | 091f273e485c6bad | 091f273e4d568abc |
| 091f2a35476b8dce | 091f2a364d5b78ce | 091f2a3d46578cbe | 091f2a3e4c5768bd |
| 091f2b36457a8cde | 091f2b374c568dae | 091f2b3c475a68de | 091f2b3d4e5678ac |
| 091f2c35467b8ade | 091f2c35486a7ebd | 091f2c364d578bae | 091f2c38475d6bae |
| 091f2d36485c7abe | 091f2d37456a8bce | 091f2d38456e7bac | 091f2d3c47568abe |
| 0a1234596d7f8cbe | 0a12345b6f7d8e9c | 0a12345b6f7e8d9c | 0a12345f6b7e8d9c |
| 0a1236495d7b8ecf | 0a12364b5f798cde | 0a12364d597e8bcf | 0a12364f5b7c89de |
| 0a1239456d7b8cef | 0a1239475c6b8fde | 0a12394d567e8fbc | 0a12394f5e687bcd |
| 0a123b456f798ecd | 0a123b475e698dcf | 0a123b4d5c6879ef | 0a123b4f567c8d9e |
| 0a123c47596f8bde | 0a123c485d6f7b9e | 0a123c495b687def | 0a123c495f678dbe |
| 0a123d45697c8bef | 0a123d485c6b7f9e | 0a123d49567f8ebc | 0a123d4f5e678b9c |
| 0a123e475b6d89cf | 0a123e485f6d79bc | 0a123e4b59687fcd | 0a123e4b5d678f9c |
| 0a123f456b7e89cd | 0a123f485e697dbc | 0a123f4b567d8c9e | 0a123f4d5c6789be |
| 0a1326495b7f8cde | 0a13264b597d8ecf | 0a13264d5e7b89cf | 0a13264f5c798bde |
| 0a13284c5e697fbd | 0a13284d5b6c7e9f | 0a13284e5c6b7d9f | 0a13284f596e7cbd |
| 0a1329465d7b8cef | 0a13294c567d8ebf | 0a13294c5f6b78de | 0a13294f586e7bcd |
| 0a132b465f798ecd | 0a132b4d586c79ef | 0a132b4e567f8c9d | 0a132b4e5d6978cf |
| 0a132c485d697ebf | 0a132c49586b7def | 0a132c495f678ebd | 0a132c4f567e8b9d |
| 0a132d46597c8bef | 0a132d485c6e79bf | 0a132d495b6e78cf | 0a132d4c5e678b9f |
| 0a132e485f6b7c9d | 0a132e4b58697fcd | 0a132e4b5d678c9f | 0a132e4d567c89bf |
| 0a132f465b7e89cd | 0a132f485e6c7b9d | 0a132f4b596c78de | 0a132f4e5c6789bd |
| 0a14235c697f8dbe | 0a14235d6f798cbe | 0a14235e6b7d8f9c | 0a14235f6d7b8e9c |
| 0a14253967c8def | 0a14253b697e8fcd | 0a14253c6d798bef | 0a14253e6f7b89cd |
| 0a1427395b6f8cde | 0a14273b596d8ecf | 0a14273d5e6b89cf | 0a14273f5c698bde |
| 0a14283c5b6d7f9e | 0a14283d5f697ebc | 0a14283e596f7dbc | 0a14283f5d6b7c9e |
| 0a1429365b7f8ecd | 0a14293c567d8fbe | 0a14293c5f687bde | 0a14293f5d678ebc |
| 0a142b36597d8cef | 0a142b3d5f678c9e | 0a142b3e567f8d9c | 0a142b3e5d6879cf |
| 0a142d365c7b89ef | 0a142d395b6687ecf | 0a142d3b5c678f9e | 0a142d3f567e8b9c |
| 0a142f365e798bcd | 0a142f395e678dbc | 0a142f3b59687cde | 0a142f3d567c89be |
| 0a15263c4b7f8d9e | 0a15263d4f7e89bc | 0a15263e497d8fbc | 0a15263f4d7c8b9e |
| 0a15273c4e6f89bd | 0a15273d4b6e8c9f | 0a15273e4c6d8b9f | 0a15273f496c8ebd |
| 0a15293c476e8dbf | 0a15293d467f8cbe | 0a15293e4c687fbd | 0a15293f4d6e78bc |
| 0a152b3c4e687d9f | 0a152b3d4f6c789e | 0a152b3e476c8f9d | 0a152b3f467d8e9c |
| 0a152c364b7f8e9d | 0a152c374d6f89be | 0a152c39476d8ebf | 0a152c3b4d687e9f |
| 0a152d3364c7e89bf | 0a152d3374b6e8f9c | 0a152d39467c8fbe | 0a152d3b4c6f789e |
| 0a152e36497d8cbf | 0a152e374f6d8b9c | 0a152e394f687cbd | 0a152e3b476f8c9d |
| 0a152f364e7c8b9d | 0a152f37496c8dbe | 0a152f394e6d78bc | 0a152f3b467e8d9c |
| 0a1725394c6f8ebd | 0a17253b4e6d8c9f | 0a17253c496e8fbd | 0a17253e4b6c8d9f |
| 0a1726394f5c8dbe | 0a17263b4d5e8f9c | 0a17263d4b5f8e9c | 0a17263f495d8cbe |
| 0a1729354d6c8fbe | 0a17293b4e5f8cbd | 0a17293d4356c8ebf | 0a17293e465f8dbc |
| 0a172b354f6e8d9c | 0a172b364c5d8e9f | 0a172b3c465d8f9e | 0a172b3f456e8c9d |
| 0a172c364f5e89bd | 0a172c3b4f586d9e | 0a172c3e456f8b9d | 0a172c3e495d68bf |
| 0a172d354e6f8b9c | 0a172d394e5c68bf | 0a172d3f465e89bc | 0a172d3f4b586c9e |
| 0a172e364d5c8b9f | 0a172e394d586fbc | 0a172e3c456d89bf | 0a172e3c4b5f689d |
| 0a172f354c6d89be | 0a172f3b4c5e689d | 0a172f3d465c8b9e | 0a172f3d49586ebc |

-continued

| | | | |
|---|---|---|---|
| 0a18234c5d6b7e9f | 0a18234d5c6e7b9f | 0a18234e5f697cbd | 0a18234f5e6c79bd |
| 0a1826394d5b7cef | 0a18263b4f597ecd | 0a18263c4b5d79ef | 0a18263e495f7bcd |
| 0a1829354e6b7fcd | 0a1829374f5b6cde | 0a18293c4e5d67bf | 0a18293e465b7dcf |
| 0a182b354c697def | 0a182b374d596ecf | 0a182b3c46597fde | 0a182b3e4c5f679d |
| 0a182c345e6b7f9d | 0a182c374b5f69de | 0a182c394d5e67bf | 0a182c3e4b567d9f |
| 0a182d34596c7ebf | 0a182d35496c7bef | 0a182d3b465e79cf | 0a182d3b4e567c9f |
| 0a182e345c697dbf | 0a182e37495d6bcf | 0a182e3b4f5c679d | 0a182e3c49567fbd |
| 0a182f345b6e7c9d | 0a182f354b6e79cd | 0a182f39465c7bde | 0a182f394c567ebd |
| 0a1923465d7e8fbc | 0a1923475c6e8fbd | 0a19234c5e687dbf | 0a19234c5f6d78be |
| 0a1925346e7c8dbf | 0a1925374c6f8bde | 0a19253d467e8bcf | 0a19253f4b6e78cd |
| 0a1926345e7f8dbc | 0a19263b457c8fde | 0a19263d485f7cbe | 0a19263f475e8bcd |
| 0a1927354b6c8fde | 0a19273d465c8def | 0a19273b4e586fcd | 0a19273d485e6cbf |
| 0a1928354e6d7fbc | 0a1928364e5d7cbf | 0a19283f456c7ebd | 0a19283f465c7dbe |
| 0a192b364c587fde | 0a192b37456c8def | 0a192b374e5f68cd | 0a192b3d47586ecf |
| 0a192c34586f7dbe | 0a192c345f687ebd | 0a192c35476d8bef | 0a192c364b5d78ef |
| 0a192c354b687dcf | 0a192c36485c7fbd | 0a192c37485d6fbc | 0a192e3b456d78cf |
| 0a1b23465f7c8d9e | 0a1b23475e6c8d9f | 0a1b234c5e687f9d | 0a1b234e5d6f789c |
| 0a1b25346c7e8f9d | 0a1b25374e6d89cf | 0a1b253d496c78ef | 0a1b253f467c89de |
| 0a1b26345c7d8f9e | 0a1b2639457e8dcf | 0a1b263d475c89ef | 0a1b263f485d7e9c |
| 0a1b2735496e8dcf | 0a1b2739465e8fcd | 0a1b27394c586def | 0a1b273f485c6e9d |
| 0a1b28354c6f7d9e | 0a1b28364c5f7e9d | 0a1b283d456e7c9f | 0a1b283d465e7f9c |
| 0a1b29364e587dcf | 0a1b2937456e8fcd | 0a1b29374c5d68ef | 0a1b293f47586cde |
| 0a1b2c3549687fde | 0a1b2c36485e7d9f | 0a1b2c37485f6d9e | 0a1b2c39456f78de |
| 0a1b2e34586d7f9c | 0a1b2e345d687c9f | 0a1b2e35476f89cd | 0a1b2e36495f78cd |
| 0a1c2345697e8dbf | 0a1c2347596f8ebd | 0a1c234586f7b9e | 0a1c234f5b687e9d |
| 0a1c25346d798ebf | 0a1c2537496b8fde | 0a1c253d486b7e9f | 0a1c253f4b678e9d |
| 0a1c27345e698fbd | 0a1c273d4b5869ef | 0a1c273d485b6f9d | 0a1c273d49568dbf |
| 0a1c28364d5e79bf | 0a1c28374f596dbe | 0a1c283e456d7b9f | 0a1c283f475e6b9d |
| 0a1c2935476b8def | 0a1c29364d5b78ef | 0a1c293d4f5867be | 0a1c293e45678fbd |
| 0a1c2b354f6879de | 0a1c2b374d568f9e | 0a1c2b3d47568e9f | 0a1c2b3f456978de |
| 0a1c2d345e687b9f | 0a1c2d35486f79be | 0a1c2d374b5968ef | 0a1c2d3f495678be |
| 0a1c2f345b6d789e | 0a1c2f354b678d9e | 0a1c2f3648597ebd | 0a1c2f3649587bde |
| 0a1d23456e798cbf | 0a1d2346597f8ebc | 0a1d234c586b7f9e | 0a1d234f5b66e789c |
| 0a1d2539467b8ecf | 0a1d253b4c6978ef | 0a1d253c486e7b9f | 0a1d253e4c6789bf |
| 0a1d26345f7b8c9e | 0a1d263b47598cef | 0a1d263e45798bcf | 0a1d263e485b7f9c |
| 0a1d27345b6c8e9f | 0a1d27354e698bcf | 0a1d27394e568cbf | 0a1d273c465b89ef |
| 0a1d28354f6c7b9e | 0a1d28374e5f6b9c | 0a1d283d465f79bc | 0a1d283e47596cbf |
| 0a1d2c3548697fbe | 0a1d2c37456b89ef | 0a1d2c394f5678be | 0a1d2c3b45678e9f |
| 0a1d2e345f6978bc | 0a1d2e354f6789bc | 0a1d2e3947586bcf | 0a1d2e3c47568b9f |
| 0a1d2f34586c79be | 0a1d2f3748596ebc | 0a1d2f374c568b9e | 0a1d2f3b4e58679c |
| 0a1e23456b7c8f9d | 0a1e23475b6d8c9f | 0a1e234d59687cbf | 0a1e234f586d79bc |
| 0a1e25346f7b8c9d | 0a1e25374b698dcf | 0a1e253d49678cbf | 0a1e253f48697cbd |
| 0a1e27345c6b8d9f | 0a1e273c48596dbf | 0a1e273c4b568f9d | 0a1e273f49586bcd |
| 0a1e28364f5c7b9d | 0a1e28374d5b6f9c | 0a1e283d456f79bd | 0a1e283d475c69bf |
| 0a1e29354d687bcf | 0a1e29374f568dbc | 0a1e293d456b78cf | 0a1e293f47568cbd |
| 0a1e2b3547698fcd | 0a1e2b364f5978cd | 0a1e2b3c45678d9f | 0a1e2b3f4d58679c |
| 0a1e2d34596f78bc | 0a1e2d3549678fbc | 0a1e2d36485b7c9f | 0a1e2d364b5879cf |
| 0a1e2f345c6879bd | 0a1e2f35486d7b9c | 0a1e2f37495b68cd | 0a1e2f3d4b56789c |
| 0a1f23456c7b8e9d | 0a1f23465b7d8c9e | 0a1f234d596c78be | 0a1f234e58697dbc |
| 0a1f25394e6b78cd | 0a1f253b46798cde | 0a1f253c4e678b9d | 0a1f253e486c79bd |
| 0a1f26345d798ebc | 0a1f2639475b8ecd | 0a1f263c457b89de | 0a1f263c48597dbe |
| 0a1f2734596e8cbd | 0a1f27354c6b89de | 0a1f273b4c568e9d | 0a1f273e46598bcd |
| 0a1f28354d6e79bc | 0a1f28374c5d69be | 0a1f283c475b6e9d | 0a1f283e465d7b9c |
| 0a1f2c345d6b789e | 0a1f2c354d678b9e | 0a1f2c3b475869de | 0a1f2c3e475689bd |
| 0a1f2d34586e7b9c | 0a1f2d37485b6c9e | 0a1f2d374c5689bc | 0a1f2d394c5867be |
| 0a1f2e35486b7d9c | 0a1f2e3745698bcd | 0a1f2e3945678cbd | 0a1f2e3b4d56789c |
| 0b1234596f7c8dae | 0b12345a6c7f8e9d | 0b12345c6d798fae | 0b12345f6e7a8c9d |
| 0b1235496a7c8def | 0b12354a697f8ecd | 0b12354c6d798aef | 0b12354f6e7a89cd |
| 0b1236495d7a8fce | 0b12364a5e798cdf | 0b12364d597f8ace | 0b12364e5a7c89df |
| 0b12384c5d6f7a9e | 0b12384d5c6a7f9e | 0b12384e5f697cad | 0b12384f5e6c79ad |
| 0b1239475c6a8edf | 0b12394c576f8ead | 0b12394d5a6c78ef | 0b12394d5f678cae |
| 0b123a475f698dce | 0b123a4e596f78cd | 0b123a4e5c678f9d | 0b123a4f576c8d9e |
| 0b123c47596e8adf | 0b123c49576e8fad | 0b123c4a5d6978ef | 0b123c4f5d6789ae |
| 0b123f475a6d89ce | 0b123f495e6a78cd | 0b123f4a576d8c9e | 0b123f4c5e6678a9d |
| 0b13245c697f8dae | 0b13245d6f798cae | 0b13245e6c7a8f9d | 0b13245f6a7c8e9d |
| 0b1325496d7a8cef | 0b13254a6e798fcd | 0b13254d697c8aef | 0b13254e6a7f89cd |
| 0b1326495a7f8dce | 0b13264a597c8edf | 0b13264c5e7a89df | 0b13264f5d798ace |
| 0b13284c5f6e79ad | 0b13284d5a6f7c9e | 0b13284e596c7fad | 0b13284f5c6d7a9e |
| 0b1329475a6f8ecd | 0b13294c576f8ae | 0b13294d5f6a78ce | 0b13294f5c678ead |
| 0b132a47596c8def | 0b132a4c5f678d9e | 0b132a4e576f8c9d | 0b132a4e5c6978df |
| 0b132c475d6a89ef | 0b132c495a6e78df | 0b132c4a5d6789fe | 0b132c4f576e8a9d |
| 0b132f475e698acd | 0b132f495e678cad | 0b132f4a596d78ce | 0b132f4c576d89ae |
| 0b1427395a6f8dce | 0b14273a596c8edf | 0b14273c5e6a89df | 0b14273f5d698ace |
| 0b14283c5a6e7d9f | 0b14283d5e6f79ac | 0b14283e5d6c7a9f | 0b14283f596d7eac |
| 0b1429375c6a8def | 0b14293d576c8eaf | 0b14293d5f687ace | 0b14293f586a7ecd |
| 0b142a375f698ecd | 0b142a3c58697def | 0b142a3e576f8d9c | 0b142a3e5c6879df |
| 0b142c37596d8aef | 0b142c385d697eaf | 0b142c395a687edf | 0b142c3d5e678a9f |
| 0b142d385c6e79af | 0b142d39586c7aef | 0b142d395f678eac | 0b142d3f576e8a9c |
| 0b142e385f6d7a9c | 0b142e3a586f79cd | 0b142e3a5c678d9f | 0b142e3c576d89af |
| 0b142f375a6e89cd | 0b142f385e6a7d9c | 0b142f3a59687dce | 0b142f3e5d6789ac |

| | | | |
|---|---|---|---|
| 0b1526394f7d8eac | 0b15263a4c7e8d9f | 0b15263d4e7c8a9f | 0b15263e4d7f89ac |
| 0b1527394e6c8fad | 0b15273a4d6f8c9e | 0b15273c4f6d8a9e | 0b15273f4c6e89ad |
| 0b1529364d7e8caf | 0b1529374c6f8dae | 0b15293c4f687ead | 0b15293d4e6f78ac |
| 0b152a364e7d8f9c | 0b152a374f6c8e9d | 0b152a3e4d6c789f | 0b152a3f4c687d9e |
| 0b152c37496d8fae | 0b152c3a467e8f9d | 0b152c3d476e89af | 0b152c3d4a687f9e |
| 0b152d36497c8eaf | 0b152d3a476f8e9c | 0b152d3c467f89ae | 0b152d3c4a6e789f |
| 0b152e364a7f8d9c | 0b152e39476c8daf | 0b152e3f467c8a9d | 0b152e3f496d78ac |
| 0b152f374a6e8c9d | 0b152f39467d8cae | 0b152f3e476d8a9c | 0b152f3e49687cad |
| 0b1625394d7e8fac | 0b16253a4e7d8c9f | 0b16253d497f8eac | 0b16253e4a7c8d9f |
| 0b1627394f5c8dae | 0b16273a4c5f8e9d | 0b16273c4a5e8f9d | 0b16273f495d8cae |
| 0b1629354c7d8eaf | 0b1629374e5f8cad | 0b16293c457d8fae | 0b16293e475f8dac |
| 0b162a354f7e8d9c | 0b162a374d5c8f9e | 0b162a3d475c8e9f | 0b162a3f457e8c9d |
| 0b162c374f5e89ad | 0b162c3a4f587d9e | 0b162c3e457f8a9d | 0b162c3e495d78af |
| 0b162d354e7f8a9c | 0b162d394e5c78af | 0b162d3f475e89ac | 0b162d3f4a587c9e |
| 0b162e354d7c89af | 0b162e3a4d5f789c | 0b162e3c475d8a9f | 0b162e3c49587fad |
| 0b162f374c5d8a9e | 0b162f394c587ead | 0b162f3d457c89ae | 0b162f3d4a5e789c |
| 0b18243c5d6a7e9f | 0b18243d5c6e7a9f | 0b18243c5f6d78ac | 0b18243f5e697dac |
| 0b1827394e5f6acd | 0b18273a4d5c69ef | 0b18273c495a6def | 0b18273f4a596ecd |
| 0b1829374e5a6cdf | 0b18293c456f7acd | 0b18293c4d5c67af | 0b18293f465a7dce |
| 0b182a374d596fce | 0b182a3c46597edf | 0b182a3d456c79ef | 0b182a3d4e5f679c |
| 0b182c34596e7daf | 0b182c374a5e69df | 0b182c39456a7def | 0b182c3e4a576d9f |
| 0b182d345e6f7a9c | 0b182d3a465f79ce | 0b182d3a4e576c9f | 0b182d3c495e67af |
| 0b182e345d6c79af | 0b182e39465c7adf | 0b182e394d576fac | 0b182e3f4a5d679c |
| 0b182f345a6d7e9c | 0b182f37495d6ace | 0b182f3a45697ecd | 0b182f3d49576eac |
| 0b1924365d7e8fac | 0b1924375c6e8fad | 0b1924d3c5e6c78af | 0b1924d3d5f687cae |
| 0b1925346d7e8caf | 0b1925374c6e8adf | 0b19253a4f687ecd | 0b19253d467f8ace |
| 0b1926374a5d8cef | 0b1926384c5e7daf | 0b19263c457d8fce | 0b19263e4a587fcd |
| 0b1927345e6f8cad | 0b1927354a6d8fce | 0b1927364f5e8acd | 0b1927384c5f6dae |
| 0b1928354f6e7dac | 0b1928374f5d6cae | 0b19283e456f7cad | 0b19283e475c6daf |
| 0b192a35467d8cef | 0b192a364c587edf | 0b192a3d47586fce | 0b192a3e465f78cd |
| 0b192d34586c7fae | 0b192d345f6e78ac | 0b192d36457c8aef | 0b192d3a475c68ef |
| 0b192e354a687cdf | 0b192e38465c7fad | 0b192e38475d6fac | 0b192e3a456c78df |
| 0b1a24365e7d8c9f | 0b1a24375f6d8c9e | 0b1a243c5c6d7f9d | 0b1a243e5d6f789c |
| 0b1a25346e7d8f9c | 0b1a25374f6d89ce | 0b1a25394c687def | 0b1a253e467c89df |
| 0b1a2637495e8fcd | 0b1a26384f5d7e9c | 0b1a2639457e8cdf | 0b1a263d49587cef |
| 0b1a27345d6c8f9e | 0b1a2735496e8cdf | 0b1a27364c5d89ef | 0b1a27384f5c6e9d |
| 0b1a28354c6d7e9f | 0b1a28374c5e6f9d | 0b1a283d456c7f9e | 0b1a283d475f6e9c |
| 0b1a2935467e8fcd | 0b1a29364f587dce | 0b1a293d465c78ae | 0b1a293e47586cdf |
| 0b1a2d3549687fce | 0b1a2d38465f7c9e | 0b1a2d38475e6c9f | 0b1a2d39456f78ce |
| 0b1a2e34586f7c9d | 0b1a2e345c6d789f | 0b1a2e36457f89cd | 0b1a2e39475f68cd |
| 0b1c2435697e8daf | 0b1c2437596f8ead | 0b1c243d586f7a9e | 0b1c243f5a687e9d |
| 0b1c2537496a8edf | 0b1c25384d6a7e9f | 0b1c253d4a6879ef | 0b1c253d4e6789af |
| 0b1c26345a7d8e9f | 0b1c26374d5a89ef | 0b1c263d45798adf | 0b1c263d49578daf |
| 0b1c27345f6a8d9e | 0b1c27354e698adf | 0b1c27364a598def | 0b1c27384e5a6f9d |
| 0b1c28364e597daf | 0b1c28374d5f69ae | 0b1c283e465f7a9d | 0b1c283f456a7d9e |
| 0b1c2d35467a89ef | 0b1c2d354a678e9f | 0b1c2d38456f79ae | 0b1c2d3f495768ae |
| 0b1c2e345f6879ad | 0b1c2e3649587adf | 0b1c2e364d578a9f | 0b1c2e3f456789ad |
| 0b1c2f3458697dae | 0b1c2f3846597ead | 0b1c2f3d46578a9e | 0b1c2f3e4a58679d |
| 0b1d24356e798caf | 0b1d2436597f8eac | 0b1d243c586a7f9e | 0b1d243f5a6e789c |
| 0b1d2534697c8eaf | 0b1d25384c6e7a9f | 0b1d2539467a8fce | 0b1d253a4f678e9c |
| 0b1d26345e798fac | 0b1d26384e5a7f9c | 0b1d26394e578caf | 0b1d263a4c5879ef |
| 0b1d28354e6a7c9f | 0b1d28364f5e7a9c | 0b1d283c475e69af | 0b1d283f46597cae |
| 0b1d29354e678fac | 0b1d2936457a8cef | 0b1d293c475a68ef | 0b1d293f4c5867ae |
| 0b1d2a354f6879ce | 0b1d2a364c578e9f | 0b1d2a3c46578f9e | 0b1d2a3f456978ce |
| 0b1d2c345e6a789f | 0b1d2c3845697fae | 0b1d2c394f5768ae | 0b1d2c3a465978ef |
| 0b1d2f345a687c9e | 0b1d2f3847596eac | 0b1d2f3947586ace | 0b1d2f3a45678c9e |
| 0b1e24356d7a8f9c | 0b1e24365a7c8d9f | 0b1e243c596d78af | 0b1e243f58697cad |
| 0b1e25346a7f8d9c | 0b1e25384f6d79ac | 0b1e25394c678daf | 0b1e253a46798cdf |
| 0b1e26345d7a8c9f | 0b1e26384d597caf | 0b1e26394f587acd | 0b1e263a4d578f9c |
| 0b1e28354d697fac | 0b1e28364c5d79af | 0b1e283c465a7f9d | 0b1e283f475d6a9c |
| 0b1e29354c687adf | 0b1e29364f578dac | 0b1e293c456a78df | 0b1e293f46578cad |
| 0b1e2a354d678c9f | 0b1e2a3645798fcd | 0b1e2a3c4f58679d | 0b1e2a3f475968cd |
| 0b1e2c3459687fad | 0b1e2c38475a6d9f | 0b1e2c3945678fad | 0b1e2c3a475869df |
| 0b1e2f345d6978ac | 0b1e2f38456a7c9d | 0b1e2f39465a78cd | 0b1e2f3a4c57689d |
| 0b1f24356a7d8e9c | 0b1f24375a6c8d9e | 0b1f243c59687dae | 0b1f243e586c79ad |
| 0b1f25374a698dce | 0b1f25384e697dac | 0b1f253c49687acd | 0b1f253e4d678a9c |
| 0b1f2634597e8dac | 0b1f26374e598acd | 0b1f263d457a89ce | 0b1f263d4a578e9c |
| 0b1f27345c698ead | 0b1f27354d6a89ce | 0b1f2736495a8ecd | 0b1f27384596cae |
| 0b1f28364d5a7e9c | 0b1f28374e5c6a9d | 0b1f283c45697ead | 0b1f283d465c79ae |
| 0b1f2c34586a7e9d | 0b1f2c38465a7d9e | 0b1f2c3d495867ae | 0b1f2c3e465789ad |
| 0b1f2d345c687a9e | 0b1f2d3645a5789ce | 0b1f2d364e5789ae | 0b1f2d3c45678a9e |
| 0b1f2e3546798acd | 0b1f2e3549678dac | 0b1f2e38456c7a9d | 0b1f2e3c4a57689d |
| 0c12345a6b7f89de | 0c12345b6d7e8f9a | 0c12345e6f7b8d9a | 0c12345f697a8bde |
| 0c1236495e7d8baf | 0c12364b5d7e89af | 0c12364d5a798fbe | 0c12364f597a8dbe |
| 0c1239475f6d8abe | 0c1239485a6b7def | 0c12394b5f687ead | 0c12394f567d8eab |
| 0c123a456f7d8b9e | 0c123a475d6f89be | 0c123a49567b8def | 0c123a495678fde |
| 0c123b456d7f8a9e | 0c123b485d697aef | 0c123b495e687fad | 0c123b4f5d678e9a |
| 0c123d475b698eaf | 0c123d485e6f79ab | 0c123d4b56798aef | 0c123d4f5b687a9e |
| 0c123e456b798fad | 0c123e47596b8daf | 0c123e4d567f89ab | 0c123e4d5f678b9a |
| 0c123f45697b8ead | 0c123f48596d7eab | 0c123f4b59678ade | 0c123f4d5a687b9e |

-continued

| | | | |
|---|---|---|---|
| 0c13245a6f798bde | 0c13245b697f8ade | 0c13245e6b7d8f9a | 0c13245f6d7b8e9a |
| 0c13254a6d7e8b9f | 0c13254b6e7d8a9f | 0c13254e697a8fbd | 0c13254f6a798ebd |
| 0c1329465f7e8bad | 0c1329475f6e8abd | 0c13294a567b8edf | 0c13294a576b8fde |
| 0c132a475e6f89bd | 0c132a485b697edf | 0c132a4b586f7d9e | 0c132a4f567e8d9b |
| 0c132b465e7f89ad | 0c132b485a6e79df | 0c132b4a586d7f9e | 0c132b4f576e8d9a |
| 0c132d465b7a8f9e | 0c132d475b6a8e9f | 0c132d4e567f8a9b | 0c132d4e576f8b9a |
| 0c132e475a6b8d9f | 0c132e485f6d7a9b | 0c132e4b567a89df | 0c132e4f586b79ad |
| 0c132f465a7b8d9e | 0c132f485e6a7d9b | 0c132f4b576a89de | 0c132f4e58697bad |
| 0c15234a697f8ebd | 0c15234b6a7e8d9f | 0c15234e6d7b8a9f | 0c15234f6e7a89bd |
| 0c15243a6b7f8d9e | 0c15243b697e8fad | 0c15243e6f7b89ad | 0c15243f6d7a8b9e |
| 0c1529364e7a8bdf | 0c1529384e6b7fad | 0c15293f467b8ade | 0c15293f486a7ebd |
| 0c152a364b798edf | 0c152a374f6b89de | 0c152a3e486b7d9f | 0c152a3f476d8e9b |
| 0c152b374e6d8f9a | 0c152b384f6a7d9e | 0c152b3a46798fde | 0c152b3e476a89df |
| 0c152d364a7e8f9b | 0c152d384a6f7b9e | 0c152d3b467f8e9a | 0c152d3b486e7a9f |
| 0c152e364f7d8a9b | 0c152e374b6f8d9a | 0c152e3a486f79bd | 0c152e3b47698adf |
| 0c152f374a698bde | 0c152f384b6e79ad | 0c152f3a476e8d9b | 0c152f3e467d8b9a |
| 0c1623495a7f8dbe | 0c16234b597f8deaf | 0c16234d5e7b89af | 0c16234f5d798abe |
| 0c1625394b7a8def | 0c16253a4d798bef | 0c16253d4f7e89ab | 0c16253e497d8fab |
| 0c1627394f5b8ade | 0c16273b4d5e8f9a | 0c16273d4b5f8e9a | 0c16273f495a8bde |
| 0c16283a4d5b7f9e | 0c16283b4f597ead | 0c16283e495f7bad | 0c16283f4b5d7a9e |
| 0c1629345b7f8ead | 0c16293b457a8fde | 0c16293d485f7abe | 0c16293f475d8eab |
| 0c162b345a7d8f9e | 0c162b3d475a89ef | 0c162b3e457f8d9a | 0c162b3e485d79af |
| 0c162d345f7b8a9e | 0c162d39485b7eaf | 0c162d3b47598aef | 0c162d3f457e8b9a |
| 0c162f345e798bad | 0c162f39475e8dab | 0c162f3a457b89de | 0c162f3a48597dbe |
| 0c1724395a6f8dbe | 0c17243b596d8eaf | 0c17243d5e6b89af | 0c17243f5d698abe |
| 0c1728345a4e596fbd | 0c17283b4d5a6e9f | 0c17283e4a5d6b9f | 0c17283f495e6abd |
| 0c1729384d5f6abe | 0c17293b456a8edf | 0c17293d465b8aef | 0c17293d4e586fab |
| 0c172a345f698ebd | 0c172a3b4d5869ef | 0c172a3e456f8d9b | 0c172a3e495b68df |
| 0c172b345e6a8d9f | 0c172b384e5d69af | 0c172b394e5a68df | 0c172b3a46598def |
| 0c172d38495b6eaf | 0c172d39465f8eab | 0c172d394a586bef | 0c172d3f456e8a9b |
| 0c172e345b6d8a9f | 0c172e3a456b89df | 0c172e3a4d5f689b | 0c172e3f49586dab |
| 0c172f345a6e89bd | 0c172f384a596dbe | 0c172f3d4a5e689b | 0c172f3e465d89ab |
| 0c1824395a6d7aef | 0c18243a5d6b79ef | 0c18243d5f697eab | 0c18243e596f7dab |
| 0c1827394a5e6fbd | 0c18273a495f6ebd | 0c18273d4e5a6b9f | 0c18273e4d5b6a9f |
| 0c1829345b6e7adf | 0c1829374a5d6fbe | 0c18293b465d7eaf | 0c18293f4d576eab |
| 0c182a345e6b79df | 0c182a37495f6dbe | 0c182a3b456d7e9f | 0c182a3f4d5e679b |
| 0c182b39465e7daf | 0c182b3a456e7d9f | 0c182b3d4a5769ef | 0c182b3e4a5967df |
| 0c182d345f6a7e9b | 0c182d374e596baf | 0c182d3b49576aef | 0c182d3f46597abe |
| 0c182e345a6f7d9b | 0c182e374d5b69af | 0c182e3b495a67df | 0c182e3f45697abd |
| 0c182f394e576dab | 0c182f3a4e5d679b | 0c182f3d465a79be | 0c182f3e456a79bd |
| 0c1923465a7d8bef | 0c19234a576d8fbe | 0c19234a5e687bdf | 0c19234f586e7dab |
| 0c1924365e7f8dab | 0c19243a567d8fbe | 0c19243a5f687bde | 0c19243f5e678bad |
| 0c1925374f6a8dbe | 0c1925384e6d7fab | 0c19253a4e678bdf | 0c19253e467b8daf |
| 0c1927364e5a8fbd | 0c1927384b5f6ade | 0c19273b485e6adf | 0c19273e465b8fad |
| 0c19283a475b6edf | 0c19283b465a7fde | 0c19283e4a567fbd | 0c19283f4b576ead |
| 0c192a364b578def | 0c192a38475b6def | 0c192a3b4f5867de | 0c192a3e485f67bd |
| 0c192d364e587baf | 0c192d37485f6eab | 0c192d374a568bef | 0c192d3f47586abe |
| 0c192e374f5b68ad | 0c192e384b567daf | 0c192e3b48576daf | 0c192e3f475a68bd |
| 0c1a2345697e8bdf | 0c1a2349586d7bef | 0c1a23495e678fbd | 0c1a234f5d687e9b |
| 0c1a25346d7f8e9b | 0c1a25374d698fbe | 0c1a25394b678edf | 0c1a253e4d687b9f |
| 0c1a27364f598ebd | 0c1a273d4f586b9e | 0c1a273e485d6f9b | 0c1a273e49568bdf |
| 0c1a28364d5e7f9b | 0c1a28374b596fde | 0c1a2839475e6bdf | 0c1a283d4b567e9f |
| 0c1a2934567e8fbd | 0c1a2934586f7bde | 0c1a29364d578bef | 0c1a2938475d6bef |
| 0c1a2b3748596def | 0c1a2b3845697fde | 0c1a2b394f5768de | 0c1a2b3d485e679f |
| 0c1a2d36457b8e9f | 0c1a2d37456b8f9e | 0c1a2d3849567fbe | 0c1a2d3948576fbe |
| 0c1a2f34576d8b9e | 0c1a2f384b5d679e | 0c1a2f3d475869be | 0c1a2f3e475968bd |
| 0c1b23456e798adf | 0c1b23465d7a89ef | 0c1b2349576e8daf | 0c1b234a5d678e9f |
| 0c1b2436597d8aef | 0c1b2439567e8daf | 0c1b243d5f678a9e | 0c1b243f5d687e9a |
| 0c1b25346a7e89df | 0c1b2538496a7def | 0c1b253d46798eaf | 0c1b253d4e687a9f |
| 0c1b27384e5d6f9a | 0c1b27394e568adf | 0c1b273f46598ead | 0c1b273f4d586a9e |
| 0c1b28364a597edf | 0c1b28374d5f6e9a | 0c1b2839465f7ade | 0c1b283d4a576f9e |
| 0c1b2a34567d8e9f | 0c1b2a374d5689ef | 0c1b2a38456f79de | 0c1b2a3f495768de |
| 0c1b2e34576f89ad | 0c1b2e36457a8d9f | 0c1b2e364d5879af | 0c1b2e38495f67ad |
| 0c1b2f34586e7d9a | 0c1b2f37456a8d9e | 0c1b2f374e5968ad | 0c1b2f394a5867de |
| 0c1d23465e798fab | 0c1d234b586a79ef | 0c1d234e57698baf | 0c1d234e5a687f9b |
| 0c1d24365a7b89ef | 0c1d243b5a678f9e | 0c1d243e56798baf | 0c1d243e5b687f9a |
| 0c1d25374b6e89af | 0c1d25384a6978ef | 0c1d253a467f89be | 0c1d253e4a678f9b |
| 0c1d27364a5e8b9f | 0c1d27384f5b6e9a | 0c1d273a465f8b9e | 0c1d273f485a6e9b |
| 0c1d283a4e567b9f | 0c1d283b4f576a9e | 0c1d283e475f6a9b | 0c1d283f465e7b9a |
| 0c1d29364a587fbe | 0c1d2937485b6aef | 0c1d29374e568fab | 0c1d293b47586eaf |
| 0c1d2a374b5f689e | 0c1d2a384f5679be | 0c1d2a3b475e689f | 0c1d2a3f485769be |
| 0c1d2e364f5789ab | 0c1d2e38475f69ab | 0c1d2e3a485b679f | 0c1d2e3f4b58679a |
| 0c1e23456d7a8f9b | 0c1e234b59687adf | 0c1e234b58697fab | 0c1e234f5da678b9f |
| 0c1e2534697b8adf | 0c1e2537496d8baf | 0c1e253a49687fbd | 0c1e253d4f678a9b |
| 0c1e27364b5d8a9f | 0c1e27394b586fad | 0c1e273a48596bdf | 0c1e273a4d568f9b |
| 0c1e2836495a7bdf | 0c1e28374f5d6b9a | 0c1e28394f567abd | 0c1e283d475a6f9b |
| 0c1e2936457f8abd | 0c1e2937456f8bad | 0c1e29384f567baf | 0c1e293d48576baf |
| 0c1e2b3457698fad | 0c1e2b384f5967ad | 0c1e2b3947586daf | 0c1e2b3a475d689f |
| 0c1e2d34567a8b9f | 0c1e2d34586b7f9a | 0c1e2d3649578fab | 0c1e2d3847596fab |
| 0c1e2f37485d69ab | 0c1e2f38456d7b9a | 0c1e2f39485a67bd | 0c1e2f3d4b57689a |

-continued

| | | | |
|---|---|---|---|
| 0c1f23456a7d8e9b | 0c1f2346597e8dab | 0c1f234d576a89be | 0c1f234e59678abd |
| 0c1f24365d798eab | 0c1f24395b678ead | 0c1f243b59687ade | 0c1f243d567a89be |
| 0c1f25346e7a8d9b | 0c1f25384d6e79ab | 0c1f2539467d8abe | 0c1f25394a687ebd |
| 0c1f27384a596bde | 0c1f273b465d8a9e | 0c1f273d49586ead | 0c1f273d4a568e9b |
| 0c1f28364ae5d7a9b | 0c1f2837495b6ade | 0c1f28394e576bad | 0c1f283d465b7e9a |
| 0c1f2a34576b8d9e | 0c1f2a36457e89bd | 0c1f2a3649587dbe | 0c1f2a384d5b679e |
| 0c1f2b34586a79de | 0c1f2b37456e89ad | 0c1f2b374a5d689e | 0c1f2b3d4e58679a |
| 0c1f2e3456798abd | 0c1f2e3749568dab | 0c1f2e38456b7d9a | 0c1f2e3b4d57689a |
| 0d12345a6e7c8f9b | 0d12345b6f7a89ce | 0d12345e6a7f8c9b | 0d12345f6b798ace |
| 0d12354a6f7c8b9e | 0d12354b6c7f8a9e | 0d12354e697a8fbc | 0d12354f6a798ebc |
| 0d1236495f7c8bae | 0d12364b5c7f89ae | 0d12364c5a798ebf | 0d12364e597a8cbf |
| 0d1238495b6c7aef | 0d12384a5c6b79ef | 0d12384c5e697fab | 0d12384f596e7cab |
| 0d1239475e6c8abf | 0d12394a5e6f78bc | 0d12394b576a8cef | 0d12394b5a678fce |
| 0d123a475c6e89bf | 0d123a495f6e78bc | 0d123a4c57698bef | 0d123a4f59678bce |
| 0d123c475b698fae | 0d123c4e576f89ab | 0d123c4e5f678a9b | 0d123c4f5b6a789e |
| 0d123f47596b8cae | 0d123f49576c8eab | 0d123f4a5c678e9b | 0d123f4c5a6b789e |
| 0d14235a6f798bce | 0d14235b697f8ace | 0d14235e6c7a8f9b | 0d14235f6a7c8e9b |
| 0d14253a6c7e8b9f | 0d14253b6e7c8a9f | 0d14253e6b798fac | 0d14253f697b8eac |
| 0d1429365f7e8bac | 0d1429375f6e8abc | 0d14293b567a8fce | 0d14293b576a8ecf |
| 0d142a375e6f89bc | 0d142a385b697ecf | 0d142a3b586f7c9e | 0d142a3f567e8c9b |
| 0d142b365e7f89ac | 0d142b385a6e79cf | 0d142b3a586c7f9e | 0d142b3f576e8c9a |
| 0d142c365a7b8e9f | 0d142c375a6b8f9e | 0d142c3e567f8a9b | 0d142c3e576f8b9a |
| 0d142e365b7a8c9f | 0d142e385f6b7c9a | 0d142e3a576b89cf | 0d142e3f58697abc |
| 0d142f375b6a8c9e | 0d142f385e6c7b9a | 0d142f3a567b89ce | 0d142f3e586a79bc |
| 0d15234a6e798fbc | 0d15234b6f7a8c9e | 0d15234e6a7f89bc | 0d15234f6b7c8a9e |
| 0d15243a6e7b8c9f | 0d15243b6f798eac | 0d15243e6a7c8b9f | 0d15243f6b7e89ac |
| 0d1529374f6a8bce | 0d1529384f6e7bac | 0d15293e476b8acf | 0d15293e486f7abc |
| 0d152a364e7b89cf | 0d152a374b698fce | 0d152a3e467c8f9b | 0d152a3f486c7b9e |
| 0d152b364f7c8e9a | 0d152b384e6c7a9f | 0d152b3a47698ecf | 0d152b3f467a89ce |
| 0d152c374a6f8e9b | 0d152c384a6b7e9f | 0d152c3b476e8f9a | 0d152c3b486a7f9e |
| 0d152e364a798bcf | 0d152e384b697fac | 0d152e3a467f8c9b | 0d152e3f476c8b9a |
| 0d152f364b7e8c9a | 0d152f374e6c8a9b | 0d152f3a48697ebc | 0d152f3b46798ace |
| 0d1623495b7f8cae | 0d16234a597c8ebf | 0d16234c5e7a89bf | 0d16234f5c798bae |
| 0d1628394f5e7bac | 0d16283b4e5c7a9f | 0d16283c4a5b7e9f | 0d16283e4b597fac |
| 0d1629354a7b8ecf | 0d1629374c5a8bef | 0d16293e485f7bae | 0d16293e4c587fab |
| 0d162a345e7b8c9f | 0d162a374b598cef | 0d162a3e485c79bf | 0d162a3e495b78cf |
| 0d162b345f798eac | 0d162b354e7f8c9a | 0d162b394e5a78cf | 0d162b3c4a5879ef |
| 0d162c354f7e8b9a | 0d162c37495f8eab | 0d162c39485a7ebf | 0d162c3b49587aef |
| 0d162e345a7c8b9f | 0d162e354b7a89cf | 0d162e394f587cab | 0d162e3c4b5f789a |
| 0d162f345b7e89ac | 0d162f374e5c89ab | 0d162f3b48597cae | 0d162f3b4c5e789a |
| 0d1724395b6f8cae | 0d17243a596c8ebf | 0d17243c5e6a89bf | 0d17243f5c698bae |
| 0d1725394e6c8fab | 0d17253a496b8cef | 0d17253c4b6d98aef | 0d17253f4c6e89ab |
| 0d1726394f5b8ace | 0d17263a4c5f8e9b | 0d17263c4a5e8f9b | 0d17263f495a8bce |
| 0d1728394e5f6abc | 0d17283a4f5c6b9e | 0d17283c4b5a6f9e | 0d17283f4a596ebc |
| 0d1729345a6f8ebc | 0d1729354a6b8fce | 0d1729364f5c8eab | 0d1729384c5f6bae |
| 0d172a345b6c8f9e | 0d172a354e6f8c9b | 0d172a364c5b89ef | 0d172a384e5c69bf |
| 0d172c345f6a8b9e | 0d172c354f6e8a9b | 0d172c364a598bef | 0d172c38495a6ebf |
| 0d172f345e698abc | 0d172f354b6a89ce | 0d172f36495e8cab | 0d172f384b596cae |
| 0d1823495a6b7cef | 0d18234b5c697aef | 0d18234c5f6e79ab | 0d18234e596c7fab |
| 0d1826394b5f7eac | 0d18263b495e7fac | 0d18263c4e5a7b9f | 0d18263e4c5b7a9f |
| 0d1829345a6b7ecf | 0d1829374a5c6ebf | 0d18293b465c7fae | 0d18293c4f567eab |
| 0d182a354b6c7e9f | 0d182a37495e6cbf | 0d182a3b4c5679ef | 0d182a3b4e5967cf |
| 0d182b345e697acf | 0d182b354a6e7c9f | 0d182b39465f7cae | 0d182b3c4f5e679a |
| 0d182c345f6e7b9a | 0d182c374f596bae | 0d182c394a567bef | 0d182c3e46597abf |
| 0d182e345b6c7f9a | 0d182e354f6b79ac | 0d182e394a5b67cf | 0d182e3c465a79bf |
| 0d182f354e697bac | 0d182f374c5b69ae | 0d182f3e49567cab | 0d182f3e4b5c679a |
| 0d1923475e6f8cab | 0d19234b576c8fae | 0d19234b5f6a78ce | 0d19234f5e678abc |
| 0d1924375b6c8aef | 0d19243b567c8fae | 0d19243b5e6a78cf | 0d19243f586c7eab |
| 0d1925374e6a8cbf | 0d19253e486f7cab | 0d19253e4b6789acf | 0d19253f467b8cae |
| 0d1926374e5a8fbc | 0d1926384a5e7bcf | 0d19263a485f7bce | 0d19263e475b8fac |
| 0d1928364b5a7ecf | 0d1928374a5b6fce | 0d19283a4f567ebc | 0d19283b4e576fac |
| 0d192b36485a7cef | 0d192b384e5f67ac | 0d192b3a47568cef | 0d192b3f4a5867ce |
| 0d192c364f587bae | 0d192c38465f7eab | 0d192c3b46578aef | 0d192c3e47586abf |
| 0d192c364f5b78ac | 0d192e384a567cbf | 0d192e3a48576cbf | 0d192e3f465a78bc |
| 0d1a2347596c8bef | 0d1a2349576e8cbf | 0d1a234c5f678b9e | 0d1a234f5c6e789b |
| 0d1a24356978ebcf | 0d1a24375c6b89ef | 0d1a2439567e8cbf | 0d1a243b5c678e9f |
| 0d1a25346e7b89cf | 0d1a25374c6980ebf | 0d1a2539486c7bef | 0d1a253e4c6b789f |
| 0d1a26374f598ebc | 0d1a263c4f587b9e | 0d1a263e485c7f9b | 0d1a263e49578bcf |
| 0d1a2837495f6bce | 0d1a283b47596ecf | 0d1a283c4b567f9e | 0d1a283c465f7e9b |
| 0d1a2b34576c8e9f | 0d1a2b3548697fce | 0d1a2b394f5678ce | 0d1a2b3c465789ef |
| 0d1a2e34567f89bc | 0d1a2e35476b8c9f | 0d1a2e39485f67bc | 0d1a2e3c475869bf |
| 0d1a2f34586c7e9b | 0d1a2f35467b8c9e | 0d1a2f3b495867ce | 0d1a2f3e465978bc |
| 0d1b24356e798acf | 0d1b2439586a7cef | 0d1b2439e5678fac | 0d1b243f5c6e789a |
| 0d1b25346f7c8e9a | 0d1b253a49678ecf | 0d1b253c46798fae | 0d1b253c4e6a789f |
| 0d1b26384e5c7f9a | 0d1b26394e578acf | 0d1b263f47598eac | 0d1b263f4c587a9e |
| 0d1b2836495e7acf | 0d1b283a46597fce | 0d1b283a4c576e9f | 0d1b283c475e6f9a |
| 0d1b2934576e8fac | 0d1b2934586a7fce | 0d1b2936485c7aef | 0d1b293c47568aef |
| 0d1b2a35486f79ce | 0d1b2a3846597cef | 0d1b2a384c5e679f | 0d1b2a3f495678ce |
| 0d1b2c35467a8f9e | 0d1b2c35476a8e9f | 0d1b2c3849567fae | 0d1b2c3948576fae |
| 0d1b2f34567c8a9e | 0d1b2f364c5879ae | 0d1b2f364e5978ac | 0d1b2f3a485c679e |

-continued

| | | | |
|---|---|---|---|
| 0d1c23475b6a89ef | 0d1c234a5b678f9e | 0d1c234e57698abf | 0d1c234e5a6f789b |
| 0d1c24375e698fab | 0d1c243a58697bef | 0d1c243e56798abf | 0d1c243e5b6f789a |
| 0d1c25374b6f89ae | 0d1c253a467e89bf | 0d1c253b486a79ef | 0d1c253b4e678f9a |
| 0d1c26374b5f8a9e | 0d1c26384f5b7e9a | 0d1c263b475c68a9f | 0d1c263f485a7e9b |
| 0d1c28364e5f7b9a | 0d1c28374f5e6a9b | 0d1c283e4b576a9f | 0d1c283f4a567b9e |
| 0d1c29364a587ebf | 0d1c2938465a7bef | 0d1c293b47586fae | 0d1c293e46578fab |
| 0d1c2b364a5e789f | 0d1c2b384f5679ae | 0d1c2b3a465f789e | 0d1c2b3f485769ae |
| 0d1c2e36485f79ab | 0d1c2e384b5a679f | 0d1c2e3a4f58679b | 0d1c2e3f475689ab |
| 0d1e24356b7c8f9a | 0d1e243a596b78cf | 0d1e243c586f79ab | 0d1e243c5b6789a9f |
| 0d1e25346a798bcf | 0d1e2539467c8abf | 0d1e25394b6f78ac | 0d1e253f4c678b9a |
| 0d1e26384b597acf | 0d1e263a475c8b9f | 0d1e263a49587fbc | 0d1e263c4b578f9a |
| 0d1e28364c5b7f9a | 0d1e2839475b6acf | 0d1e283f465c7a9b | 0d1e283f49576bac |
| 0d1e2935467f8abc | 0d1e2935476f8bac | 0d1e29384c567abf | 0d1e293c48576abf |
| 0d1e2a3456798fbc | 0d1e2a3649587cbf | 0d1e2a364b5c789f | 0d1e2a3f485967bc |
| 0d1e2c34576b8a9f | 0d1e2c34586f7a9b | 0d1e2c3648597fab | 0d1e2c3947568fab |
| 0d1e2f35486a7c9b | 0d1e2f38465c79ab | 0d1e2f38495b67ac | 0d1e2f3a4c56789b |
| 0d1f23475c698eab | 0d1f23495a678ebc | 0d1f234a596b78ce | 0d1f234c576b89ae |
| 0d1f24356c7b8e9a | 0d1f2437596e8cab | 0d1f243c567b89ae | 0d1f243e59678bac |
| 0d1f25346b7e8c9a | 0d1f2537496c8bae | 0d1f253b496e78ac | 0d1f253c48697eab |
| 0d1f26374a5c8b9e | 0d1f26394a587ebc | 0d1f263b48597ace | 0d1f263b4c578e9a |
| 0d1f28374c5a6e9b | 0d1f2839465a7bce | 0d1f283e475c6b9a | 0d1f283e49567abc |
| 0d1f2a3458697bce | 0d1f2a35467e89bc | 0d1f2a3b465c789e | 0d1f2a3e4c58679b |
| 0d1f2b34567a8c9e | 0d1f2b35476e89ac | 0d1f2b3947586cae | 0d1f2b3c485a679e |
| 0d1f2e3457698bac | 0d1f2e35486c7a9b | 0d1f2e3946578cab | 0d1f2e3c4a56789b |
| 0e1324596d7f8cab | 0e13245b6f7a89cd | 0e13245d697c8fab | 0e13245f6b798acd |
| 0e13254a6f7c8b9d | 0e13254b6c7f8a9d | 0e13254c697a8dbf | 0e13254d6a798cbf |
| 0e1326495f7c8bad | 0e13264b5c7f89ad | 0e13264d5a798fbc | 0e13264f597a8dbc |
| 0e1328495b6c7adf | 0e13284a5c6b79df | 0e13284c5a6d7f9b | 0e13284f5d6a7c9b |
| 0e13294756d6c8abf | 0e13294a5d6f78bc | 0e13294c5a678bdf | 0e13294f576a8bcd |
| 0e132a475c6d89bf | 0e132a495f6d78bc | 0e132a4b57698fcd | 0e132a4b59678cdf |
| 0e132c475a6b8f9d | 0e132c4d576f89ab | 0e132c4d5f678a9b | 0e132c4f596b78ad |
| 0e132f475b6a8c9d | 0e132f49576c8dab | 0e132f4a5c678d9b | 0e132f4c5b6978ad |
| 0e1423596f7c8dab | 0e14235a6b7f89cd | 0e14235c6d798fab | 0e14235f697a8bcd |
| 0e14253a6f7d8b9c | 0e14253b6d7f8a9c | 0e14253c697b8daf | 0e14253d6b798caf |
| 0e1427395f6d8abc | 0e14273a5d6f89bc | 0e14273c5b698fad | 0e14273f596b8cad |
| 0e1428395a6b7dcf | 0e14283b5d697acf | 0e14283d5b6f7c9a | 0e14283f5c6d7b9a |
| 0e14293657c7d8baf | 0e14293b5c687fad | 0e14293d5b678acf | 0e14293f567b8acd |
| 0e142b365d7c89af | 0e142b395f687cad | 0e142b3a56798fcd | 0e142b3a59678dcf |
| 0e142d365b7a8f9c | 0e142d3c567f89ab | 0e142d3c5f678b9a | 0e142d3f59687abc |
| 0e142f365a7b8d9c | 0e142f39567d8cab | 0e142f3b5d678c9a | 0e142f3d5a6879bc |
| 0e1523496a7c8dbf | 0e15234a6b7f8c9d | 0e15234c6d798abf | 0e15234f6c7a8b9d |
| 0e1524396d7b8caf | 0e15243b6f7a8d9c | 0e15243d697c8baf | 0e15243f6b7d8a9c |
| 0e15263a497b8dcf | 0e15263b4d7f8c9a | 0e15263c4f7d8b9a | 0e15263d4b798acf |
| 0e1527394b6a8cdf | 0e15273a4c698bdf | 0e15273c4a6f8d9b | 0e15273f4d6c8a9b |
| 0e152a384f6d7b9c | 0e152a3b4d6978cf | 0e152a3c48697dbf | 0e152a3d4f687c9b |
| 0e152b384d6c79af | 0e152b3c4a6879df | 0e152b3f486a7c9d | 0e152b3f4c6d789a |
| 0e152c38496b7daf | 0e152c3a486f7b9d | 0e152c3b49687adf | 0e152c3d4b6f789a |
| 0e152d384b6a7f9c | 0e152d39486c7abf | 0e152d394a6b78cf | 0e152d3a4c687f9b |
| 0e1623495d7a8fbc | 0e16234b5f798cad | 0e16234d597f8abc | 0e16234f5b7c89ad |
| 0e1625394d7b8acf | 0e16253b4f7c8d9a | 0e16253d497a8bcf | 0e16253f4b7d8c9a |
| 0e1627394b5a8fcd | 0e16273a4f598bcd | 0e16273c495f8dab | 0e16273f4d5c89ab |
| 0e16283a4f5d7b9c | 0e16283b4d5c79af | 0e16283c495b7daf | 0e16283d4b5a7f9c |
| 0e1629345d7b8caf | 0e16293b475a8dcf | 0e16293d457f8cab | 0e16293f485a7dbc |
| 0e162b345f7a8d9c | 0e162b3c475d8f9a | 0e162b3c48597fad | 0e162b3f457a89cd |
| 0e162d34597c8baf | 0e162d39457c8fab | 0e162d3a475b89cf | 0e162d3a485f79bc |
| 0e162f345b7d8a9c | 0e162f39485c7bad | 0e162f3b45798acd | 0e162f3d475c8b9a |
| 0e1724395c6b8fad | 0e17243a5f698dbc | 0e17243c596f8bad | 0e17243f5a6d89bc |
| 0e1725394c6b8adf | 0e17253a4f6c8d9b | 0e17253c496a8bdf | 0e17253f4a6d8c9b |
| 0e1726394d5f8cab | 0e17263a495b8fcd | 0e17263c4f5d89ab | 0e17263f4b598acd |
| 0e1728394d5a6cbf | 0e17283a4c5b6f9d | 0e17283c4a5d69bf | 0e17283f4b5c6a9d |
| 0e1729345c6a8dbf | 0e17293564c6f8dab | 0e17293645a5b8cdf | 0e17293845f5b6cad |
| 0e172a345f6b8c9d | 0e172a354f6b89cd | 0e172a364d5c8f9b | 0e172a384d596fbc |
| 0e172c34596d8abf | 0e172c35496d8fab | 0e172c364b5a89df | 0e172c384b5f69ad |
| 0e172f345a6c8b9d | 0e172f354a698bcd | 0e172f364c5d8a9b | 0e172f38495d6abc |
| 0e18234a5b697cdf | 0e18234b5a6c79df | 0e18234c5d6f7a9b | 0e18234d5c6a7f9b |
| 0e18243a5b697dcf | 0e18243b5a6d79cf | 0e18243c5d6f7b9a | 0e18243d5c6b7f9a |
| 0e1826394b5c7daf | 0e18263b495d7caf | 0e18263d4f5b7a9c | 0e18263f4d5a7b9c |
| 0e1827394a5c6dbf | 0e18273a495d6cbf | 0e18273c4f5b6a9d | 0e18273f4c5a6b9d |
| 0e182a354b6f7d9c | 0e182a3b456f7c9d | 0e182a3c49567bdf | 0e182a3d49576bcf |
| 0e182b354a6d7f9c | 0e182b394c567adf | 0e182b394d576acf | 0e182b3a456c7f9d |
| 0e182c354d697baf | 0e182c3a4f567d9b | 0e182c3b4f576d9a | 0e182c3d45697abf |
| 0e182d354c6b79af | 0e182d3c456a79bf | 0e182d3f4a567c9b | 0e182d3f4b576c9a |
| 0e1923475c6a8bdf | 0e19234a5d678cbf | 0e19234c576f8bad | 0e19234d5d6c78ab |
| 0e1924365d7b8acf | 0e19243b5c678daf | 0e19243d567f8abc | 0e19243f5c687dab |
| 0e1926345a7d8bcf | 0e19263b485a7fcd | 0e19263d475b8caf | 0e19263f457b8cad |
| 0e1927345b6c8adf | 0e19273546f5a8dbc | 0e19273645c5a8dbf | 0e19273845a5b6fcd |
| 0e192a34567d8cbf | 0e192a3648577bcdf | 0e192a3b4f5678cd | 0e192a3d485b6fbc |
| 0e192b34576c8daf | 0e192b38475d6acf | 0e192b384c567fad | 0e192b3f4a5768cd |
| 0e192c354f687bad | 0e192c38456f7dab | 0e192c3b45678adf | 0e192c3d475a68bf |
| 0e192d35486c7fab | 0e192d354a678bcf | 0e192d364c5b78af | 0e192d3f456a78bc |

-continued

| | | | |
|---|---|---|---|
| 0e1a23475f6d8c9b | 0e1a234b596f78cd | 0e1a234b5c678f9d | 0e1a234f576d89bc |
| 0e1a25384b697dcf | 0e1a253b48697cdf | 0e1a253c4f687b9d | 0e1a253d4f6b789c |
| 0e1a27345c6b89df | 0e1a27354d698fbc | 0e1a27364d598cbf | 0e1a2738495f6bcd |
| 0e1a2835496d7bcf | 0e1a283b4d576f9c | 0e1a283c456f7d9b | 0e1a283d49567cbf |
| 0e1a2935486f7bcd | 0e1a29384f567dbc | 0e1a293b47568cdf | 0e1a293d485c67bf |
| 0e1a2b34567c8f9d | 0e1a2b34596d78cf | 0e1a2b384d5f679d | 0e1a2b3c456789df |
| 0e1a2d35476b8f9c | 0e1a2d36485f7c9b | 0e1a2d364b5789cf | 0e1a2d3c475968bf |
| 0e1a2f345c687d9b | 0e1a2f36457b8c9d | 0e1a2f3b495768cd | 0e1a2f3d456978bc |
| 0e1b24365f7c8d9a | 0e1b243a59687fcd | 0e1b243a5d678f9c | 0e1b243f567c89ad |
| 0e1b25384a6d7cf | 0e1b253a486c79df | 0e1b253f4c687a9d | 0e1b253f4d6a789c |
| 0e1b26345d7a89cf | 0e1b2639485f7acd | 0e1b263c45798fad | 0e1b263c47598daf |
| 0e1b28354d6c7f9a | 0e1b2839456a7cdf | 0e1b28394c576daf | 0e1b283c4a567f9d |
| 0e1b29364a578dcf | 0e1b2938456a7fcd | 0e1b29384c5d67af | 0e1b293f48576cad |
| 0e1b2a34576d8f9c | 0e1b2a3459687cdf | 0e1b2a354d6789cf | 0e1b2a3c485f679d |
| 0e1b2c36457a8f9d | 0e1b2c364d5978af | 0e1b2c38475f6d9a | 0e1b2c3a475689df |
| 0e1b2f345d6c789a | 0e1b2f35476a8d9c | 0e1b2f354c6879ad | 0e1b2f394a5678cd |
| 0e1c2347596b8adf | 0e1c2349576b8fad | 0e1c234d5a6789bf | 0e1c234d5f6978ab |
| 0e1c25384d6f7b9a | 0e1c253a49687dbf | 0e1c253b496d78af | 0e1c253d486f7a9b |
| 0e1c27345a6d8f9b | 0e1c27354b6f89ad | 0e1c27364b5f8a9d | 0e1c27384f596dab |
| 0e1c28354f6b7d9a | 0e1c283a45697bdf | 0e1c283b4f567a9d | 0e1c283d4b5769af |
| 0e1c29345a687bdf | 0e1c2936457d8abf | 0e1c293b456f78ad | 0e1c293d4f5768ab |
| 0e1c2b35476d89af | 0e1c2b3648597adf | 0e1c2b364d578f9a | 0e1c2b3a475f689d |
| 0e1c2d34567a89bf | 0e1c2d345f6b789a | 0e1c2d384b5967af | 0e1c2d3a45678f9b |
| 0e1c2f3548697dab | 0e1c2f3849567bad | 0e1c2f3b485a679d | 0e1c2f3d47568a9b |
| 0e1d2436597a8bcf | 0e1d2439567a8fbc | 0e1d243c5b6789af | 0e1d243c5f6879ab |
| 0e1d25384c6b7f9a | 0e1d25394a687cbf | 0e1d25394b6c78af | 0e1d253c486a7f9b |
| 0e1d26345b7c8f9a | 0e1d263a457f89bc | 0e1d263a475f8b9c | 0e1d263f48597cab |
| 0e1d28354b6a79cf | 0e1d283a4c5679bf | 0e1d283f456c7a9b | 0e1d283f4a576b9c |
| 0e1d29345b6a78cf | 0e1d2935476c8baf | 0e1d29354a687fbc | 0e1d293f4c5678ab |
| 0e1d2a36457c89bf | 0e1d2a364b5f789c | 0e1d2a3847596bcf | 0e1d2a3c47568f9b |
| 0e1d2c34576b89af | 0e1d2c345f687a9b | 0e1d2c354b678f9a | 0e1d2c3a485967bf |
| 0e1d2f364c578b9a | 0e1d2f38456c79ab | 0e1d2f384a5b679c | 0e1d2f3948576abc |
| 0e1f23475a6c8d9b | 0e1f23495b6a78cd | 0e1f234a57698dbc | 0e1f234c5b678a9d |
| 0e1f24365b7d8c9a | 0e1f24395a687bcd | 0e1f243b56798cad | 0e1f243d5a678b9c |
| 0e1f26345c7b8d9a | 0e1f2639457d8abc | 0e1f263b475d8a9c | 0e1f263d485c79ab |
| 0e1f27345d6a8c9b | 0e1f2735496c8bad | 0e1f27364a5c8b9d | 0e1f27384c5d69ab |
| 0e1f2a3549687dbc | 0e1f2a3845697bcd | 0e1f2a3b475c689d | 0e1f2a3d45678c9b |
| 0e1f2b35486a79cd | 0e1f2b354c678d9a | 0e1f2b364a5d789c | 0e1f2b39456c78ad |
| 0e1f2c34567b8a9d | 0e1f2c36485a7d9b | 0e1f2c3b485769ad | 0e1f2c3d495678ab |
| 0e1f2d34576a8b9c | 0e1f2d38475b6c9a | 0e1f2d384a5679bc | 0e1f2d394c5768ab |
| 0f12354a6d7e8b9c | 0f12354b6e7d8a9c | 0f12354c697a8dbe | 0f12354d6a798cbe |
| 0f12384a5b697cde | 0f12384b5a6c79de | 0f12384c5d6b7e9a | 0f12384d5c6e7b9a |
| 0f12394a5c6d78be | 0f12394b5c687dae | 0f12394c576b8ade | 0f12394d567b8ace |
| 0f123a456c7e8b9d | 0f123a4b5b697dce | 0f123a495d6c78be | 0f123a4e567d8c9b |
| 0f123b456e7c8a9d | 0f123b485a6d79ce | 0f123b495d687cae | 0f123b4e576d8c9a |
| 0f123c45697b8dae | 0f123c485d6a7e9b | 0f123c49576a8bde | 0f123c4e5a687b9d |
| 0f123d456b798cae | 0f123d485c6e7a9b | 0f123d49567a8bce | 0f123d4e5a6b789c |
| 0f123e4a567c8d9b | 0f123e4b576c8d9a | 0f123e4c5b687a9d | 0f123e4d5b6a789c |
| 0f1326495e7d8bac | 0f1326ab5d7e89ac | 0f13264c5a798ebd | 0f13264e597a8cbd |
| 0f13284956a6b7cde | 0f13284b5c6697ade | 0f13284c5b6e7d9a | 0f13284e5d6c7b9a |
| 0f1329465c7d8bae | 0f1329485a6b7ecd | 0f13294a5c6e78bd | 0f13294d567e8cab |
| 0f132a495e6c78bd | 0f132a4b586c7e9d | 0f132a4c5b6789de | 0f132a4e567b89cd |
| 0f132b465d7c89ae | 0f132b485e697acd | 0f132b4a586e7c9d | 0f132b4d5e678c9a |
| 0f132c465a7b8e9d | 0f132c48596e7dab | 0f132c4a59678bde | 0f132c4d58697bae |
| 0f132d49567c8eab | 0f132d4b5c678e9a | 0f132d4c586b79ae | 0f132d4e596b78ac |
| 0f132e465b7a8c9d | 0f132e485d6c79ab | 0f132e4a56798bcd | 0f132e4d5b6978ac |
| 0f1427395e6c8abd | 0f14273a5c6e89bd | 0f14273d5b698eac | 0f14273e596b8dac |
| 0f14283956b6d7ace | 0f14283a5d6b79ce | 0f14283c5a6c7e9b | 0f14283c5c6a7d9b |
| 0f1429375d6c8abe | 0f1429385b6e7acd | 0f14293b5d687eac | 0f14293c576e8dab |
| 0f142a375c6d89be | 0f142a385e6b79cd | 0f142a3b586d7e9c | 0f142a3c5e678d9b |
| 0f142b395e687dac | 0f142b3a586e7d9c | 0f142b3d5a6789ce | 0f142b3e576a89cd |
| 0f142c39576d8eab | 0f142c3a5d678e9b | 0f142c3d58697abe | 0f142c3e59687abd |
| 0f142d375b6a8e9c | 0f142d38596c7eab | 0f142d3b59678ace | 0f142d3c586a79be |
| 0f142e375a6b8d9c | 0f142e385c697dab | 0f142e3b57698acd | 0f142e3c5a6879bd |
| 0f1523496d7a8cbe | 0f15234a6e7b8d9c | 0f15234d697c8abe | 0f15234e6a7d8b9c |
| 0f1524396b7c8dae | 0f15243b6a7e8c9d | 0f15243c6d798bae | 0f15243e6c7b8a9d |
| 0f1526394b7a8dce | 0f15263a4d798bce | 0f15263c4a7e8c9b | 0f15263c4e7d8a9b |
| 0f1527384b6c8de | 0f15273b4c6e8d9a | 0f15273c4b698ade | 0f15273d4e6c8b9a |
| 0f152a384e6b7c9d | 0f152a3b4c6879de | 0f152a3c4e6d789b | 0f152a3d486c79be |
| 0f152b384c697dae | 0f152b3d4a6978ce | 0f152b3e486d7a9c | 0f152b3e4d687c9a |
| 0f152c384b6e7a9d | 0f152c39486a7dbe | 0f152c394a687bde | 0f152c3a4d6e789b |
| 0f152d38496c7bae | 0f152d3a486b7e9c | 0f152d3b496a78ce | 0f152d3c4b687e9a |
| 0f1623495d7b8eac | 0f16234a5e798cbd | 0f16234d597e8bac | 0f16234e5a7c89bd |
| 0f1628394d5b7cae | 0f16283b4c5a7e9d | 0f16283c4b5d79ae | 0f16283e4a5c7b9d |
| 0f1629354e7a8bcd | 0f162937a4b5c8cde | 0f16293c4e5d78ab | 0f16293e485b7dac |
| 0f162a345b7c8e9d | 0f162a354b798ecd | 0f162a3c48597ebd | 0f162a3c49587bde |
| 0f162b34597d8cae | 0f162b374c5d8e9a | 0f162b394c587ade | 0f162b3e4a5978cd |
| 0f162c345e7a8b9d | 0f162c374b5a89de | 0f162c394d5e78ab | 0f162c3e4b587d9a |
| 0f162d345c7b89ae | 0f162d354c7e89ab | 0f162d3b485e79ac | 0f162d3b4e587c9a |
| 0f162e35497d8cab | 0f162e374d5c8b9a | 0f162e39485c7abd | 0f162e3b495a78cd |

| | | | |
|---|---|---|---|
| 0f1724395c6a8ebd | 0f17243b5e698dac | 0f17243c596e8abd | 0f17243e5b6d89ac |
| 0f17283a4d5c69be | 0f17283b4e5d6a9c | 0f17283c495a6dbe | 0f17283d4a5b6e9c |
| 0f1729384e5a6cbd | 0f17293b465a8dce | 0f17293e456b8acd | 0f17293e4d5c68ab |
| 0f172a34596c8dbe | 0f172a3b4e5968cd | 0f172a3d465c8e9b | 0f172a3d49586bce |
| 0f172b345a6d8e9c | 0f172b384d596eac | 0f172b394d586ace | 0f172b3a45698ecd |
| 0f172c345d6a89be | 0f172c384a5e69bd | 0f172c3d456e89ab | 0f172c3e4a586d9b |
| 0f172d345e6b8a9c | 0f172d3a465b89ce | 0f172d3a4e586c9b | 0f172d3c495e68ab |
| 0f172e38495d6bac | 0f172e39456c8dab | 0f172e394a5b68cd | 0f172e3c465d8a9b |
| 0f1923456d7e8cab | 0f1923465d7b8ace | 0f19234b5a687ecd | 0f19234c576e8abd |
| 0f1924356e7c8dab | 0f1924375c6a8bde | 0f19243a5b6e78cd | 0f19243d567e8bac |
| 0f1926374c5a8dbe | 0f1926384e5d7cab | 0f1926 3a4e578bcd | 0f1926 3e457b8dac |
| 0f1927354e6a8cbd | 0f19273d465b8cae | 0f19273e485c6dab | 0f19273e4b568acd |
| 0f192a345b6d78ce | 0f192a354b678dce | 0f192a38465c7bde | 0f192a384c567ebd |
| 0f192b345a687cde | 0f192b37485d6ace | 0f192b3a45678cde | 0f192b3d48576eac |
| 0f192c34576d8bae | 0f192c384b5d67ae | 0f192c3d465a78be | 0f192c3e456a78bd |
| 0f192d34567c8abe | 0f192d354e687bac | 0f192d374c5b68ae | 0f192d3a485c67be |
| 0f1a23456e7b89cd | 0f1a23465e7d8c9b | 0f1a234b58697dce | 0f1a234c5d6789be |
| 0f1a24395e6b78cd | 0f1a243b58697cde | 0f1a243c5e678b9d | 0f1a243e567c89bd |
| 0f1a26345d7c8e9b | 0f1a26374d598cbe | 0f1a26394b578ecd | 0f1a263e4d587b9c |
| 0f1a2734596c8bde | 0f1a27354c698ebd | 0f1a273b48596ecd | 0f1a273e4c586b9d |
| 0f1a28354d6e7c9b | 0f1a2839456c7bde | 0f1a28394c567dbe | 0f1a283c4b576e9d |
| 0f1a29345d6b78ce | 0f1a29354d678bce | 0f1a293b46578cde | 0f1a293e48576cbd |
| 0f1a2d35467b8e9c | 0f1a2d37485e6c9b | 0f1a2d374b5689ce | 0f1a2d3c465978be |
| 0f1a2e34567d8b9c | 0f1a2e37456b8c9d | 0f1a2e3b485d679c | 0f1a2e3c456978bd |
| 0f1b23495e687acd | 0f1b234a586d79ce | 0f1b234d5e678a9c | 0f1b234e576d89ac |
| 0f1b24356a7e89cd | 0f1b24375e6c8d9a | 0f1b243a586c79de | 0f1b243d5c6789ae |
| 0f1b26634597d8ace | 0f1b26384a597ecd | 0f1b263d45798eac | 0f1b263d4e587a9c |
| 0f1b27345c6d8e9a | 0f1b273a49568ecd | 0f1b273c46598dae | 0f1b273c4e586a9d |
| 0f1b2835496a7dce | 0f1b283a4d567e9c | 0f1b283c456d7e9a | 0f1b283d49576cae |
| 0f1b29345c687ade | 0f1b29374a568dce | 0f1b29384e567dac | 0f1b293c45678ade |
| 0f1b2c37456a8e9d | 0f1b2c374d5968ae | 0f1b2c38465e7d9a | 0f1b2c3a465789de |
| 0f1b2e34576c8a9d | 0f1b2e35467a8d9c | 0f1b2e354d6879ac | 0f1b2e384a5c679d |
| 0f1c2349576a8ebd | 0f1c234a59678dbe | 0f1c234d586a7e9b | 0f1c234e59687dab |
| 0f1c24356d798eab | 0f1c2437596b8ade | 0f1c243a5b678e9d | 0f1c243d586b7e9a |
| 0f1c26345e7a8d9b | 0f1c26384d5e79ab | 0f1c263a457e89bd | 0f1c263a49587dbe |
| 0f1c27345b6a89de | 0f1c273b465e8a9d | 0f1c273b49586dae | 0f1c273d4e5689ab |
| 0f1c28354e6d7a9b | 0f1c283a4e576b9d | 0f1c283c456a79de | 0f1c283d4a5679be |
| 0f1c2934576b8dae | 0f1c2935467d8abe | 0f1c29354a687ebd | 0f1c29384d5b67ae |
| 0f1c2b37456d89ae | 0f1c2b374a5e689d | 0f1c2b3846597ade | 0f1c2b3d46578e9a |
| 0f1c2e345b687d9a | 0f1c2e374d568a9b | 0f1c2e3849567abd | 0f1c2e3b45678d9a |
| 0f1d2345697c8eab | 0f1d2346597a8bce | 0f1d234b5a678e9c | 0f1d234c586e7a9b |
| 0f1d2439567b8eac | 0f1d243b59678cae | 0f1d243c586e7b9a | 0f1d243e596c78ab |
| 0f1d26345a7b89ce | 0f1d26374a5e8b9c | 0f1d26394a587cbe | 0f1d263e4c5789ab |
| 0f1d27345e6b8c9a | 0f1d27354b6e89ac | 0f1d27394b586cae | 0f1d273c485e69ab |
| 0f1d28354a697bce | 0f1d283b4c5769ae | 0f1d283e456b7c9a | 0f1d283e4b567a9c |
| 0f1d2934567a8cbe | 0f1d2937456c8bae | 0f1d293b456e78ac | 0f1d293c485a67be |
| 0f1d2a35467c89be | 0f1d2a3748596bce | 0f1d2a374c568e9b | 0f1d2a3b465e789c |
| 0f1d2e345a6c789b | 0f1d2e354a678c9b | 0f1d2e3948576bac | 0f1d2e3c46578b9a |
| 0f1e23456a798bcd | 0f1e23465a7c8d9b | 0f1e234b57698dac | 0f1e234c5d6879ab |
| 0f1e2435697b8acd | 0f1e24375b6d8c9a | 0f1e243a56798cbd | 0f1e243d5c6978ab |
| 0f1e26374b5d8a9c | 0f1e2638495a7bcd | 0f1e2639457c8abd | 0f1e263d49578cab |
| 0f1e2735496d8bac | 0f1e2739485b6acd | 0f1e27394c568dab | 0f1e273a465c8b9d |
| 0f1e2a34567b8d9c | 0f1e2a3549687cbd | 0f1e2a374b5c689d | 0f1e2a3d485b679c |
| 0f1e2b34576a8c9d | 0f1e2b384c5a679d | 0f1e2b39456d78ac | 0f1e2b3a465d789c |
| 0f1e2c345d687b9a | 0f1e2c37485a6d9b | 0f1e2c3a485769bd | 0f1e2c3d45678b9a |
| 0f1e2d345c6a789b | 0f1e2d354c678a9b | 0f1e2d38465b7c9a | 0f1e2d384b5679ac |

We call the set of matrices defined above R. A generator matrix G, of dimension 5 by 16, defines a code that has 32 codewords. Each codeword is a vector of length 16. Note the same set of codewords can be generated by any basis of these 32 vectors. An embodiment includes all such generator matrices G' with the property that the codewords generated by G' are identical to the codewords generated by another matrix G where G is in R.

The modulated QPSK symbols from FIG. 5 are used in flash assignment as the non-zero modulation symbols in a given resource. Tone assignment module 405 in FIG. 4 determines which tone-symbols are the non-zero symbols.

In some embodiments, flash symbols are applied to sectorized cell deployment where each cell includes 3 sectors. In the embodiment, the available resource for the flash tcch channel is a segment of 15×7 tone-symbols, structured as 15 tones with time duration of 7 OFDM symbols. The tone-symbols are indexed in the following way: let t denote the OFDM-symbol index 0, . . . , 6, and let f denote the tone index 0, . . . , 14. Then a tone-symbol of pair (f, t) is indexed as t*15+f. This index is illustrated in FIG. 5. In a sectorized deployment, each sector only uses a subset of the tone-symbols for the flash signaling. In one embodiment each sector uses 32 distinct tone-symbols. The total 96 tone-symbols for 3 sectors are all distinct. The remaining 9 tone-symbols are to be used for pilot swapping.

The mapping of the available resource to three different sector types can be made in many ways. Any selection of 96 symbols out of the 105 tone symbols and mapping them into 3 different groups is possible in one embodiment. So there are totally $$\binom{105}{96} \times \binom{96}{32} \times \binom{64}{32} = M$$

different mappings, where $$\binom{N}{k}$$

for any integers N and k is referred to as "N choose k" and is defined as the number of ways of choosing k distinct objects from among N distinct objects. In $$\binom{N}{k} = N!/((N-k)! * k!).$$

Thus, for example, $$\binom{105}{96} = 105!/((105-96)! * 96!).$$

FIG. 7 shows one exemplary mapping. Illustration 700 describes the division of the dedicated tone-symbol resource among three sectors. Illustration 700 further describes the exact selection of the subgroup of non-zero tone-symbols given the two information bits.

In illustration 700, tone symbols 0, 1, 2, 3, 15, 16, 17, 18, 30, 31, 32, 33, 45, 46, 47, 48, 60, 61, 62, 63, 75, 76, 77, 78, 90, 91, 92 and 93, represented by format 704A, combined with tone symbols 12, 27, 42 and 57, represented by format 704B are to be used for sector type 0; tone symbols 4, 5, 6, 7, 19, 20, 21, 22, 34, 35, 36, 37, 49, 50, 51, 52, 64, 65, 66, 67, 79, 80, 81, 82, 94, 95, 96 and 97, represented by format 706A combined with tone symbols 13, 28, 43 and 58, represented by format 704B, are to be used for sector type 1; tone symbols 8, 9, 10, 11, 23, 24, 25, 26, 38, 39, 40, 41, 53, 54, 55, 56, 68, 69, 70, 71, 83, 84, 85, 86, 98, 99, 100 and 101, represented by format 708A, combined with tone symbols 14, 29, 44 and 59, represented by format 708B, are to be used for sector type 2. Tone symbols 72, 73, 74, 87, 88, 89, 102, 103, 104, represented by format 718, are reserved as substitute tone-symbols that are used as symbols for pilot swapping. In illustration 700 tone symbols of format 704A are separated vertically from tone symbols of format 706A. The separation is just for illustration purposes to illustrate that tone symbols 704A and 704B are used for a first sector type, tone symbols 706A and 706B are used for a second sector type and tone symbols 708A and 708B are used for a third sector type. In fact, the tones in format 704A are contiguous with the tones of format 706A. Similarly, all of the blank spacing between tones in illustration 700 is merely to indicate different uses. The tones are contiguous in frequency and the tone symbols are contiguous in time.

In illustration 700, format 701 indicates the non-zero symbols to be used if the 2 information bits are (0,0); format 702 indicates the non-zero symbols to be used if the 2 information bits are (0,1); format 703 indicates the non-zero symbols to be used if the 2 information bits are (1,0); and finally format 705 indicates the non-zero symbols to be used if the 2 information bits are (1,1).

Given a sector type, information bits determine which tone symbols to be used as non-zero tone-symbols and in what phase and amplitude. In some embodiments, there are seven information bits, denoted as b6, b5, b4, b3, b2, b1 and b0. These information bits are partitioned into two groups of bits. The first group determines the positions of non-zero modulation-symbols. Information bits in the first group are called position information bits. The second group determines the modulation symbols to be used. Information bits in the second group are called modulation symbol information bits. As described before, encoding and mapping module 404 uses the second group of information bits to determine the QPSK symbols. Tone assignment module 405 uses the first group of information bits to determine the tone positions of the non-zero tone symbols. In some embodiments, there are 7 information bits. Two out of the 7 bits, e.g. b6, b5, determine the position among 8 non-zero modulation symbols. The remaining 5 bits, e.g., b4 . . . b0, determine the actual modulation symbol used on the 8 non-zero modulation symbols.

Figure 8:
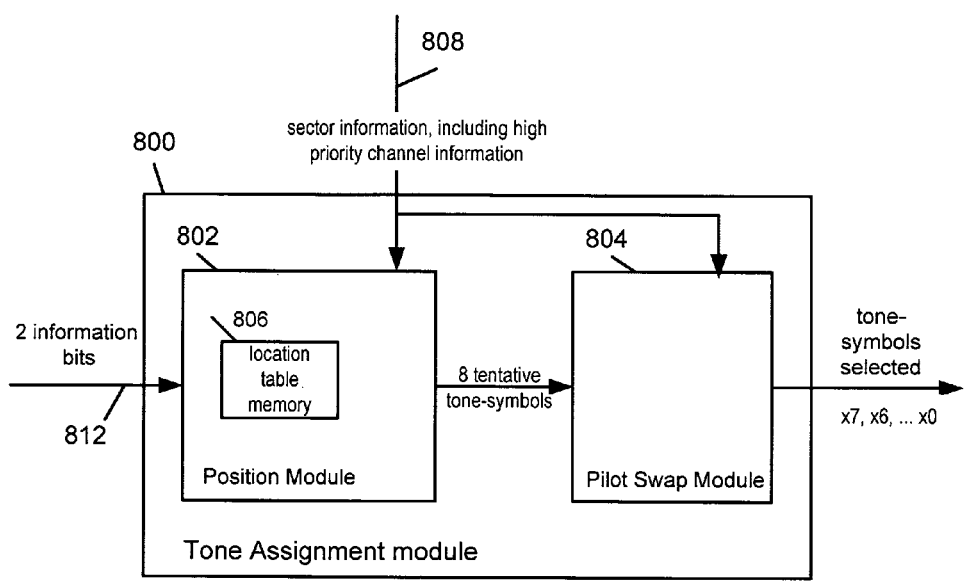
FIG. 8 illustrates a module that determines the tone-symbols used for the flash assignment in accordance with an aspect.

FIG. 8 illustrates the non-zero modulation-symbol selection process. Tone assignment module 800 selects the final tone-symbols x7, x6, . . . , x0, based on the 2 information bits 812 and sector type information 808. The selection procedure comprises two steps. In step 1, Position module 802 determines 8 tentative positions using the following rule: given a sector type, the module selects the 8 positions corresponding to information bits b6, b5, specified by the table values in FIG. 700. The table values are stored, e.g. in a memory 806. For example, assuming the sector type is 0, and information bits [b6b5]=[00], then the non-zero symbols to be used are indexed as 0, 15, 30, 45, 60, 75, 90, and 12.

The tone-symbols selected by module 802 are tentative. The final choice of x7, . . . , x0 depends on whether the 8 tentative tone-symbols are already occupied by other high priority overlain tone symbols, e.g., pilot symbols and sector null symbols used in the downlink transmission. If none of the tentative tone-symbols are occupied by those high priority overlain symbols, then the final tone-symbols are the same as the tentative ones. Otherwise, the following pilot replacement operation should be performed to determine the replacement tone-symbol for each tentative tone-symbol that is occupied by the pilot or the sector null. Pilot-swap-module 804 performs the pilot swapping procedure.

As mentioned above, there is totally a set of 9 reserved tone symbols, also known as pilot replacement tone-symbols, in the dedicated tone-symbols resource. These 9 replacement tone-symbols are shared by all three sectors. For each tone-symbol that needs to be replaced or swapped, we find the corresponding replacement tone-symbol. For convenience, we can assume we do tone-symbol swapping to the tentative 8 tone-symbols one by one following the increasing order of tone-symbol index in each of the sectors; then we only need to specify the order of replacement tone-symbols to be used. Again, this ordering can be made in many ways. In fact, all the $(9!)^3$ distinct orderings are possible. An exemplary ordering for the three sectors are:

sector 0 has ordering
$A_0$=72, $A_1$=87, $A_2$=102, $B_2$=103, $C_2$=104, $B_1$=88, $C_1$=89, $B_0$=73, $C_0$=74;

sector 1 has ordering
$B_0$=73, $B_1$=88, $B_2$=103, $C_2$=104, $A_2$=102, $C_1$=89, $A_1$=87, $C_0$=74, $A_0$=72;

and sector 2 has ordering
$C_0$=74, $C_1$=89, $C_2$=104, $A_2$=102, $B_2$=103, $A_1$=87, $B_1$=88, $A_0$=72, $B_0$=73.

Since the number of pilot hits in a given sector is (pseudo) random it is sometimes possible that the same swap tone is used for transmission by two or three sectors simultaneously thus creating a collision. Ordering the tones the way described above minimizes the probability of collisions between sectors.

The replacement rule is as follows. For a given sector type, the base-station sector checks, in the order indicated in the "original tone-symbols", whether each of the original tone-symbols is to be occupied by either the pilot or the sector null pilot channel. If so, the base-station sector examines the list of candidate replacement tone-symbols in the order indicated in the "replacement tone-symbols". If a replacement tone-symbol is found, which has not previously been used as a replacement in the current segment, and which is not itself occupied by pilot or sector null channel, then the replacement tone-symbol is used as the replacement for that original tone-symbol. If no replacement tone-symbol is found, then the original tone-symbol has said to have no replacement in the segment.

The final choice of $x7, \ldots, x0$ is set to the original tentative tone-symbol, if it is not to be occupied by either the pilot or the sector null channel. Otherwise, if a replacement is found for that original tentative tone-symbol, then the final choice is set to the replacement tone-symbol; if no replacement is found, then the corresponding modulation-symbol is silently discarded and is not transmitted. In that case the present flash segment has less than 8 tone-symbols that are mapped with nonzero modulation-symbols.

The following example illustrates the above replacement rule. Suppose sector type is zero. Suppose that $b6=0$, $b5=1$. From FIG. 7, the tentative choice is $x7=2$, $x6=16$, $x5=27$, $x4=31$, $x3=46$, $x2=61$, $x1=76$, $x0=91$. Now suppose that in the flash segment, the following tone-symbols are to be occupied by either the pilot or sector null channel: 0, 16, 42, 4, 5, 14, 29, 87, and 89. From the replacement rule, the BSS only needs to find replacements for 0, 16, and 42. The base-station-sector does not need to find replacements for 4, 5, 14, 29, 87, 89, since those tone-symbols are not in the "original tone-symbols" column for sector-type=0. Moreover, tone-symbols 87, 89, which are two tone-symbols in the "replacement tone-symbols" column, cannot be used as replacement, since they themselves are occupied by either the pilot or sector null channel. Therefore, the replacement rule defines the following replacements: 72 for 0, 102 for 16, 103 for 42. Hence, the final choice is $x7=2$, $x6=102$, $x5=27$, $x4=31$, $x3=46$, $x2=61$, $x1=76$, $x0=91$.

Figure 9:
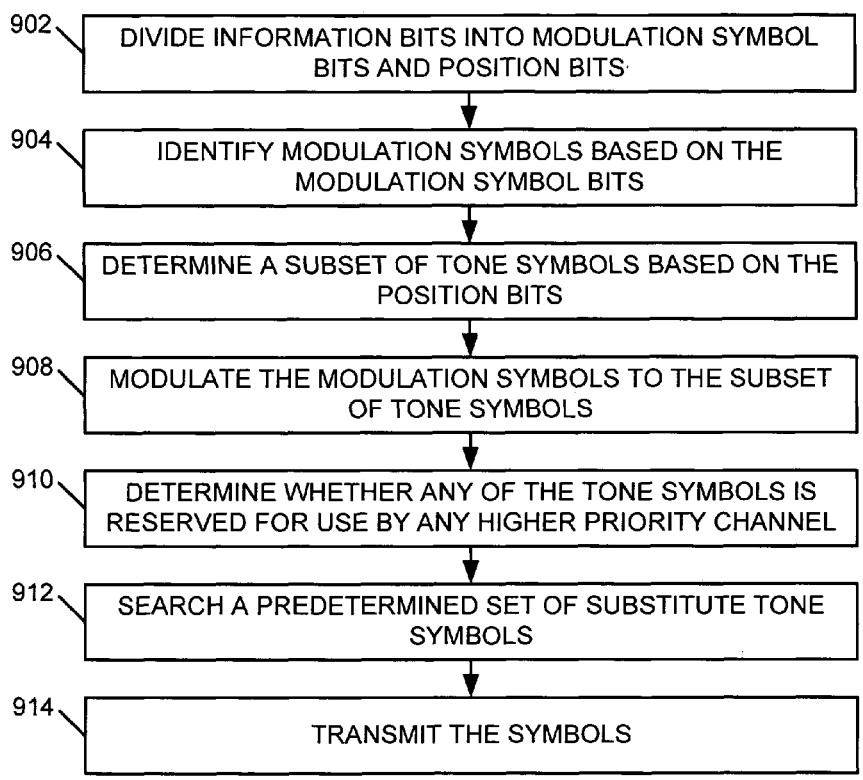
FIG. 9 is a flow chart illustrating a method of communicating overhead signals in a wireless communication system.

FIG. 9 is a flow chart illustrating a method of communicating overhead signals in a wireless communication system. Not all of the steps described are required. Further the steps may be performed in a different order from that shown. In step 902, information bits are divided into modulation symbol information bits (also known as modulation symbol bits) and position information bits (also known as position bits). The modulation symbol bits may be the vector u (also, k bits) shown with respect to FIG. 4. The position bits may be the 2 bits shown as an input to tone assignment module 405 in FIG. 4. Returning to FIG. 9, in step 904, modulation symbols are identified based on the modulation symbol bits. The identifying may be performed by encoding and mapping module 404 of FIG. 4, which is described in further detail with respect to FIG. 5.

In step 906, a subset of tone symbols is determined based on the position bits. The determining of step 906 may be performed by tone assignment module of FIG. 4, which is described in further detail with respect to FIG. 8. In step 908, the modulation symbols are modulated to the subset of tone symbols. The modulation may be performed by mapping module 502, described with respect to FIG. 5.

In step 910, it is determined whether any of the tone symbols selected by step 906 are reserved substitute tone symbols for use by higher priority channels. The higher priority channels could be pilot channels or sector null channels, for example. As shown with respect to pilot swap module 804 in FIG. 8, step 910 may be performed by pilot swap module 804 before step 908.

In step 912, a predetermined set of substitute tone symbols is searched. The predetermined set may be tone set 718, as shown with respect to FIG. 7. The search may be performed as described above with respect to FIG. 8. In step 914, the symbols are transmitted. The transmitting may be performed by transmitter module 334 and antenna 338, as described with respect to FIG. 3.

Messages described in the present patent application are stored in the memory of the nodes which generate and/or receive said messages in addition to the nodes through which said messages are communicated. Accordingly, in addition to being directed to methods and apparatus for generating, transmitting and using messages embodiments described herein are also directed to machine readable media, e.g., memory, which stores one or more of the messages of the type described and shown in the text and figures of the present application.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, an aspect is directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above description. Such variations are to be considered within the scope of aspects of some embodiments. The methods and apparatus may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of some embodiments.

What is claimed is:

1. A method of communicating information bits in a wireless communication system, the method comprising:
   dividing the information bits into at least one modulation symbol bit and at least one position bit;
   identifying modulation symbols based on the at least one modulation symbol bit;

determining a subset of tone symbols based on the at least one position bit;

determining whether any of the subset of tone symbols is reserved for use by any one of a plurality of higher priority channels;

when it is determined that one of the subset of tone symbols is reserved for use by any one of the plurality of higher priority channels, modifying the subset of tone symbols by performing one operation from the group of operations consisting of: i) a tone symbol replacement operation and ii) a tone symbol dropping operation; and modulating the modulation symbols to the subset of tone symbols.

2. The method of claim 1, wherein the modulation symbols comprises quadrature phase shift keying modulation symbols and wherein a ratio of a position bit number of position bits to a modulation symbol bit number of modulation symbol bits is two to five.

3. The method of claim 1, wherein said step of modifying the subset of tone symbols includes:

i) replacing the one of the subset of tone symbols in the subset reserved for use by one of the plurality of higher priority channels with a substitute tone symbol when a substitute tone symbol is available; and ii) dropping said one of the subset of tone symbols in the subset reserved for use by one of the plurality of higher priority channels from said subset when a substitute tone symbol is not available.

4. The method of claim 3, wherein the higher priority channels include a pilot channel and a sector null channel.

5. The method of claim 3, further comprising:

performing a search of a predetermined set of substitute tone symbols for an available substitute tone symbol.

6. The method of claim 5, further comprising:

identifying at least one of the substitute tone symbols as a reserved tone symbol reserved for use by a second sector; and wherein the performing a search of a predetermined set of substitute tone symbols comprises searching other substitute tone symbols before searching the identified at least one substitute tone symbol.

7. The method of claim 1, wherein the modulation symbols are high power modulation symbols, each high power modulation symbol being a modulation symbol that is to be transmitted at least 3 dB above an average per symbol transmission power used to transmit modulation symbols used to communicate traffic channel information; and wherein said method includes dropping at least one of the subset of tone symbols prior to performing said modulating.

8. A method of communicating information bits in a wireless communication system, the method comprising:

dividing the information bits into at least one modulation symbol bit and at least one position bit;

identifying modulation symbols based on the at least one modulation symbol bit by:

i) performing a vector matrix multiplication operation on a bit vector u comprising the modulation symbol bits, the matrix multiplication operation including multiplying the bit vector by a matrix G to produce a vector of coded bits, wherein:

$$G \text{ or a permutation of } G = \begin{bmatrix} 1000000101011111 \\ 0100011011000111 \\ 0010001110101101 \\ 0001010110110011 \\ 0000111001111001 \end{bmatrix}; \text{ and}$$

ii) mapping a plurality of pairs of adjacent coded bits in the vector n to quadrature phase shift keying modulation symbols;

determining a subset of tone symbols based on the at least one position bit; and modulating the modulation symbols to the subset of tone symbols.

9. The method of claim 8, further comprising:

transmitting each of the quadrature phase shift keying modulation symbols in one tone symbol of the determined subset of tone symbols.

10. A non-transitory computer readable medium embodying computer executable instructions for controlling a communications device in a wireless OFDM communication system, to perform the steps of:

dividing information bits into at least one modulation symbol bit and at least one position bit;

identifying modulation symbols based on the at least one modulation symbol bits;

determining a subset of tone symbols based on the at least one position bits;

determining whether any of the subset of tone symbols is reserved for use by any one of a plurality of higher priority channels;

when it is determined that one of the subset of tone symbols is reserved for use by any one of the plurality of higher priority channels, modifying the subset of tone symbols by performing one operation from the group of operations consisting of: i) a tone symbol replacement operation and ii) a tone symbol dropping operation; and modulating the modulation symbols to the subset of tone symbols.

11. The non-transitory computer readable medium of claim 10, wherein the modulation symbols comprise quadrature phase shift keying modulation symbols and wherein a ratio of a position bit number of position bits to a modulation symbol bit number of modulation symbol bits is two to five.

12. The non-transitory computer readable medium of claim 10, wherein said step of modifying the subset of tone symbols includes:

i) replacing the one of the subset of tone symbols in the subset reserved for use by one of the plurality of higher priority channels with a substitute tone symbol when a substitute tone symbol is available; and ii) dropping said one of the subset of tone symbols in the subset reserved for use by one of the plurality of higher priority channels from said subset when a substitute tone symbol is not available.

13. The non-transitory computer readable medium of claim 12, wherein the higher priority channels include a pilot channel and a sector null channel.

14. The non-transitory computer readable medium of claim 12, wherein the computer executable instructions further control the communications device to perform the step of:

performing a search of a predetermined set of substitute tone symbols for an available substitute tone symbol.

15. The non-transitory computer readable medium of claim 14, wherein the computer executable instructions further control the communications device to perform the step of:

identifying at least one of the substitute tone symbols as a reserved for use by a second sector; and wherein the performing a search of a predetermined set of substitute tone symbols comprises searching other substitute tone symbols before searching the identified at least one substitute tone symbol.

16. The non-transitory computer readable medium of claim 10, wherein the modulation symbols are high power modulation symbols, each high power modulation symbol being a modulation symbol that is to be transmitted at least 3 dB above an average per symbol transmission power used to transmit modulation symbols used to communicate traffic channel information.

17. A non-transitory computer readable medium embodying computer executable instructions for controlling a communications device in a wireless OFDM communication system to perform the steps of:
 dividing information bits into at least one modulation symbol bit and at least one position bit;
 identifying modulation symbols based on the at least one modulation symbol bits by:
  i) performing a vector matrix multiplication operation on a bit vector u comprising the modulation symbol bits, the matrix multiplication operation including multiplying the bit vector by a matrix G to produce a vector of coded bits, wherein:

$$G \text{ or a permutation of } G = \begin{bmatrix} 1000000101011111 \\ 0100011011000111 \\ 0010001110101101 \\ 0001010110110011 \\ 0000111001111001 \end{bmatrix}; \text{ and}$$

ii) mapping a plurality of pairs of adjacent coded bits in the vector n to quadrature phase shift keying modulation symbols;
 determining a subset of tone symbols based on the at least one position bits; and
 modulating the modulation symbols to the subset of tone symbols.

18. The non-transitory computer readable medium of claim 17, wherein the computer executable instructions further control the communications device to perform the step of:
 transmitting each of the quadrature phase shift keying modulation symbols in one tone symbol of the determined subset of tone symbols.

19. A wireless communication device for communicating information bits in a wireless OFDM communication system, the wireless communication device comprising:
 means for dividing the information bits into at least one modulation symbol bit and at least one position bit;
 means for identifying modulation symbols based on the at least one modulation symbol bits;
 means for determining a subset of tone symbols based on the at least one position bits;
 means for determining whether any of the subset of tone symbols is reserved for use by any one of a plurality of higher priority channels;
 means for modifying the subset of tone symbols by performing one operation from the group of operations consisting of: i) a tone symbol replacement operation and ii) a tone symbol dropping operation, when it is determined that one of the subset of tone symbols is reserved for use by any one of the plurality of higher priority channels; and
 means for modulating the modulation symbols to the subset of tone symbols.

20. The wireless communication device of claim 19, wherein the modulation symbols comprise quadrature phase shift keying modulation symbols and wherein a ratio of a position bit number of position bits to a modulation symbol bit number of modulation symbol bits is two to five.

21. The wireless communication device of claim 19, wherein said means for modifying the subset of tone symbols includes:
 i) means for replacing the one of the subset of tone symbols in the subset reserved for use by one of the plurality of higher priority channels with a substitute tone symbol when a substitute tone symbol is available; and
 ii) means for dropping said one of the subset of tone symbols in the subset reserved for use by one of the plurality of higher priority channels from said subset when a substitute tone symbol is not available.

22. The wireless communication device of claim 21, wherein the higher priority channels include a pilot channel and a sector null channel.

23. The wireless communication device of claim 21, further comprising:
 means for performing a search of a predetermined set of substitute tone symbols for an available substitute tone symbol.

24. The wireless communication device of claim 23, further comprising:
 means for identifying at least one of the substitute tone symbols as a reserved for use by a second sector; and wherein the performing a search of a predetermined set of substitute tone symbols comprises searching other substitute tone symbols before searching the identified at least one substitute tone symbol.

25. The wireless communication device of claim 19, wherein the modulation symbols are high power modulation symbols, each high power modulation symbol being a modulation symbol that is to be transmitted at least 3 dB above an average per symbol transmission power used to transmit modulation symbols used to communicate traffic channel information.

26. A wireless communication device for communicating information bits in a wireless OFDM communication system, the wireless communication device comprising:
 means for dividing the information bits into at least one modulation symbol bit and at least one position bit;
 means for identifying modulation symbols based on the at least one modulation symbol bits, said means for identifying modulation symbols including:
  i) means for performing a vector matrix multiplication operation on a bit vector u comprising the modulation symbol bits, the matrix multiplication operation including multiplying the bit vector by a matrix G to produce a vector of coded bits, wherein:

$$G \text{ or a permutation of } G = \begin{bmatrix} 1000000101011111 \\ 0100011011000111 \\ 0010001110101101 \\ 0001010110110011 \\ 0000111001111001 \end{bmatrix}; \text{ and}$$

ii) means for mapping a plurality of pairs of adjacent coded bits in the vector n to quadrature phase shift keying modulation symbols;

means for determining a subset of tone symbols based on the at least one position bits; and means for modulating the modulation symbols to the subset of tone symbols.

27. The wireless communication device of claim 26, further comprising:

means for transmitting each of the quadrature phase shift keying modulation symbols in one tone symbol of the determined subset of tone symbols.

28. A wireless communication device for communicating information bits in a wireless OFDM communication system, the wireless communication device comprising:

a processor configured to:

divide the information bits into at least one modulation symbol bit and at least one position bit;

identify modulation symbols based on the at least one modulation symbol bits;

determine a subset of tone symbols based on the at least one position bits;

determine whether any of the subset of tone symbols is reserved for use by any one of a plurality of higher priority channels;

when it is determined that one of the subset of tone symbols is reserved for use by any one of the plurality of higher priority channels, modify the subset of tone symbols by performing one operation from the group of operations consisting of: i) a tone symbol replacement operation and ii) a tone symbol dropping operation; and modulate the modulation symbols to the subset of tone symbols.

29. The wireless communication device of claim 28, wherein the modulation symbols comprise quadrature phase shift keying modulation symbols and wherein a ratio of a position bit number of position bits to a modulation symbol bit number of modulation symbol bits is two to five.

30. The wireless communication device of claim 28, wherein said processor is configured to:

i) replace the one of the subset of tone symbols in the subset reserved for use by one of the plurality of higher priority channels with a substitute tone symbol when a substitute tone symbol is available; and ii) drop said one of the subset of tone symbols in the subset reserved for use by one of the plurality of higher priority channels from said subset when a substitute tone symbol is not available, as part of being configured to modify the subset of tone symbols.

31. The wireless communication device of claim 30, wherein the higher priority channels include a pilot channel and a sector null channel.

32. The wireless communication device of claim 30, wherein said processor is further configured to:

perform a search of a predetermined set of substitute tone symbols for an available substitute tone symbol.

33. The wireless communication device of claim 32, wherein said processor is further configured to:

identify at least one of the substitute tone symbols as a reserved for use by a second sector; and wherein the performing a search of a predetermined set of substitute tone symbols comprises searching other substitute tone symbols before searching the identified at least one substitute tone symbol.

34. The wireless communication device of claim 28, wherein the modulation symbols are high power modulation symbols, each high power modulation symbol being a modulation symbol that is to be transmitted at least 3 dB above an average per symbol transmission power used to transmit modulation symbols used to communicate traffic channel information.

35. A wireless communication device for communicating information bits in a wireless OFDM communication system, the wireless communication device comprising:

a processor configured to:

divide the information bits into at least one modulation symbol bit and at least one position bit;

identify modulation symbols based on the at least one modulation symbol bits by:

i) performing a vector matrix multiplication operation on a bit vector u comprising the modulation symbol bits, the matrix multiplication operation including multiplying the bit vector by a matrix G to produce a vector of coded bits, wherein:

$$G \text{ or a permutation of } G = \begin{bmatrix} 1000000101011111 \\ 0100011011000111 \\ 0010001110101101 \\ 0001010110110011 \\ 0000111001111001 \end{bmatrix}; \text{ and}$$

ii) mapping a plurality of pairs of adjacent coded bits in the vector n to quadrature phase shift keying modulation symbols;

determine a subset of tone symbols based on the at least one position bits; and modulate the modulation symbols to the subset of tone symbols.

36. The wireless communication device of claim 35, further comprising:

a transmitter connected to the processor for transmitting each of the quadrature phase shift keying modulation symbols in one tone symbol of the determined subset of tone symbols.

37. The wireless communication device of claim 28, further comprising:

a memory device connected to the processor for storing an indicator of the subset of tone symbols.

38. A method of demodulating a received signal including a plurality of modulation symbols in a wireless communication system, the method comprising:

receiving the plurality of modulation symbols wherein each modulation symbol is received in a tone symbol of a communication segment, identifying a set of tone symbols from a plurality of predetermined tone symbol sets, wherein each predetermined tone symbol set is a subset of the segment;

calculating at least one position information bit based at least in part on the identified tone symbol set;

determining that at least one of the plurality of modulation symbols received in the segment is a pilot symbol;

identifying a substitute tone symbol in a predetermined substitute tone symbol set that is a subset of the received segment, responsive to the determining that at least one of the plurality of modulation symbols received in the segment is the pilot symbol;

replacing the at least one of the plurality of modulation symbols received in the segment that is the pilot symbol with the modulation symbol received in the substitute tone symbol; and decoding at least one modulation symbol received in the identified set of tone symbols to determine at least one modulation symbol information bit.

39. The method of claim 38, further comprising:
calculating the total energy of the modulation symbols received in all the tone symbols of each of the plurality of predetermined tone symbol sets;
determining one of the plurality of predetermined tone symbol sets corresponding to the tone symbol set having the maximum total energy; and
calculating at least one position information bit as a function of the determined tone symbol set.

40. The method of claim 38, wherein each of the plurality of predetermined tone symbol sets consists of eight tone symbols.

41. The method of claim 38, wherein there are four predetermined tone symbol sets.

42. A method of demodulating a received signal including a plurality of modulation symbols in a wireless communication system, the method comprising:
receiving the plurality of modulation symbols wherein each modulation symbol is received in a tone symbol of a communication segment;
identifying a set of tone symbols from a plurality of predetermined tone symbol sets, wherein each predetermined tone symbol set is a subset of the segment;
calculating at least one position information bit based at least in part on the identified tone symbol set; and
decoding at least one modulation symbol received in the identified set of tone symbols to determine at least one modulation symbol information bit;
wherein the decoding the at least one modulation symbol to determine the at least one modulation symbol information bit comprises:
discarding as erasures between one and five modulation symbols received in the eight tone symbols of the identified tone symbol set; and
decoding at least five modulation information bits from at least three modulation symbols that are not discarded in the identified tone symbol set.

43. A non-transitory computer readable medium embodying computer executable instructions for controlling a wireless communications device in a wireless communication system to perform the steps of:
receiving a plurality of modulation symbols wherein each modulation symbol is received in a tone symbol of a communication segment;
identifying a set of tone symbols from a plurality of predetermined tone symbol sets, wherein each predetermined tone symbol set is a subset of the segment;
calculating at least one position information bit based at least in part on the identified tone symbol set;
determining that at least one of the plurality of modulation symbols received in the segment is a pilot symbol;
identifying a substitute tone symbol in a predetermined substitute tone symbol set that is a subset of the received segment, responsive to the determining that at least one of the plurality of modulation symbols received in the segment is the pilot symbol;
replacing the at least one of the plurality of modulation symbols received in the segment that is the pilot symbol with the modulation symbol received in the substitute tone symbol; and
decoding at least one modulation symbol received in the identified set of tone symbols to determine at least one modulation symbol information bit.

44. The non-transitory computer readable medium of claim 43, wherein the computer executable instructions further control the wireless communications device to perform the steps of:
calculating the total energy of the modulation symbols received in all the tone symbols of each of the plurality of predetermined tone symbol sets;
determining one of the plurality of predetermined tone symbol sets corresponding to the tone symbol set having the maximum total energy; and
calculating at least one position information bit as a function of the determined tone symbol set.

45. The non-transitory computer readable medium of claim 43, wherein each of the plurality of predetermined tone symbol sets consists of eight tone symbols.

46. The non-transitory computer readable medium of claim 43, wherein there are four predetermined tone symbol sets.

47. The non-transitory computer readable medium of claim 45, wherein the decoding the at least one modulation symbol to determine the at least one modulation symbol information bit comprises:
discarding as erasures between one and five modulation symbols received in the eight tone symbols of the identified tone symbol set; and
decoding at least five modulation information bits from at least three modulation symbols that are not discarded in the identified tone symbol set.

48. A wireless communication device for demodulating a received signal including a plurality of modulation symbols in a wireless communication system, the wireless communication device comprising:
means for receiving the plurality of modulation symbols wherein each modulation symbol is received in a tone symbol of a communication segment;
means for identifying a set of tone symbols from a plurality of predetermined tone symbol sets, wherein each predetermined tone symbol set is a subset of the segment;
means for calculating at least one position information bit based at least in part on the identified tone symbol set;
means for determining that at least one of the plurality of modulation symbols received in the segment is a pilot symbol;
means for identifying a substitute tone symbol in a predetermined substitute tone symbol set that is a subset of the received segment, responsive to the determining that at least one of the plurality of modulation symbols received in the segment is the pilot symbol;
means for replacing the at least one of the plurality of modulation symbols received in the segment that is the pilot symbol with the modulation symbol received in the substitute tone symbol; and
means for decoding at least one modulation symbol received in the identified set of tone symbols to determine at least one modulation symbol information bit.

49. The wireless communication device of claim 48, further comprising:
means for calculating the total energy of the modulation symbols received in all the tone symbols of each of the plurality of predetermined tone symbol sets;
means for determining one of the plurality of predetermined tone symbol sets corresponding to the tone symbol set having the maximum total energy; and
means for calculating at least one position information bit as a function of the determined tone symbol set.

50. The wireless communication device of claim 48, wherein each of the plurality of predetermined tone symbol sets consists of eight tone symbols.

51. The wireless communication device of claim 48, wherein there are four predetermined tone symbol sets.

52. A wireless communication device for demodulating a received signal including a plurality of modulation symbols in a wireless communication system, the wireless communication device comprising:
- means for receiving the plurality of modulation symbols wherein each modulation symbol is received in a tone symbol of a communication segment;
- means for identifying a set of tone symbols from a plurality of predetermined tone symbol sets, wherein each predetermined tone symbol set is a subset of the segment;
- means for calculating at least one position information bit based at least in part on the identified tone symbol set; and
- means for decoding at least one modulation symbol received in the identified set of tone symbols to determine at least one modulation symbol information bit; and
- wherein the means for decoding the at least one modulation symbol to determine the at least one modulation symbol information bit comprises:
  - means for discarding as erasures between one and five modulation symbols received in eight tone symbols of the identified tone symbol set; and
  - means for decoding at least five modulation information bits from at least three modulation symbols that are not discarded in the identified tone symbol set.

53. A wireless communication device for demodulating a received signal including a plurality of modulation symbols in a wireless communication system, the wireless communication device comprising:
- a processor configured to:
  - receive the plurality of modulation symbols wherein each modulation symbol is received in a tone symbol of a communication segment;
  - identify a set of tone symbols from a plurality of predetermined tone symbol sets, wherein each predetermined tone symbol set is a subset of the segment;
  - calculate at least one position information bit based at least in part on the identified tone symbol set;
  - determine that at least one of the plurality of modulation symbols received in the segment is a pilot symbol;
  - identify a substitute tone symbol in a predetermined substitute tone symbol set that is a subset of the received segment, responsive to determining that at least one of the plurality of modulation symbols received in the segment is the pilot symbol;
  - replace the at least one of the plurality of modulation symbols received in the segment that is the pilot symbol with the modulation symbol received in the substitute tone symbol; and
  - decode at least one modulation symbol received in the identified set of tone symbols to determine at least one modulation symbol information bit.

54. The wireless communication device of claim 53, wherein the processor is further configured to:
- calculate the total energy of the modulation symbols received in all the tone symbols of each of the plurality of predetermined tone symbol sets;
- determine one of the plurality of predetermined tone symbol sets corresponding to the tone symbol set having the maximum total energy; and
- calculate at least one position information bit as a function of the determined tone symbol set.

55. The wireless communication device of claim 53, wherein each of the plurality of predetermined tone symbol sets consists of eight tone symbols.

56. The wireless communication device of claim 55, wherein the processor is further configured, as part of being configured to decode the at least one modulation symbol, to:
- discard as erasures between one and five modulation symbols received in the eight tone symbols of the identified tone symbol set; and
- decode at least five modulation information bits from at least three modulation symbols that are not discarded in the identified tone symbol set, to determine the at least one modulation symbol information bit.

57. The wireless communication device of claim 53, wherein there are four predetermined tone symbol sets.

58. The wireless communication device of claim 53, further comprising:
- a memory device connected to the processor for storing at least one indicator of at least one of the predetermined tone symbols sets.

* * * * *

UNITED STATES PATENT AND TRADEMARK OFFICE
CERTIFICATE OF CORRECTION

| | | Page 1 of 1 |
|---|---|---|
| PATENT NO. | : 8,005,158 B2 | |
| APPLICATION NO. | : 11/487260 | |
| DATED | : August 23, 2011 | |
| INVENTOR(S) | : Leonidov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this
Third Day of April, 2012

David J. Kappos
*Director of the United States Patent and Trademark Office*